United States Patent
Labrador

(10) Patent No.: US 8,051,637 B2
(45) Date of Patent: Nov. 8, 2011

(54) HEAT ENERGY RECAPTURE AND RECYCLE AND ITS NEW APPLICATIONS

(76) Inventor: Gaudencio Aquino Labrador, San Diego, CA (US)

( * ) Notice: Subject to any disclaimer, the term of this patent is extended or adjusted under 35 U.S.C. 154(b) by 992 days.

(21) Appl. No.: 11/795,835

(22) PCT Filed: Jul. 27, 2005

(86) PCT No.: PCT/US2005/026793
§ 371 (c)(1),
(2), (4) Date: Jul. 20, 2007

(87) PCT Pub. No.: WO2006/078315
PCT Pub. Date: Jul. 27, 2006

(65) Prior Publication Data
US 2008/0155985 A1    Jul. 3, 2008

Related U.S. Application Data

(63) Continuation-in-part of application No. 11/039,624, filed on Jan. 20, 2005, now abandoned, which is a continuation-in-part of application No. 08/999,729, filed on Dec. 23, 1997, now Pat. No. 6,327,994, and a continuation-in-part of application No. 09/137,499, filed on Aug. 20, 1998, now Pat. No. 6,293,121.

(30) Foreign Application Priority Data

Mar. 25, 2004   (PH) .............................. 1-2004-000148

(51) Int. Cl.
*F02C 1/00*     (2006.01)
*F01K 13/00*    (2006.01)

(52) U.S. Cl. ............................. 60/39.01; 60/772; 60/676
(58) Field of Classification Search ................... 60/618, 60/698, 914, 39.01, 772, 676
See application file for complete search history.

(56) References Cited

U.S. PATENT DOCUMENTS

| | | | | |
|---|---|---|---|---|
| 5,272,879 A * | 12/1993 | Wiggs | ............................. | 60/676 |
| 5,435,259 A * | 7/1995 | Labrador | ................... | 114/39.31 |
| 6,293,121 B1 * | 9/2001 | Labrador | ........................ | 62/304 |
| 6,327,994 B1 * | 12/2001 | Labrador | ...................... | 114/382 |
| 6,880,344 B2 * | 4/2005 | Radcliff et al. | ................. | 60/772 |

* cited by examiner

*Primary Examiner* — Hoang Nguyen

(57) ABSTRACT

A heat absorbing radiator and a gas turbine engine or a reciprocating piston engine are used to recapture and reconvert wasted heat energies into electric power and finally into hydrogen-deuterium fuel by having the engine's tailpipes submerged in cold compressed air inside the heat absorbing radiator pipes in reverse air flow to further drive the same engine. In order to capture fusion heat energy a hydrogen bomb is detonated in deep ocean to catch the flames by the water and the hot water energizes compressed air inside heat absorbing radiator pipes. In order to produce fusion energy an electric arc is passed thru/across liquid or gaseous deuterium by an electro-plasma torch and by a sparkplug in an internal combustion engine, or by detonating a dynamite inside liquid deuterium. Diamond is produced by placing carbon inside a hydrogen bomb which is then detonated in deepwater. Deuterium fusion flame is used first in smelting glass into large structural sizes before running an engine.

1 Claim, 28 Drawing Sheets

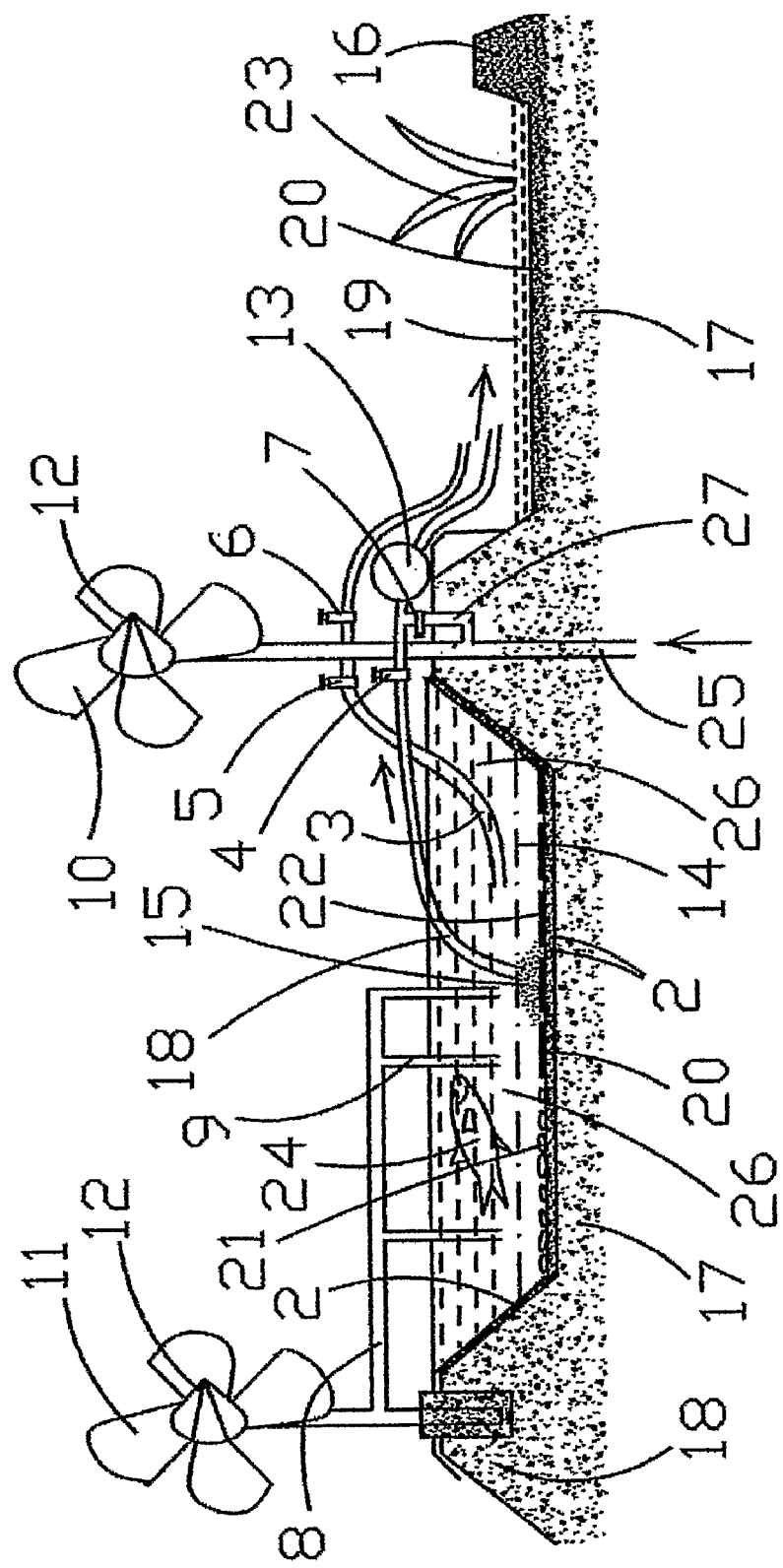

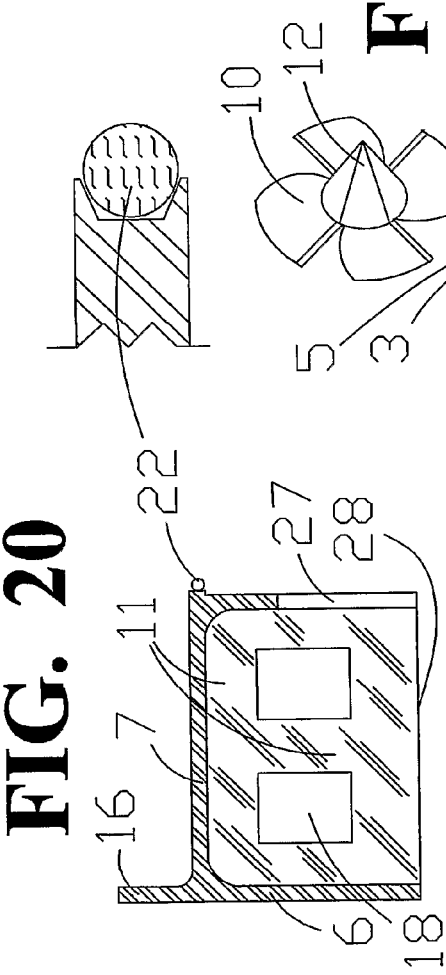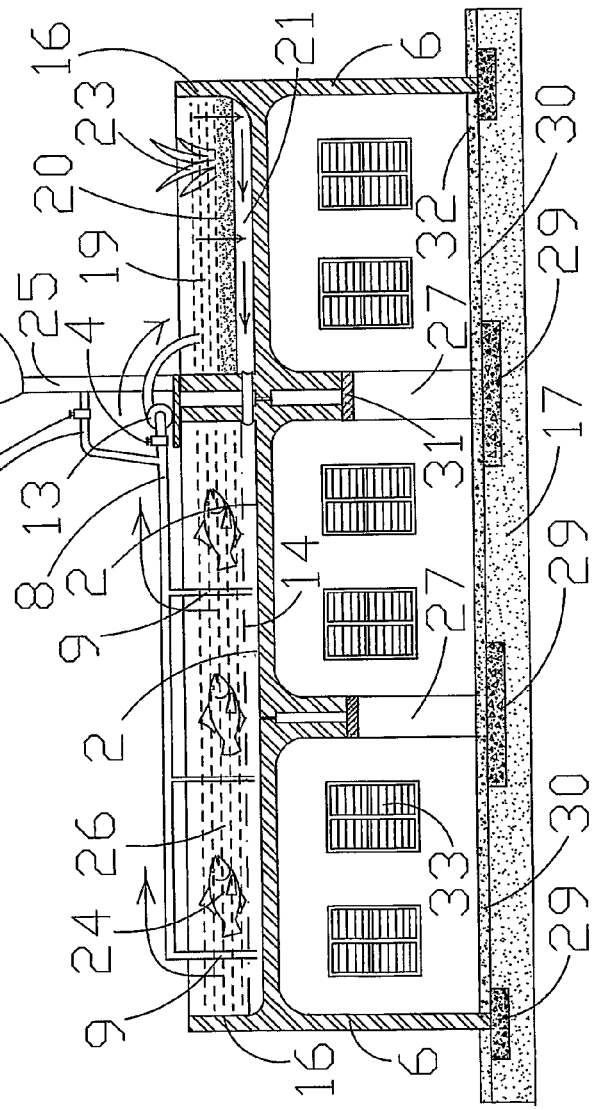

HEAT ENERGY RECAPTURE AND RECYCLE AND ITS NEW APPLICATIONS

CROSS REFERENCES

Figure 1:
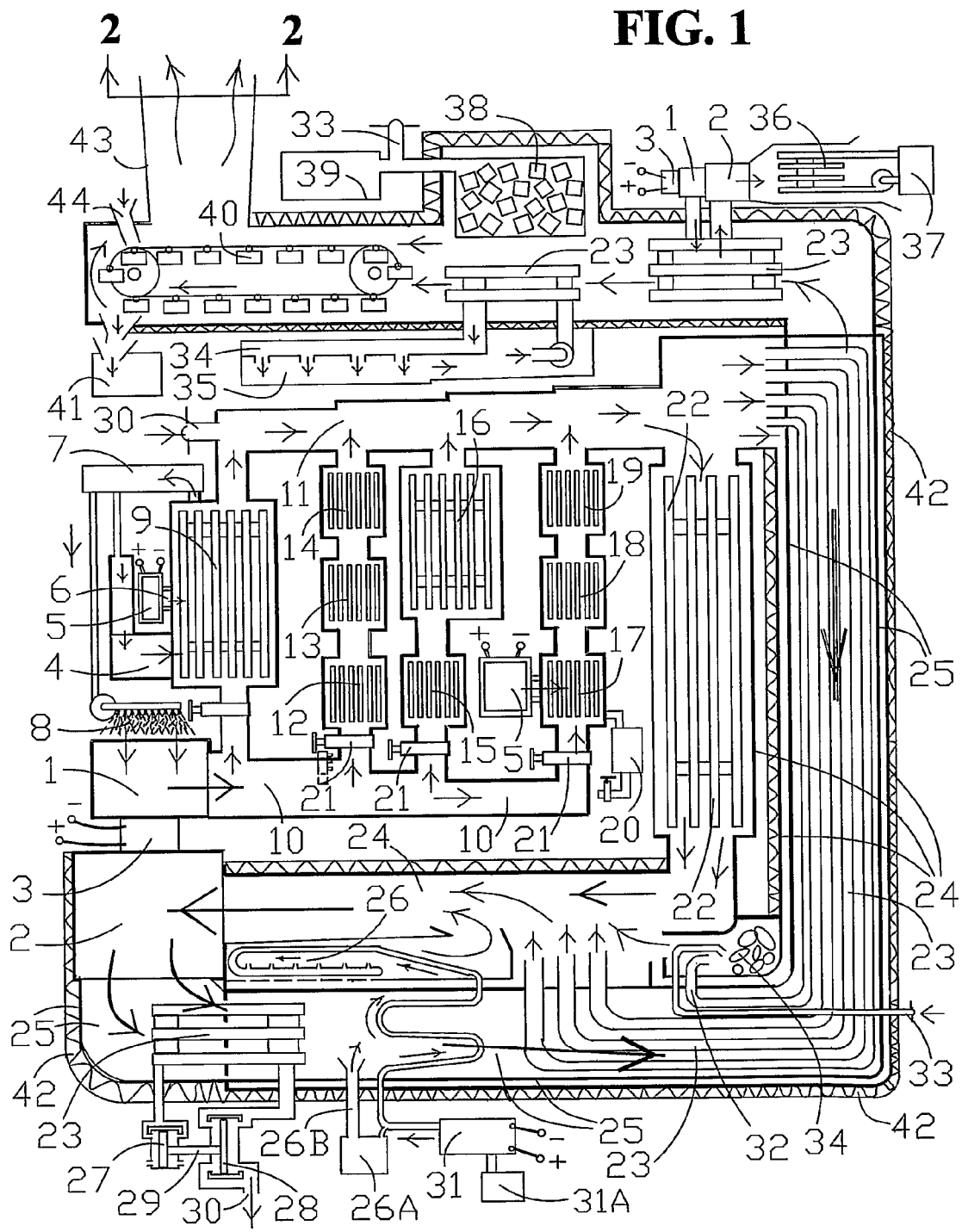

This application is a national stage application of PCT/US2005/026,793, filed on Jul. 27, 2005, which is a continuation-in-part application of U.S. application Ser. No. 11/039,624, filed on Jan. 20, 2005, now abandoned, which is a continuation-in-part application of U.S. application Ser. No. 08/999,729, filed on Dec. 23, 1997, now U.S. Pat. No. 6,327,994, and is a continuation-in-part application of U.S. application Ser. No. 09/137,499, filed on Aug. 20, 1998, now U.S. Pat. No. 6,293,121.

STATEMENT REGARDING FEDERALLY SPONSORED RESEARCH not applicable.

BACKGROUND OF THE INVENTION

This invention has the mission to recapture and recycle the otherwise wasted heat energy—at the exhausts/tailpipes/chimneys and at the heat exchange chambers of cooling devices. It has been always a big blunder since the engine was invented wherein for more than 100 years, man has been helplessly and purposely allowing heat energy to escape into the atmosphere in the efforts to prevent overheating of the engines. Further, since the time fire was invented, heat energy has been always wasted, for lack of wisdom and lack of education, wherein the products of combustion and the poisonous gases had always been the enemy of man, and therefore, it has always been a big effort to eject soonest the waste gases which unfortunately carry away along with it so much heat energy. Additionally, so much heat energy has always been thrown away in the processes of smelting, glass/ceramics factories, freezing processes, refrigeration and distillation process, which heat energy should have been recycled to pre-heat the subject matters of the processes. God has created so much free heat energy by means of the sun, but we look at it as our enemy such that we spend so much in construction of heat insulation in our houses, —instead of using it to run our air conditioning and our refrigeration machines. All these blunders are dictated by the greedy secrete societies who hold monopoly on poisonous fuels and who suppress opposing technologies. The exhaust heat energy should be used to run water distillation machines and food processing machines, to dry trash fuel, to warm up sewer digestion chambers in biogas production, to dry animal manure for fertilizer in the farm, for cooking food, to pre-heat materials in the process of smelting, to heat up water in the process of electrolysis, to heat up water in the process of water-mist—vacuum-chamber-evaporation distillation process, to drive heat-absorbing electric generators in the process of producing hydrogen for fuel, etc. All heat exhaust from all engines, fuel cells, smelting plants, glass/ceramics plants, lamps, ovens etc., must be recaptured to further do work.

As has been illustrated in my own reference U.S. Pat. No. 6,327,994 B1, by G. Labrador, dated Dec. 11, 2001, the heat absorbing radiator 81 of FIG. 24, the heat absorbing radiator 3 of FIG. 23, the heat absorbing radiator 3-4 of FIG. 21, the heat absorbing radiator 3-4 of FIG. 22, and the heat absorbing radiator 3-4 of FIG. 20, had extensively demonstrated the functions and abilities of the multiple tube heat absorber in the process of heat recapture in partnership with a gas turbine engine 31-32-63-64 of said reference patent.

In this present representation and application, it is hereby extremely emphasized, as highlight of this invention, that the commercial utilization and industrial new applications of the heat absorbing radiator tubes is maximized by using it to absorb heat from the exhaust of Fuel Cells, the exhaust of steam engines, from the exhaust of all kinds of engines, from the exhaust and annealing of smelting plants of glass, metals, etc. Additionally, the radiator tubes are made multi-coil and so with the heat supply pipes are also made multi-coil that follow the coils of the heat absorber tubes. Additionally, to maximize heat transfer, the cold compressed air is made to enter the heat absorber tubes at the outlet lower temperature downstream end of the heat energy supply tubes and then exits at the high temperature upstream end of the heat energy supply tubes. This is a very important highlight of this invention because the higher temperature compressed air cannot absorb low temperature heat. It is therefore hereby extremely emphasized that the low temperature heat-absorbing compressed air is matched with the low temperature heat supply medium, likewise, the high temperature heat-absorbing compressed air is matched with the high temperature heat supply medium. Hence, in trying to collect the low temperature heat energy of the sunlight, the compressed air tubes must be made very hungry for heat:

1. by spraying cold water mist into the air before compression;
2. by passing the air thru cold pipes before compression;
3. by submerging the compressed air tubes into cold environment;
4. by matching low temperature air with the low temperature heat supply medium air or water, and
5. by reversing the flow of the heat absorbing medium, cold compressed air/water, at opposite the flow of the heat supply medium, air, water, or oil.

These above listed improvements in the processes of heat absorbing mission has not been explained in my reference U.S. Pat. No. 6,327,994 B1.

This heat absorbing radiator tubes is hereby extremely emphasized as the key element that brings-in hot compressed air inside the engine, be it piston engine or be it turbine engine, by absorbing or gathering heat energy from the outside atmosphere or environment. The basic principle that runs the externally heated gas turbine engine, as demonstrated in my reference U.S. Pat. No. 6,237,994 B1, is that: —hot compressed air is introduced, by the heat collecting radiator, into the space in-between the compressor turbine and the power exhaust turbine. The power turbine is made larger than the compressor turbine, but the air or steam pressure acting upon the smaller compressor turbine to reverse its motion is the same magnitude of steam pressure acting upon the larger exhaust power turbine to forward its motion. The compressor being smaller turbine is therefore over-powered and driven forward by the exhaust turbine, thereby, more cold compressed air is introduce into the heat collector radiator which then continuously brings in more hot compressed air that expands to push forward the exhaust turbine. The hot air/steam expelled by the power turbine is then recaptured by the flowing cold compressed air inside the heat collector tubes/pipes that engulf the hot tailpipes. These basic process/method have not been explained in details in the herein reference Patent.

As a newly created engine in this invention, which is hereby extremely emphasized as among the many highlights of improvements over the reference art by this invention, and as has been fully explained basic principle in the preceding paragraph 0003, this principle is also applied to work between a larger exhaust piston and a smaller compressor piston which is directly connected with the larger exhaust piston by means of a straight connecting rod, such that there being equal air/steam pressure acting in opposite direction to each piston, the larger exhaust piston over-powers and drives forward the smaller compressor piston. Thereby resulting to a more cold compressed air introduced by the compressor smaller piston into the heat collector radiator tubes which brings in more hot compressed air to drive the exhaust larger piston. The heat energy from the exhaust air/steam is then recaptured by the heat collector compressed air tubes which engulf the hot exhaust tail pipe of the engine.

Additionally, for maximum utilization of the heat collector radiator tubes which contains cold compressed air, a plurality of this tubes are placed underwater to collect the low temperature heat energy of the warm waters in the tropical oceans. Before compression, the cold air is passed thru cold waters pumped out from about 3000 feet beneath the ocean where the water temperature is very low in order to pre-compress the clod air. Additionally, a wide area of the ocean surface is made hotter from solar heat by a double transparent roof to prevent the wind from stealing the heat energy out of the warm water. The hot seawater is then enclosed by a perimeter double fence to prevent the hot seawater from migrating into the cooler waters. As there is ocean current, it is also advantageous to raise up the perimeter fence above the water during the night to allow more warm water getting in touched with the heat collector tubes. Additionally, it is also advantageous to install an adjustable sunlight reflector, which is tilted to the right towards the sun in the morning and titled to the left towards the sun in the afternoon in order to make the sun light penetrate the transparent roof and strike the tubes under the roof when the sunlight is inclined. The sunlight reflector is in the form of horizontal shinny strips, laid on the roof and supported by a tilting device, —a further improvement over my reference U.S. Pat. No. 6,327,994 B1.

The new invention of the "partnership between the heat collector radiator tube and the gas turbine engine" has opened a very wide horizon of opportunities in energy management, including but not limited to, the recapture and utilization of heat energy created by the detonation of the hydrogen bomb under water. While in the process of producing diamonds, which is hereby extremely emphasized as the most outstanding by-product discovered in this invention in the efforts to produce heat energy, in the explosion of the hydrogen bomb, the deep water environment imposes a high pressure that compacts the molten carbon/charcoal/graphite, and then instantly cools it into diamonds. Due to the flames of the blast being surrounded by water, the heat energy is therefore captured by the deep water, into which the heat collector radiator tubes are submerged. The bomb may also be detonated deep underground but this is a very expensive procedure, hence, this invention limits it activity in deep water detonation, which may also be done inland by digging an open wide well or lake that is deep enough and filled up with water. The heat energy collector tubes are made very hungry for heat—by passing fresh air thru chilling tunnels with added water spray inside the tunnels and at the intake mouth of the compressor, —to introduce high humidity or more matter that expands when heated, —to add up more expanding power in pushing out the power exhaust turbine. It should be noted that the faster the compressed air moves thru the tubes, the faster the tubes collects heat energy from the hot water/gas it is in contact with. Hence, the heat collector tube is divided into many multiple smaller tubes to speed up the compressed air and to distribute or to maximize contact with the heat source or heat supply medium. The collected heat energy is then used to produce DC electricity, which is in turn used to produce Hydrogen and Deuterium to detonate the next hydrogen bomb in deep water, —of which the reference U.S. Pat. No. 6,327,994 B1 failed to illuminate.

BRIEF SUMMARY OF THE INVENTION

I. Missing Needs and Problems of the Prior Arts

1. In the prior art, the heat energy of the hydrogen bomb is wasted to the atmosphere, and there is no way to recapture it to do work.
2. There is no idea of detonating a hydrogen bomb by drop Hummer.
3. There is no idea of detonating a hydrogen bomb triggered by a dynamite submerged in liquid deuterium confined in strong container.
4. There is no idea of detonating a hydrogen bomb by passing electric arc across the liquid/gaseous deuterium.
5. There is no idea of detonating a hydrogen bomb by confined electrolysis of hot heavy water without air gap.
6. There is no idea of using the super temperature of fusion energy for making diamonds.
7. There is no idea of capturing the heat energy of fusion by deepwater detonation and the heat absorbing radiator tubes collect the heat energy from the hot water to run a gas turbine or reciprocating engine.
8. There is no idea of using fusion energy for smelting glass, ceramics, metals, etc, and then the waste energy is recaptured to run an engine, and to distill water.
9. There is no idea to recapture the heat energy expelled by a fuel cell to run a gas turbine engine.
10. There is no idea to capture the low temperature heat energy expelled by air conditioning machines, refrigerator machines, freezing machines, etc., to run a gas turbine engine.
11. There is no idea for a reciprocating piston engine to drive a piston compressor, which supplies hot compressed air to drive the reciprocating piston engine.
12. There is no idea of using hydrogen-electro-plasma torch to produce heat energy inside the hot power air duct to drive the power exhaust turbine.
13. There is no idea using hydrogen-electro-plasma torch for smelting glass/ceramics/metals and then the heat is recaptured to drive an engine.
14. There is no idea of manufacturing large glass bottles that serves as houses, large glass sections of roofs, floor, walls, posts, and girders for structures in salt waters and for other structural uses.
15. There are many countless things and ideas missing in the prior arts, which now are created and listed in the summary of the invention and also had been discussed very well in the whole specifications of this presentation.

II. Objectives and Advocacy of this Invention

1. To lead mankind to the furthest horizon of science and technology in energy management and manipulation.
2. To illustrate the true picture of what man has been missing in energy management.
3. To illustrate the awesome bounty of clean energy that God has created for mankind, which includes solar heat.
4. To illustrate how far mankind has been oppressed, diverted, detoured, and poisoned by the oil owners and oil investors.
5. To provide a clear understanding of the truth that after all, the poisonous oil is not needed at all.

6. To advance the science and to provide the technology in the design of machineries that maximize benefits from fuels, and/or heat energy sources/supplies.
7. To advance and maximize the total take-over of the hydrogen into the world's economy and to eliminate the function of the fuel oil from the world's economy.
8. To provide a clear understanding of the technologies presented in the prior arts which were not substantially explained, —in order to maximize utilization and commercialization of the prior arts.
9. To lead mankind into new exciting adventures in scientific applications of the prior arts, and more so, for the new discoveries of the existing God's wisdom and creations but never before known to man.
10. To bring glory to God's kingdom by promoting brotherhood, by making every person into a guardian, steward, and custodian to God's properties, —thru illumination and sharing of God's wisdom.

III. The New Creations of This Invention

In the efforts to produce heat, to control heat, to collect heat, to maximize utilization of heat, and to maximize benefits from fuel, the following God's wisdom, new ideas, new concepts, new devices, and new processes/methods/steps had been discovered, and hereby applied for patent, to with:
1. Charcoal used as heat insulator and as absorber of solar light/heat.
2. Confined electrolysis without air gap/space for automatic liquefaction of deuterium and hydrogen to attain cold fusion by not chilling but with applied heat.
3. Recapture of heat and produce distilled water from the steam produce by Fuel Cells by means of the heat absorbing radiator tubes, and then the distilled water is sprayed into the intake of the compressor of the gas turbine engine, or used as drinking water.
4. Recapture of heat energy and water from the steam expelled by steam engine by means of the heat absorbing radiator tubes.
5. It being in high pressure, the hot steam from fuel cell is injected into the combustion chamber of a gas turbine engine for heat recapture and for power.
6. Hydrogen bomb is detonated under water to capture the heat energy into the deep water and converted into hot water and/or steam.
7. The hydrogen bomb is detonated into subterranean aquifers to capture the heat and confine the heat energy underground.
8. Fusion is attained by drop Hummer to further compress the already pre-liquefied deuterium.
9. Fusion is attained by exploding a confined dynamite that surrounds a liquid deuterium, or the liquid deuterium surrounds the dynamite.
10. Fusion is attained by passing electric arc across the liquid deuterium or tritium in strong confinement.
11. Fusion energy is captured and harnessed by means of the heat absorbing radiator tubes submerged in the deep hot water.
12. Hydrogen-electro-plasma Torch, as means to produce cold fusion, serves to produce super high temperature to supply heat inside the compressed air power air duct/pipe.
13. Fusion energy is created by feeding hydrogen-deuterium into the gasoline/diesel internal combustion engines having sparkplugs.
14. A hybrid spark plug made to produce multiple long electric arc jump of at least 1 centimeter or so, with multiple prong or no anode at all.
15. A reciprocating engine drives a double acting compressor that supplies compressed air into the heat absorbing radiator which drive the reciprocating engine.
16. The heat energy expelled thru the tailpipe is recaptured by the heat absorbing radiator pipes that run a gas turbine engine to produce hydrogen and to turbo-charge the internal combustion engine.
17. Heat energy is supplied inside the compressed air duct by smokeless burning of solid lumps of coal, coke, charcoal, wood and trash—by super—pre-heating the oxygen-air supply delivered to the fuel thru multiple tube nozzles.
18. The gas turbine engine is feed with powdered: —charcoal, coke, wood, trash, and other organics, —to burn smokeless in multi-fuel.
19. Deuterium Plasma Torch or cold fusion is used to heat up the catalytic converter at the down stream of the hot compressed air duct, just before the exhaust power turbine in order to remove smoke and carbon monoxides—to recapture heat from catalytic converter by the power turbine.
20. Electricity is stored in the form of hydrogen-deuterium in newly invented hybrid tanks wherein water and/or mercury are used as liquid sealant, which now has solved the problem of the escaping hydrogen.
21. Individual hot tubes are each inserted inside corresponding individual cold compressed air tubes to absorb or pick-up all the heat energy from the heater tubes, —in maximum absorption.
22. The hybrid internal fusion piston engine with hybrid spark plugs has its combustion chambers individually submerged in abundant water to prevent overheating of the engine and to recapture the heat into the water.
23. The energy in the exhaust tail pipes of engines or power plants is used:
    a. To power a reciprocating piston engines;
    b. To power a steam engine that produce pure water or hydrogen;
    c. To heat up a second stage radiator heat absorber;
    d. To heat up a small gas turbine engine that produce deuterium;
    e. To heat up water for storage;
    f. To heat up air for the house or home;
    g. To distill organics and wood, to produce charcoal and organic oil/gas recycled for pre-superheated fuel before release for burning;
    h. To dry trash placed in conveyors, —for fuel in power plants;
    i. To produce risen and stored in cold chambers for plastics;
24. Smokeless trash burning is done from the top of the trash, and the oxygen air is pre-superheated by the flames thru the heat absorbing radiator coiled tubes in the fire, and the oxygen air distributed by multi-nuzzle tubes into the various parts of the fire and directed to the fuel—to completely oxidize unburned gas fumes flying around the combustion chamber.
25. Heat energy from smelting plants for glass/ceramics, steel, metals, stones, coal/wood distillation, etc, are recaptured by the heat collector tubes to run various kinds engines.
26. While in the process of recapturing and recycling heat energy, glass or ceramic is smelted into fiberglass, and into many forms, and kinds of shapes of bottles or cubicles large enough to serve as houses, rooms of houses, including large sections of roofs, floors, chambers, boats, walls, posts, beams, girders in interlocking bolts, which are advantageously used for structures floating/submerged in salt waters, it being vitrified material.

27. Fusion heat energy is used to smelt glass, ceramics, metals, calcium carbide, metals, firebricks, etc., and the exhaust heat is recaptured by heat absorbing radiator tubes to run engines.
28. Heat energy is recaptured/recycled from steam by heat collector tubes while running the process of water distillation.
29. New innovative used and functions of empty plastic bottles—to float ocean structures and human settlements on the ocean.
30. New innovative function of floater bamboos and empty pipes—for crisscrossing bamboo/pipes to make stiff walls and stiff floors floating on the ocean.
31. Distilled water is produced by electrolysis and then feed the hydrogen/oxygen in the fuel cell or gas turbine engine, and then condensed by recapturing heat from the exhaust steam for drinking water.
32. Oil production by dissolving organic trash in hydrogen or deuterium in a high pressure and high temperature container.
33. Remove hydrogen pressure by dissolving organics materials into the liquid hydrogen/deuterium.
34. Stop leak of hydrogen by water/mercury liquid seal to prevent the hydrogen from getting in contact with the organic valve seal.
35. Colored distilled water to identify the water level against the liquid hydrogen or deuterium.
36. A bent outlet tube submerged in water or mercury is turned up above the water/mercury to let the hydrogen get into the tube and out from storage tank, in order to used the stored hydrogen.
37. Steel-in-post-tension reinforced glass made into arc roof strips for houses/buildings.
38. Produce drinking/distilled water by electrolysis and then the hydrogen and oxygen are feed in stainless gas turbine engine, and then condense the exhaust into drinking water by means of the heat absorbing radiator tubes to help run the electrolysis machine.
39. Bamboos are stacked into boat's hull to ease up the boat industry.
40. Bamboo floaters, empty bottles, pipes, and glass globes/pipes are used to make conglomerate floater sausages, —in bags, sacks, baskets, bundles, and nets.
41. Swimming pools, Fishponds, Windmills, residential human settlements, and Agricultural lands are carried on water by crisscrossing walls that trap air in up-side-down open boxes, and by conglomerates of floaters and/or platforms.
42. Maximum usage of hydrogen/deuterium serving to fuel hybrid engines for electric generation, for irrigation pumps, for desalination/distillation to produce irrigation water and drinking water, for transportation, for recreation, and for rain water making by compressed-air mist atomizer nozzles, and by vertical air blowers with water spray.
42. Diamond production by deepwater thermonuclear detonation surrounding a compacted carbon.
43. A new process of desalination wherein the Hydrogen/deuterium hybrid engines are used to mist spray seawater into the sky by means of giant propellers floating on the sea that drive upward winds with water spray to produce large amounts of clouds in the sky for rain making, —the upward winds serving to propel large kite gliders upward to play in the sky for a long time by turning in a cycle getting into the upward wind when the glider losses elevation and be blown upward again, —a recreation and tourist attraction.
44. A new design for a floater wherein a plurality of crisscrossing horizontal walls assembly are air tightly covered by a plate on top to form a plurality of arrays of air chambers open at the bottom, and each chamber is filled up with compressed air as the load on top is increased to push down the water that gets upward into the chambers, —in order to from an ocean platform carrying power plants, residential lands/houses, farmlands, factories, and serving as transportation.
45. A new design for taking maximum benefits from the heat energy of the ocean surface by using the cold temperature of the water at the ocean bottom to pre-compress the air before heating up by the ocean's surface warm waters, wherein, a fusion flame together with water mist is injected inside the compressed air pipe feeding the power turbine, and wherein, the heat energy expelled by the power turbine is distributed to and recaptured by the ocean water.
46. A new design for compacting molten carbon for diamond making wherein the carbon is molten by electric arc in a high pressure container.
47. A new design for an ocean floating swimming pool having a salt water pool, a fresh water pool, and solar tent, wherein, the salt water pool has a floor serving as sand filter to keep the water free from poisonous jelly fish and debris.
48. A floating platform on the ocean or lake, that carries a residential house, and a farmland having a fishpond in a water tank that supplies fertilizer to the farmland out of the droppings from the fish, which is done in the process of cleaning the water of the fishpond by running a hydrogen engine and/or windmill pump.
49. A farmland constructed on a dry land, having a fishpond underlain by impervious materials to conserve water which is being pump out from underground deep well by means of windmills and thermonuclear engines that also supplies fertilizers from the fishpond and irrigation water to the agricultural bed.
50. A house/building made of an assembly of monolithically poured or molded cubicles of glass/ceramics, having a roof filled up with water serving as a fishpond and an aqua Riceland serving as filter to clean the fishpond, —for cottage industry in the farms.
51. A thermonuclear torpedo fired by a submarine boat upon an under water target impact wall to provide fusion energy into a floating power plant by means of the boiling deep water.
52. A thermonuclear bullet containing hydrogen/deuterium which explodes as a hydrogen bomb upon impact with a target hard object, —used to produce sustained fusion flame in a smelting oven, in a boiler, to burn/cut a structure, and to melt an armor.
53. An underwater large canon gun fed with large thermonuclear bullets which are fired by the gun upon an underwater target impact wall to produce fusion energy in a sustained manner, —in order to run a thermonuclear power plant.
54. A thermonuclear bullet containing hydrogen/deuterium which explodes as hydrogen bomb upon impact with a hard target, as an effective weapon in armored combat.
55. A solar trap/oven above the house supplied with additional heat energy from smokeless trash incinerator and hydrogen plasma torch, aside from solar heat, —to run a gas turbine engine, —-serving as a retrofit to existing houses and buildings for purposes of self generation.
56. A new design for a hydrogen/deuterium electro-plasma torch for smelting and energizing an engine, wherein, the non-electric-conductive container for the fusion reactor chamber is surrounded with non-conductive distilled water that prevents meltdown of the fusion chamber which effects boiling of the surrounding water into steam, and wherein, additional liquid deuterium is spitted/shot inward into the fusion flame in reverse against the outward flow of the flame, —to take the opportunity for sustained fusion without the further use electric arc anymore.

57. A large aquarium in the form of a fish on wheels or as boat used to transport live fish, fuels, gas/liquid/powder, or as a marine house.

58. A floating agricultural shallow bed for growing algae or water plants, well exposed to sunlight with clean filtered water.

59. A new device/apparatus invented in support for water distillation process in combination with smelting and electrolysis process for the production of hydrogen-deuterium fuels, wherein the heat energy from the smelting furnace, is conducted by a chimney in the form of multi-tube/multi-coil hot radiator pipes submerged in a steam boiler that power a steam turbine in the production of hydrogen-deuterium fuels, out of which, the steam gets into a radiator submerged in cold compressed air coming from the compressor of a gas turbine engine to condense the steam into distilled water in the production of abundant drinking water and irrigation water, wherein, the low temperature heat energy in the chimney past the steam boiler is further recaptured/recycled be a second cold compressed air branching out at the outlet of the compressor to help drive the gas turbine engine, thereby the heat energy from the steam is recaptured to drive the gas turbine engine which in turn drives the electrolysis machine.

60. To prevent melt-down, a thermonuclear fusion smelting furnace is constructed having floors, walls, and ceilings made of coiled steam boiler pipes in at least two layers filled up with distilled water, the outer layers serving to pre-heat the water, the steam runs a steam turbine and a gas turbine engine, and the cold compressed air radiator pipes condense the steam into distilled water which recycles back into the steam boiler pipes. There being no need for oxygen in fusion fire, the furnace has no air inlet and no exhaust chimney in order to conserve heat and to prevent oxidation of the smelted materials.

BRIEF DESCRIPTION OF THE SEVERAL
VIEWS OF THE DRAWINGS

FIG. 1—is a hybrid gas turbine engine having, multiple stages progressive heat-collector or absorber compressed-air duct with plurality of branches and gate valves.

FIG. 1—further illustrates a plurality of high efficiency heat-absorbing radiator made part of the branches of the heat energy collector compressed-air duct.

FIG. 1—further illustrates a new use of radiator tubes serving as device to absorb heat energy that heats up the compressed air rather than to dissipate heat.

FIG. 1—further illustrates a plurality of cold compressed-air ducts serving to absorb the heat energy from all different kinds of heat-energy sources, including thermonuclear fusion.

FIG. 1—further illustrates that cold fusion, hydrogen bomb, fusion ovens, nuclear ovens, and hydrogen/deuterium/tritium burners are among the many heat sources that power the hybrid engine.

FIG. 1—further illustrates the cold compressed air serves to condense: (1) the super hot steam expelled by steam engines, and (2) the hot steam expelled by fuel cells.

FIG. 1—further illustrates the distilled water from the fuel cell and steam turbine serves as super charger by spraying the pure water into the intake of the compressor.

FIG. 1—further illustrates the cold humid compressed air serves to absorb low-temperature heat energy, such as, freezers, chillers, air conditioners, and solar heat.

FIG. 1—further illustrates the compressed air, after it has been warmed up, further absorbs heat from various higher-temperature energy from fuel burning ovens.

FIG. 1—further illustrates that the air-oxygen supply and the oil/gas fuel torch are both pre-heated super-hot before getting into the solid fuel combustion chamber.

FIG. 1—further illustrates the heat energy from the exhaust power turbines is absorbed by the cold compressed air while in-route to push the power turbine or piston.

FIG. 1—further illustrates a new method of using fusion in smelting by using hydrogen/deuterium as pre-heated fuel in a super-hot plasma torch oven to inject heat into the compressed air duct.

FIG. 1—further illustrates a new process or method to harvest the heat energy of a hydrogen bomb or thermonuclear bomb that is detonated underwater.

FIG. 1—further illustrates a reciprocating piston type engine is run by hot compressed air that is energized by the hot air expelled by the power turbine.

FIG. 1—further illustrates that the hot air expelled by the reciprocating piston engine is fed into the second stage compressed air duct.

FIG. 1—further illustrates the hot air expelled by the power turbine is used to produce super hot steam to run a steam engine, be it piston type or turbine type.

FIG. 1—further illustrates part of the electric output of this engine is used to generate hydrogen for fuel in the fusion oven for producing heat energy and helium.

FIG. 1—further illustrates a self-sustaining process wherein part of the electricity produced is used to produce hydrogen for the fuel cells and fusion ovens.

FIG. 1—further illustrates part of the hydrogen produced by this machine is feed to an internal combustion engine which in turn inject hot gas into the hot-air duct.

FIG. 1—further illustrates a smaller gas turbine engine is driven by the heat energy expelled by the larger gas turbine engine.

FIG. 1—further illustrates the heat energy expelled by the smaller gas turbine engine is used to heat up a water heater.

FIG. 1—further illustrates the heat expelled by the large power turbine is further used to produce heating air that is ventilated into inside buildings and houses.

FIG. 1—further illustrates the heat expelled by the power turbine is used to heat up chunks of wood and coal in the process of destructive distillation.

FIG. 1—further illustrates the gaseous fumes from the distilled wood is feed into and serving as torch fuel inside the solid-fuel, coal/trash burning chamber.

FIG. 1—further illustrates the heat expelled by the power turbine is used to dry trash in a process of producing solid/liquid fuel for the large gas turbine engine.

Figure 2:
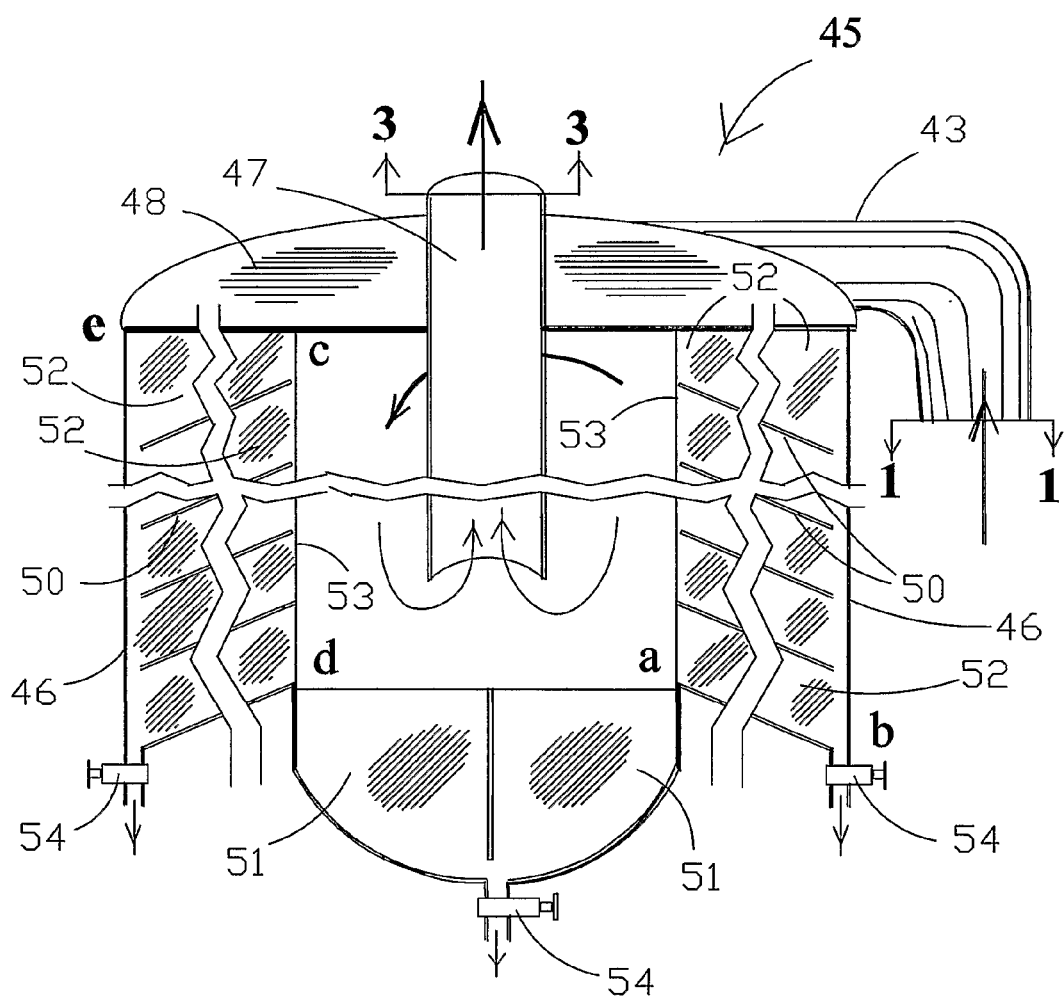

FIG. 2—illustrates a hybrid cyclone ash/dust separator.

FIG. 2—further illustrates a wide spacious multiple stilling chambers of the cyclone dust separator around its outer sections to trap dust.

Figure 3:
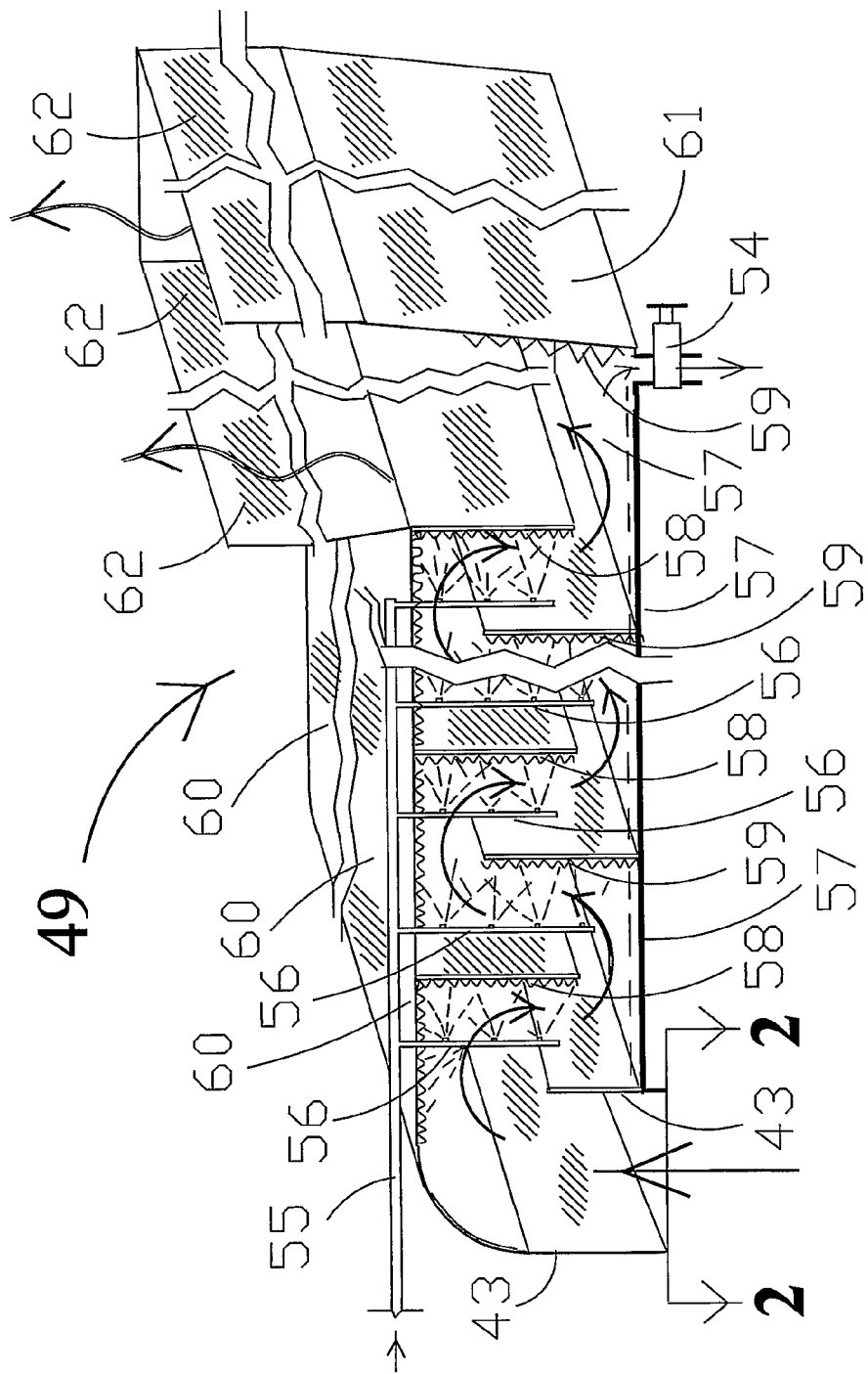

FIG. 3—illustrates a zigzag chimney that grabs the smoke and ash from the exhaust air of an organic trash fueled engine.

Figure 4:
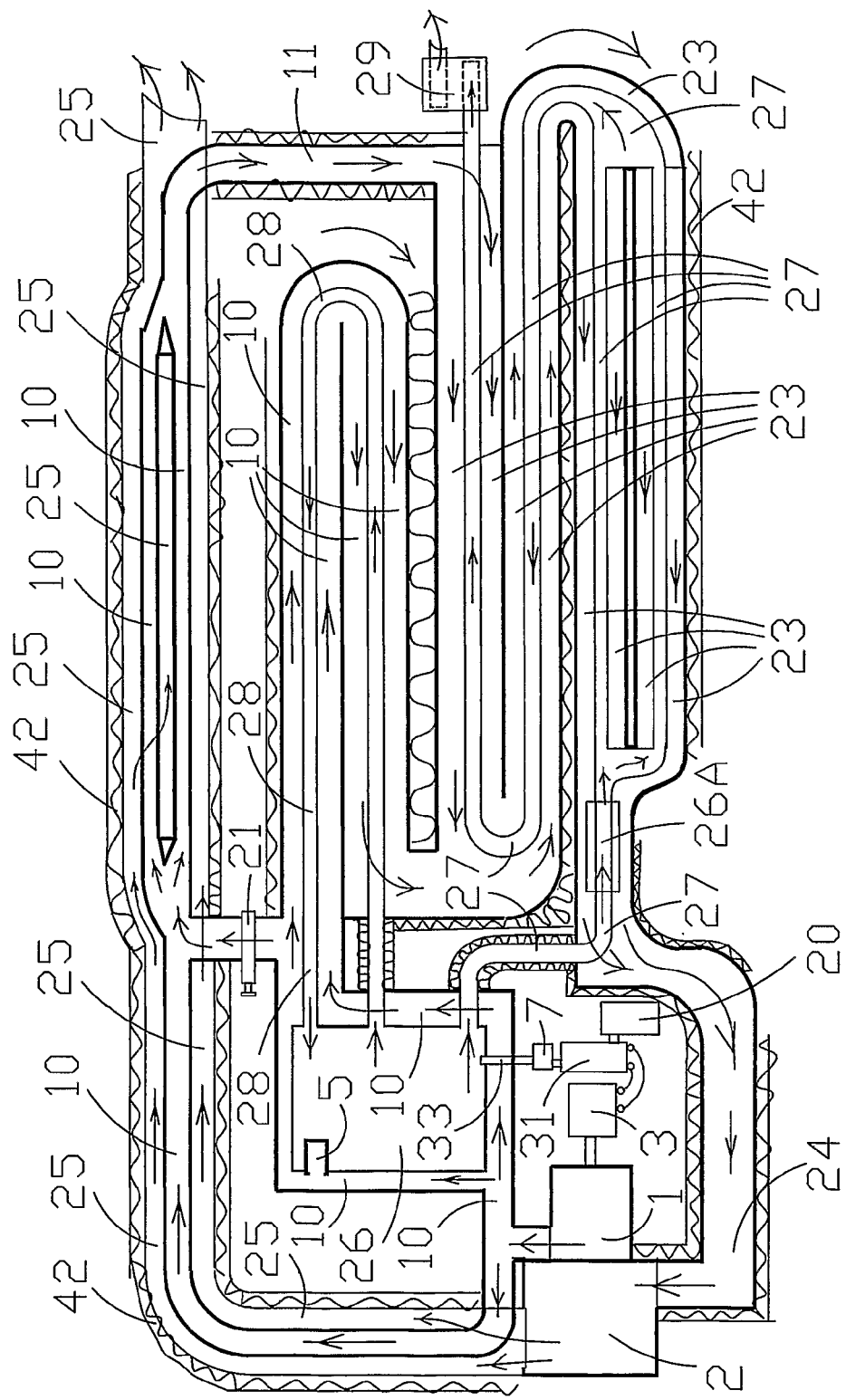

FIG. 4—illustrates a process to recapture heat energy from the tail pipe and from the heat emitting cooling radiator of an engine to drive another engine.

Figure 5:
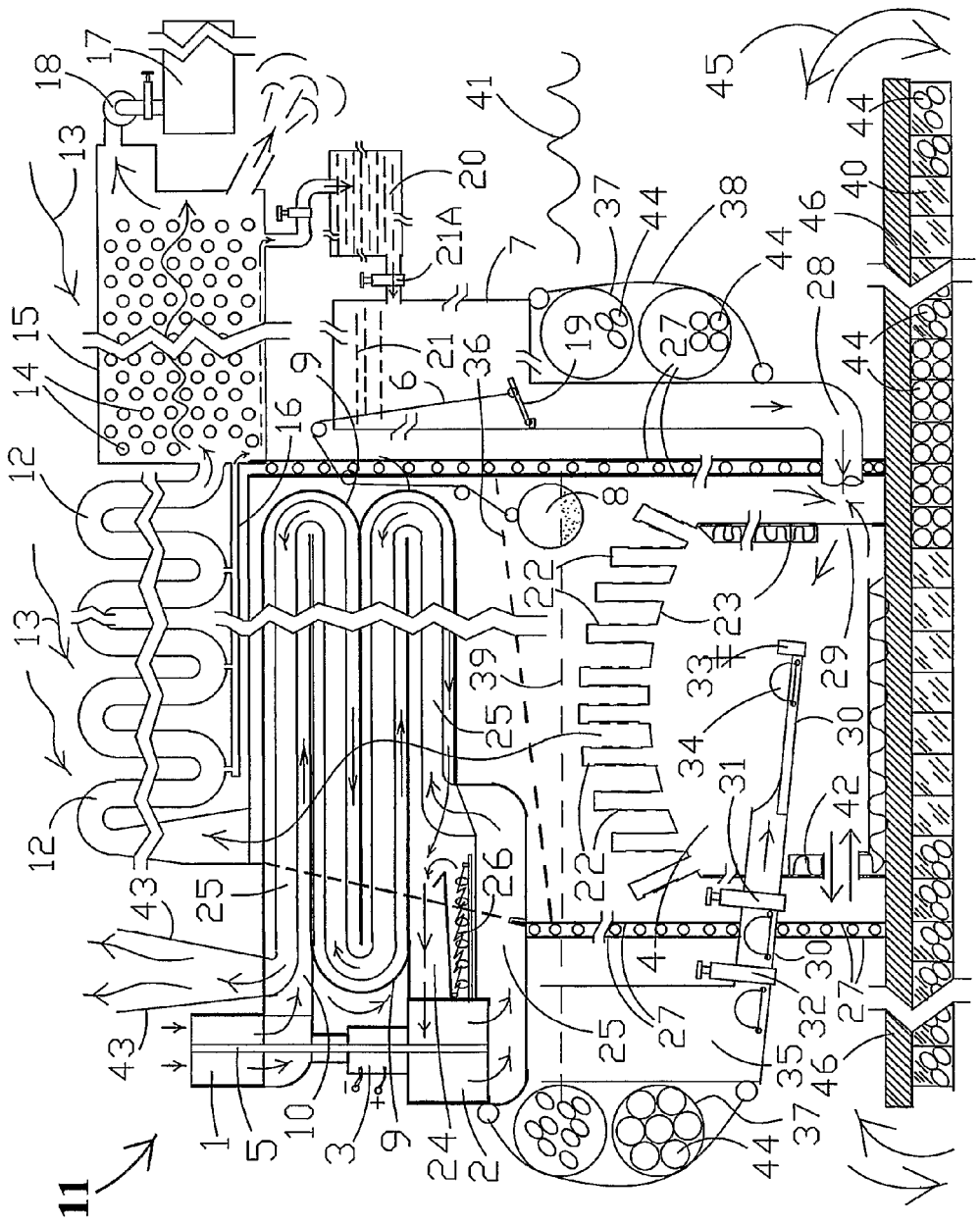

FIG. 5—illustrates an underwater hydrogen bomb detonator apparatus in support of a new process to capture the heat energy into the deep waters in the efforts to produce/recycle heat energy.

FIG. 5—further illustrates a new process and its supporting device to recapture the heat energy produced by fusion to run an engine.

FIG. 5—further illustrates a new structural design out of recycled containers for a floor to support the whole fusion apparatus.

FIG. 5—further illustrates new design and method of constructing a floating platform thru a new recycle use of various kinds of empty used containers, such as, used bottles, bamboos, pipes and crisscrossing walls with sealed top cover to trap air.

FIG. 5—further illustrates a new design or method for constructing a floater structure in the form of a large sausage made of empty plastic bottles contained or wrapped around by nets or basket of ropes, wires, and bamboos.

FIG. 5—illustrates a new device to capture and condense the steam produce by underwater detonation of hydrogen bomb and to store the helium gas.

Figure 6:
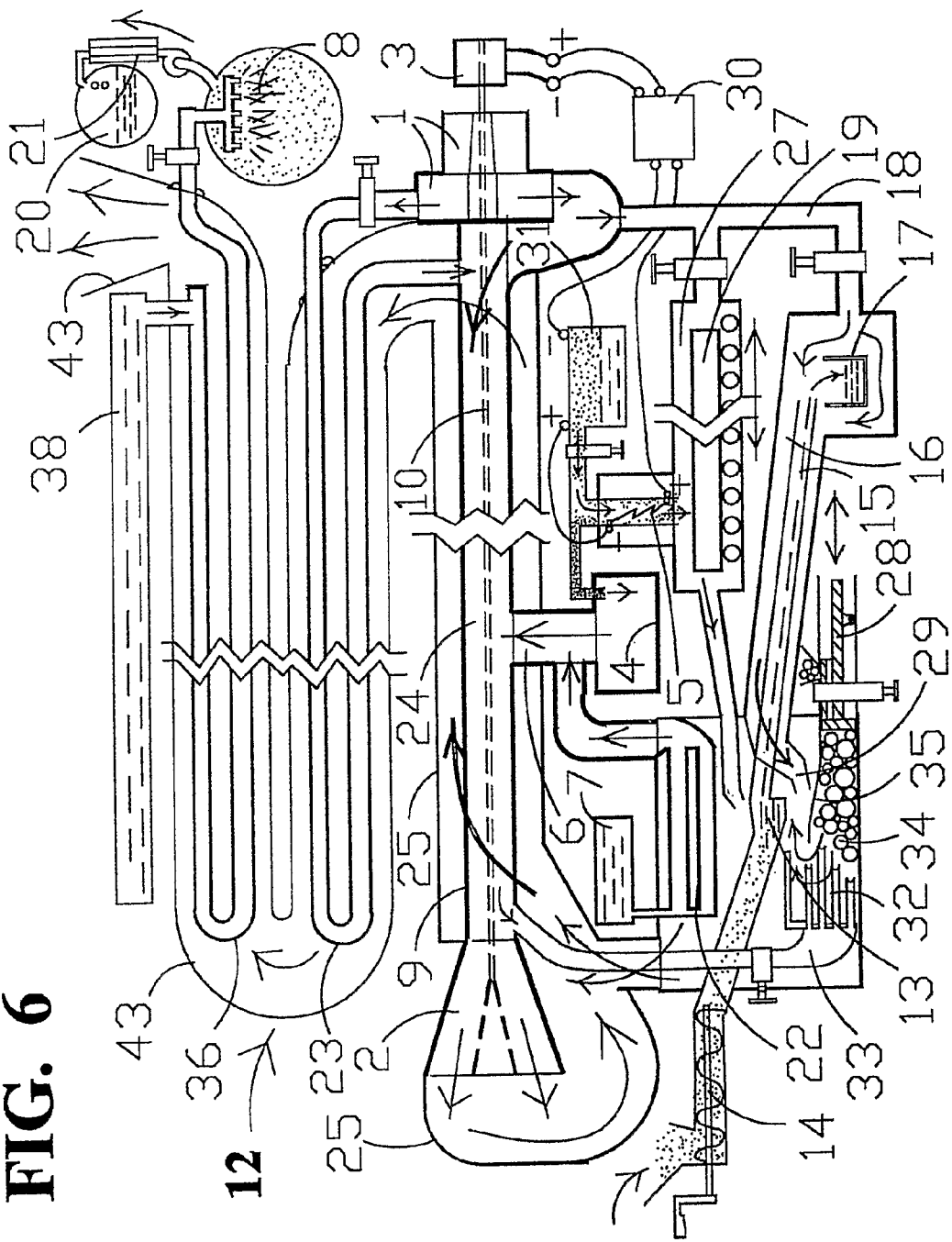

FIG. 6—illustrates a newly created smelting plant for glass/ceramics and metals, wherein the heat energy otherwise wasted in burning/firing/smelting and annealing, is captured to pre-superheat oxygen-air supply for clean burning of the fuel.

FIG. 6—further illustrates a newly created power plant, wherein, the consumed heat energy in the factory is recaptured to run an engine that generates hydrogen to fuel the smelting processes.

FIG. 6—further illustrates a newly created smelting plant, wherein, hydrogen plasma torch, which is fusion energy, is used to melt sand and stones to produce large molded sections of glass/ceramic structures—for houses and buildings.

FIG. 6—further illustrates a newly created power plant, wherein, the heat energy expelled by the engine is recaptured to heat up its own power compressed air and to distill water for re-supply into the compressor intake and for drinking.

Figure 7:
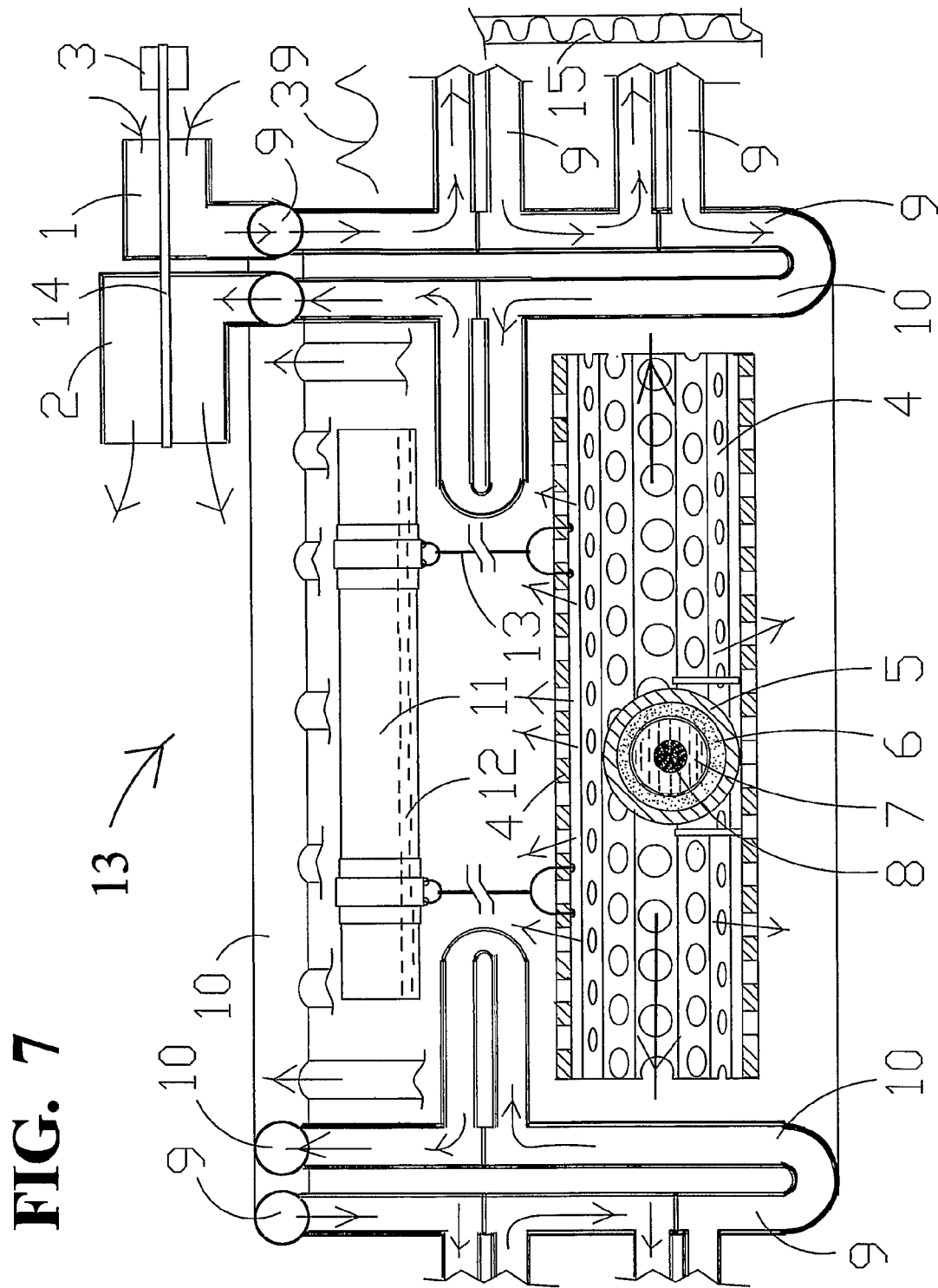

FIG. 7—illustrates a newly created process for making diamonds, wherein, compacted carbon is placed at the center of a hydrogen bomb to implode the carbon.

FIG. 7—further illustrates a newly created process of making a hydrogen bomb, wherein, the liquid deuterium is placed at the center of a dynamite/bomb which is enclosed by a thick wall of cylindrical steel and/or glass to implode the deuterium.

FIG. 7—further illustrates a newly created basket made of perforated steel to support a new process of spreading the fusion flames to maximize water contact in the effort to capture the heat energy of fusion bomb in deep waters.

FIG. 7—further illustrates a new device/apparatus for the process of absorbing heat energy in the hot water, wherein, the fusion spot is fenced around by heat absorbing radiator tubes.

FIG. 7—further illustrates a new invention of a gas turbine engine being run by a hydrogen bomb.

Figure 8:
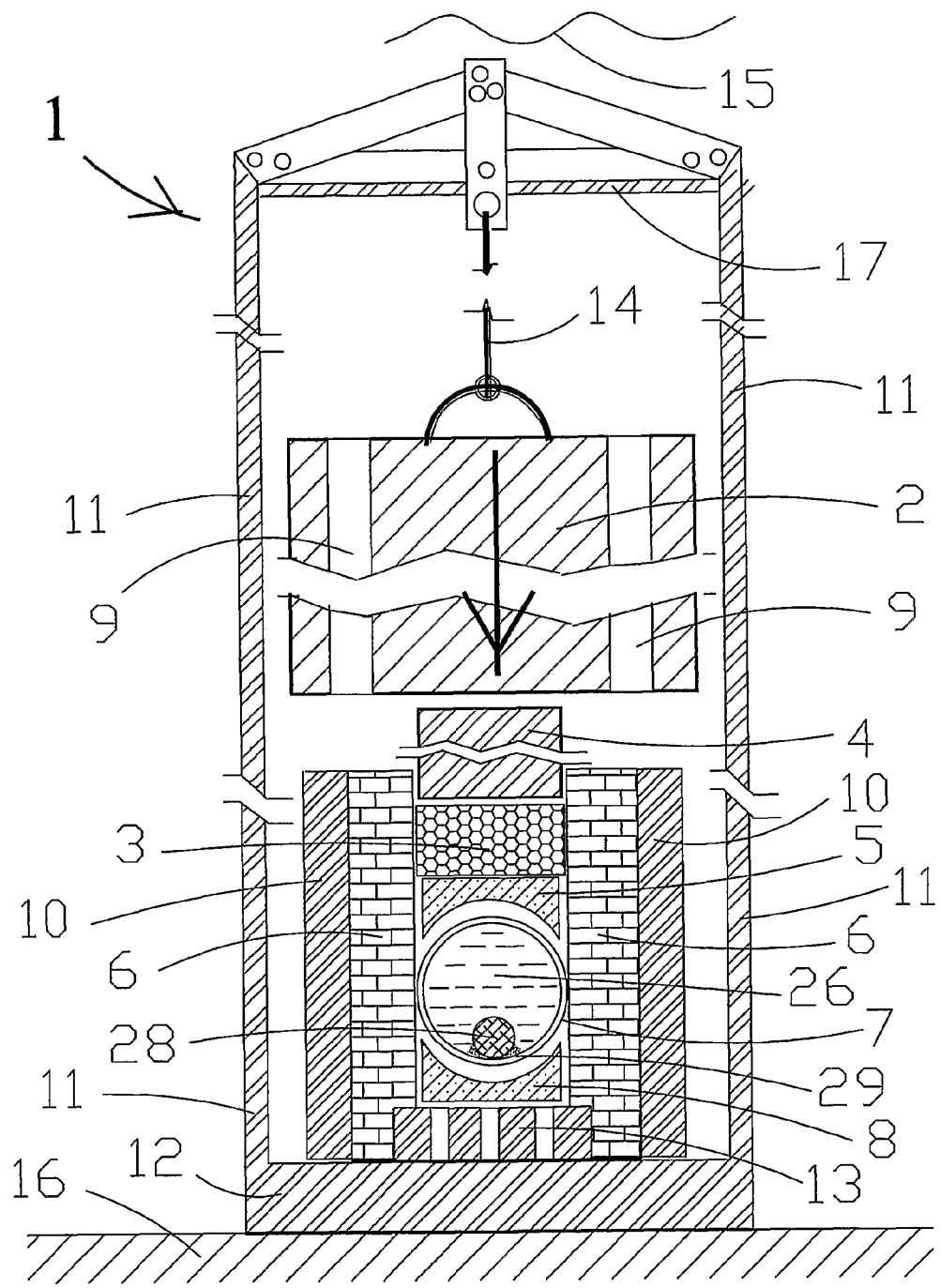

FIG. 8.—illustrates a new process of detonating a hydrogen bomb by compressing the liquid deuterium by means of the impact of a drop hummer.

FIG. 8—further illustrates a new process of detonating a hydrogen bomb by adding a bomb/dynamite on top of the liquid deuterium being compressed by the drop hummer impact.

FIG. 8—further illustrates a new process of making diamonds, wherein, a compacted carbon/graphite is placed at the bottom of the liquid deuterium so that the diamonds are retained at the bottom of the fusion bomb apparatus.

Figure 9:
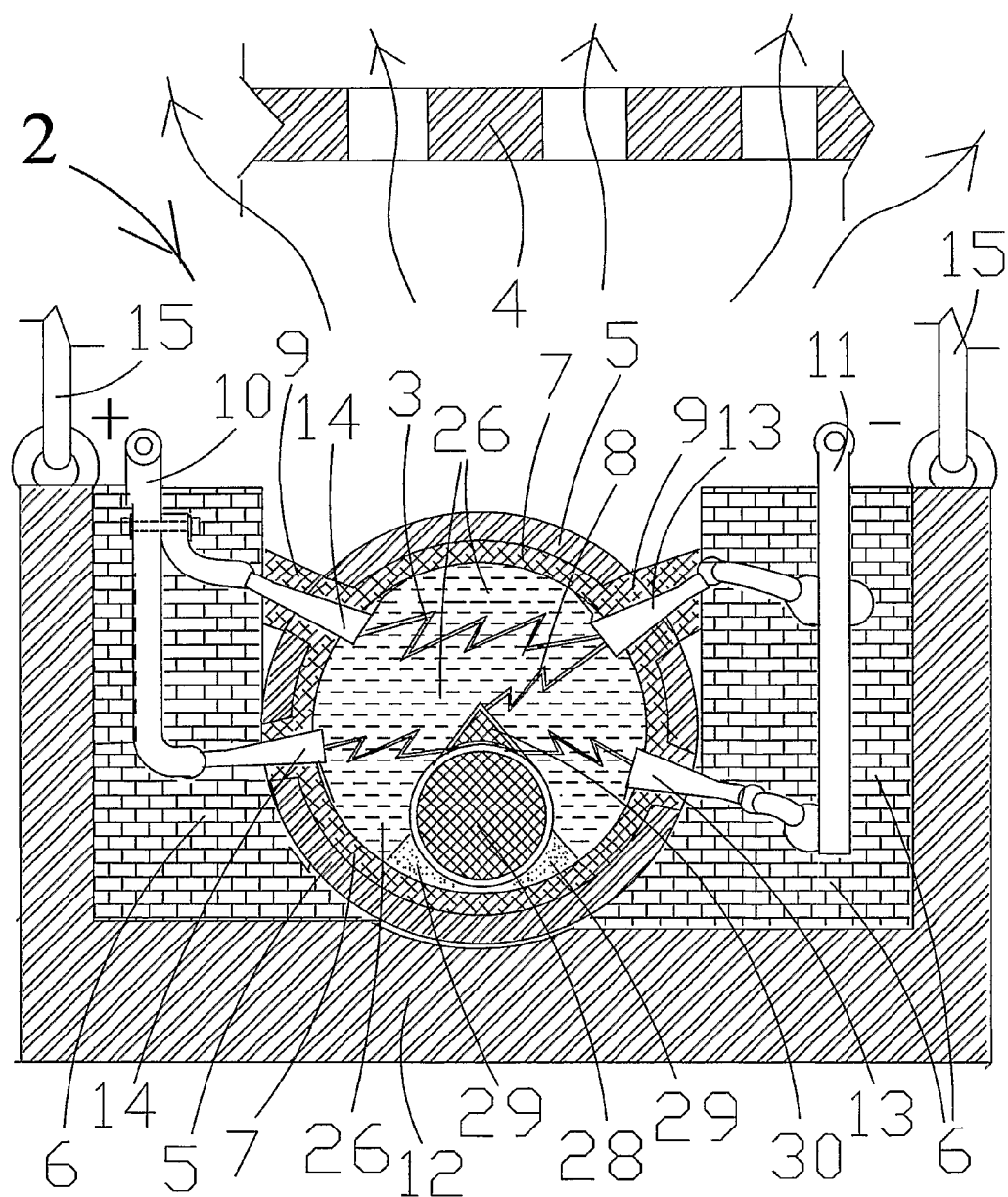

FIG. 9—illustrates a new process of detonating a hydrogen bomb, wherein, a multiple high voltage electric arc are passed thru across the liquid deuterium.

FIG. 9—further illustrates a new process of making diamonds, wherein, a ball of compacted carbon/charcoal/graphite is placed at the bottom of the liquid deuterium to prevent it from being blown upward.

FIG. 9—further illustrates a new process of making a hydrogen bomb, wherein, the glass container is molded to the inside walls of the strong steel pressure developer container.

FIG. 9—further illustrates a new design for a hydrogen bomb, wherein, the electrodes are molded or baked embedded in the glass container to prevent the deuterium from escaping out.

Figure 10:
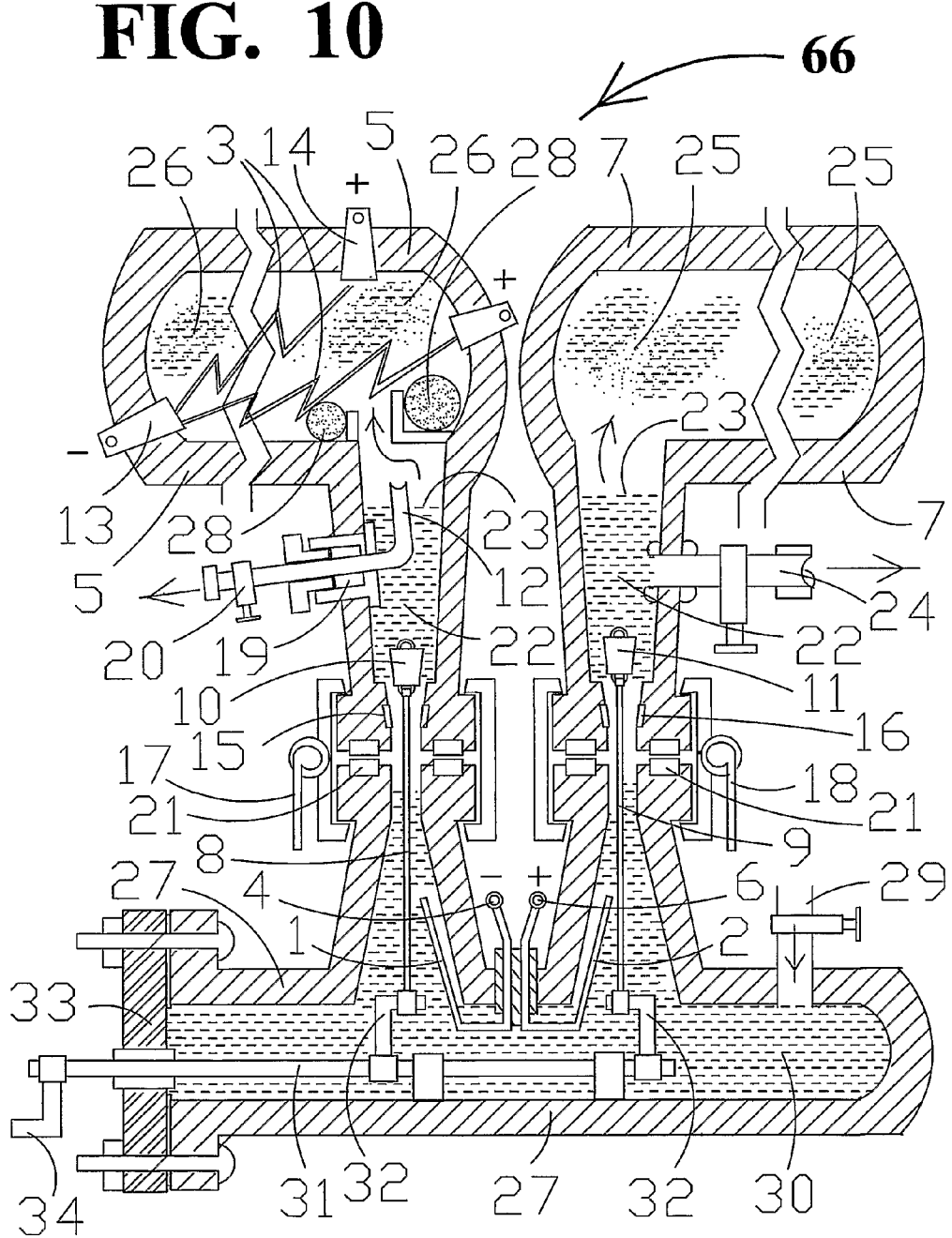

FIG. 10—illustrates a newly invented device in support to a new process of forced confined electrolysis of heavy water in the production of hydrogen and deuterium directly into liquid form.

FIG. 10—further illustrates a new design of a hydrogen bomb comprising a strong glass container with bake-in metal or lead electrodes for the high voltage electric arc.

FIG. 10—further illustrates a new design for a hydrogen container, wherein hydrogen/deuterium is prevented to escape by water or mercury serving as outlet liquid sealant of the container.

Figure 11:
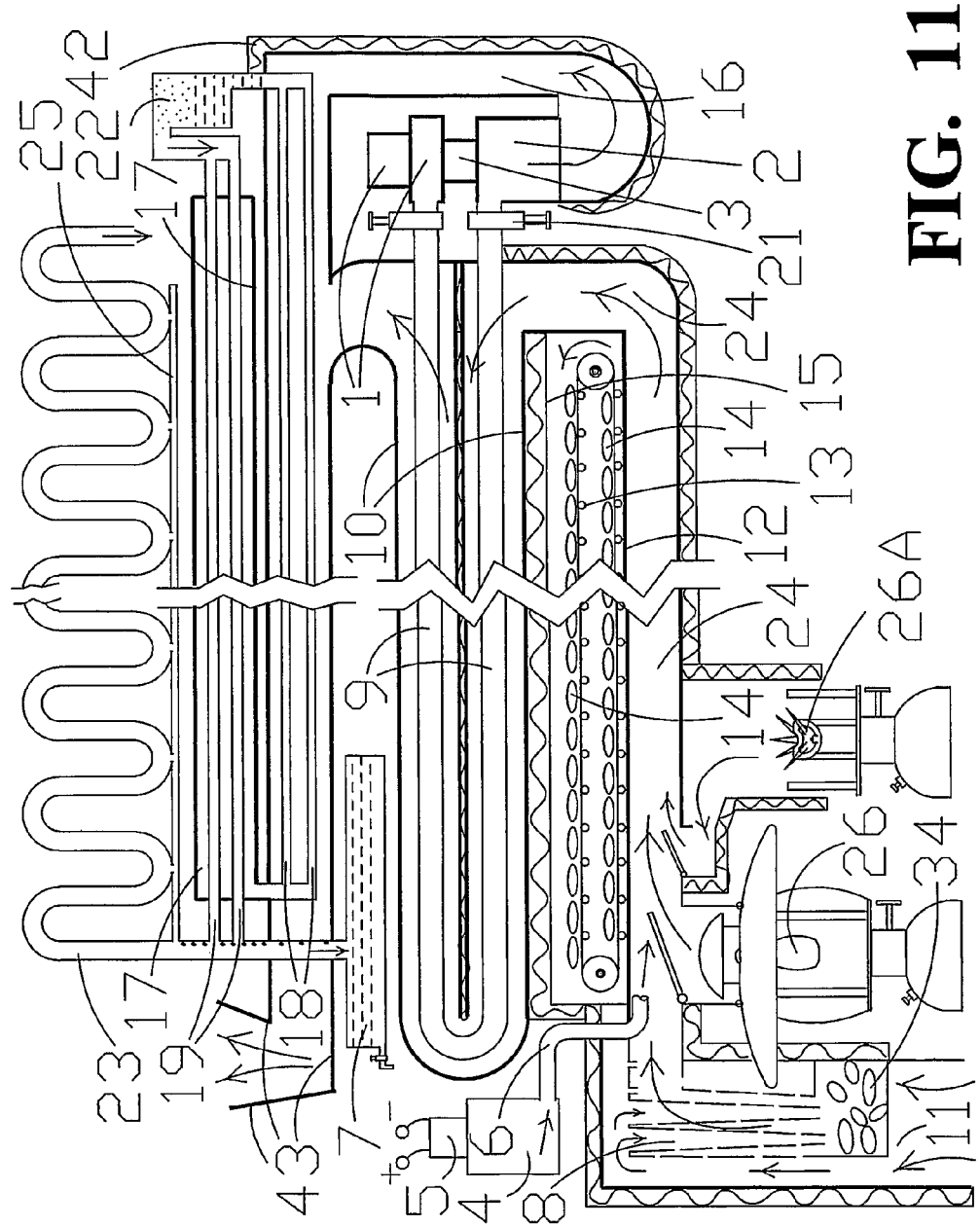

FIG. 11—illustrates a new process of maximizing benefits from various heat sources of the household including oil lamps, kerosene lamps, kerosene stove, gas stove, organic fuel burner, trash burner, and electric generator engine among heat suppliers.

FIG. 11—further illustrates a new invention of a device that adapts various heat sources of the household for cooking/baking, to run a second electric generator, and to run a distillation machine.

Figure 12:
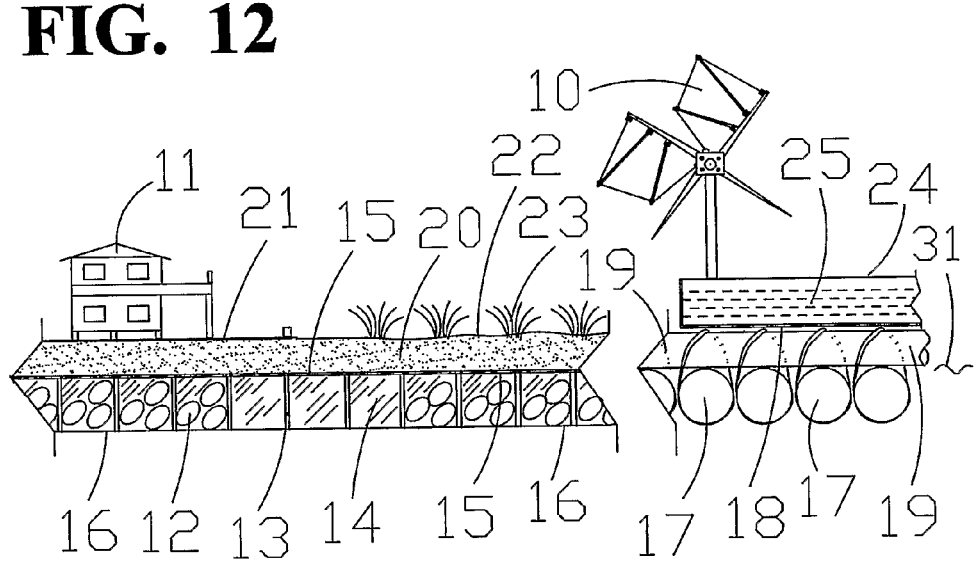

FIG. 12—illustrates new invention of a structure for an ocean agricultural farm and ocean human habitation or human communities settlement on the ocean, powered by hydrogen.

FIG. 12—further illustrates a new recycle use of waste empty bottles and pipes in sausages trapped in array of boxes, serving as floaters.

FIG. 12—further illustrates a new structural design for an ocean platform made by crisscrossing walls with sealed cover plates on top to from arrays of boxes containing trapped air, wherein, the crisscrossing walls serving as stiffener of the floating platform.

FIG. 12—further illustrates a new ocean residence or home with an agricultural land loaded on the floater ocean platform.

FIG. 12—illustrates a new structural design for an ocean platform made stiff by crisscrossing floater pipes or bamboos for carrying or transporting water or serving as footing for ocean structures.

FIG. 12—further illustrates a new crisscrossing pipes distillation structure, wherein, the floater pipes serve as vacuum evaporation chambers operated by hybrid hydrogen engines/windmills.

Figure 13:
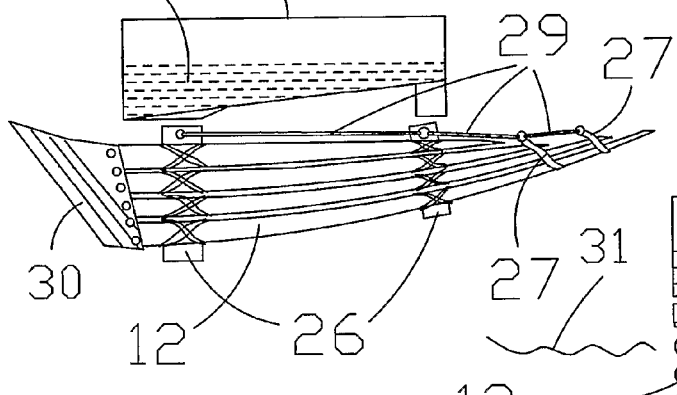

FIG. 13—illustrates a new structural design for a bamboo boat or for floater pipes stacked and clipped together, —to serve as hull of the boat which is powered by said hybrid fusion engines.

FIG. 13—illustrates a new structural design for a bamboo double hull boat, wherein, all the bamboo tips are group together to the far front and bended up to form a pointed nose of the hull.

Figure 14:
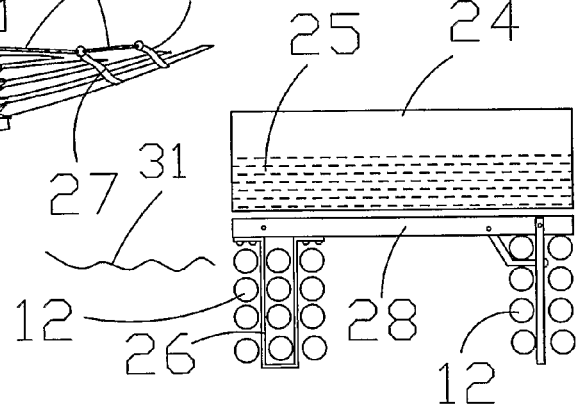

FIG. 14—illustrates a cross-section of FIG. 13 showing the new structural design where bamboos or pipes are clipped together by a vertical post, and further showing how a double hull bamboo boat is structured.

Figure 15:
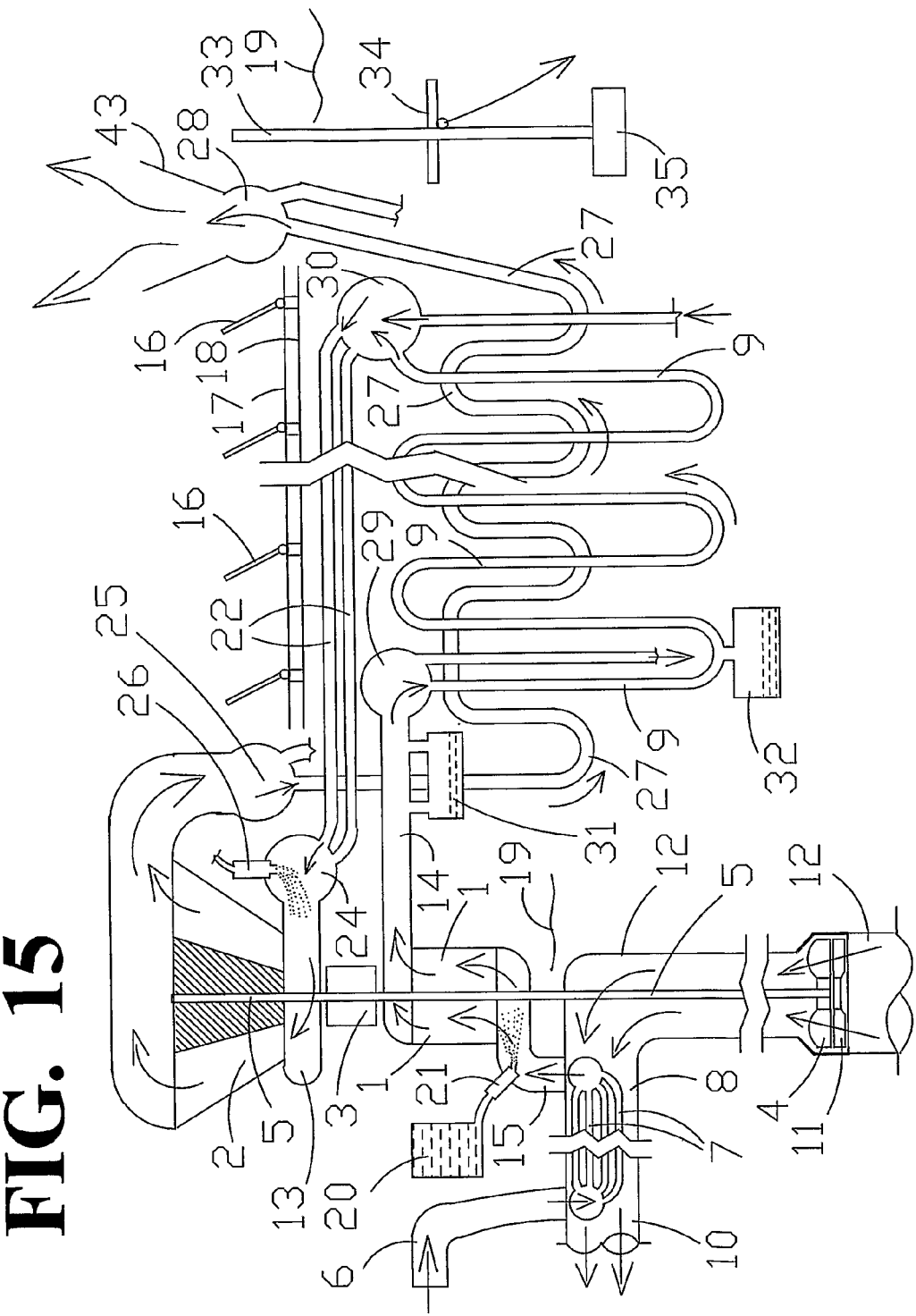

FIG. 15—illustrate a new process and the new apparatus in support of the process of harvesting electricity from the ocean's warm waters serving as source of heat energy.

FIG. 15—further illustrates a new radiator tube design for the maximum utilization of the heat absorbing radiator tubes.

FIG. 15—further illustrates a new design for maximum absorption of the solar heat energy by shiny strips tilted left or right.

Figure 16:
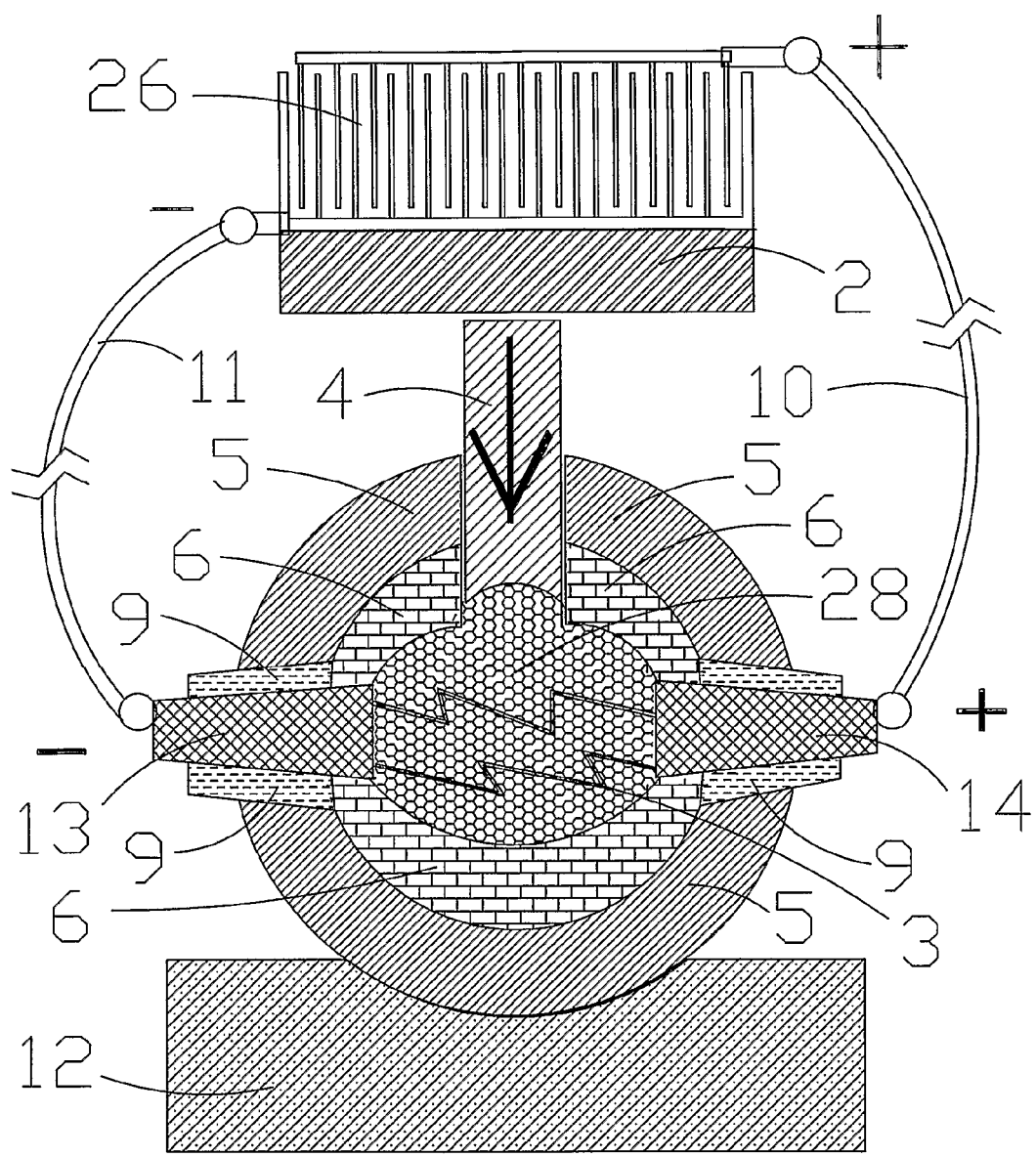

FIG. 16—illustrates a new apparatus that confines the carbon that is melted by strong electric arc to produce diamonds.

Figure 17:
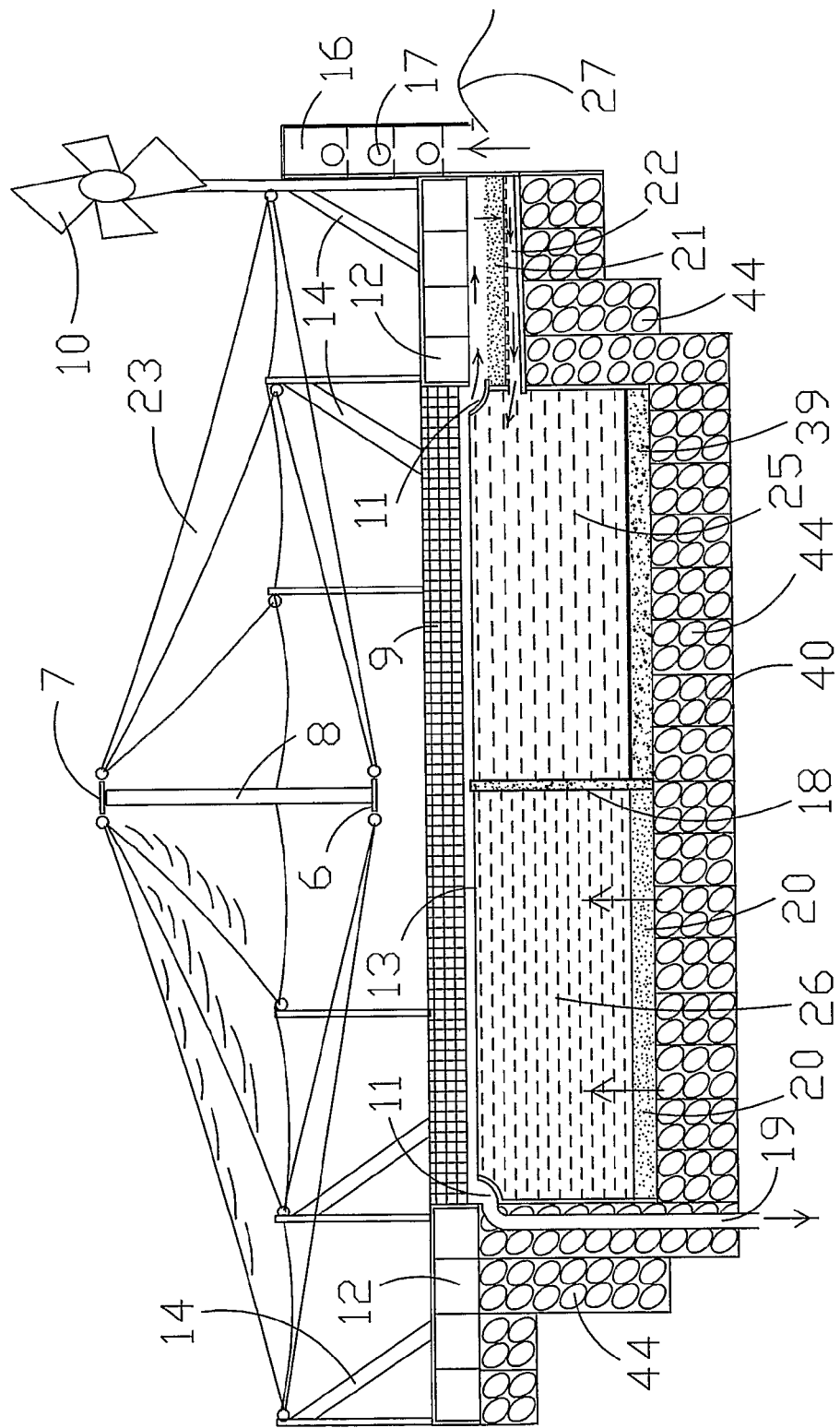

FIG. 17—illustrates a floating swimming pool having a saltwater pool and having fresh water pool all covered by a solar tent, and carried afloat by recycled or empty containers.

Figure 18:
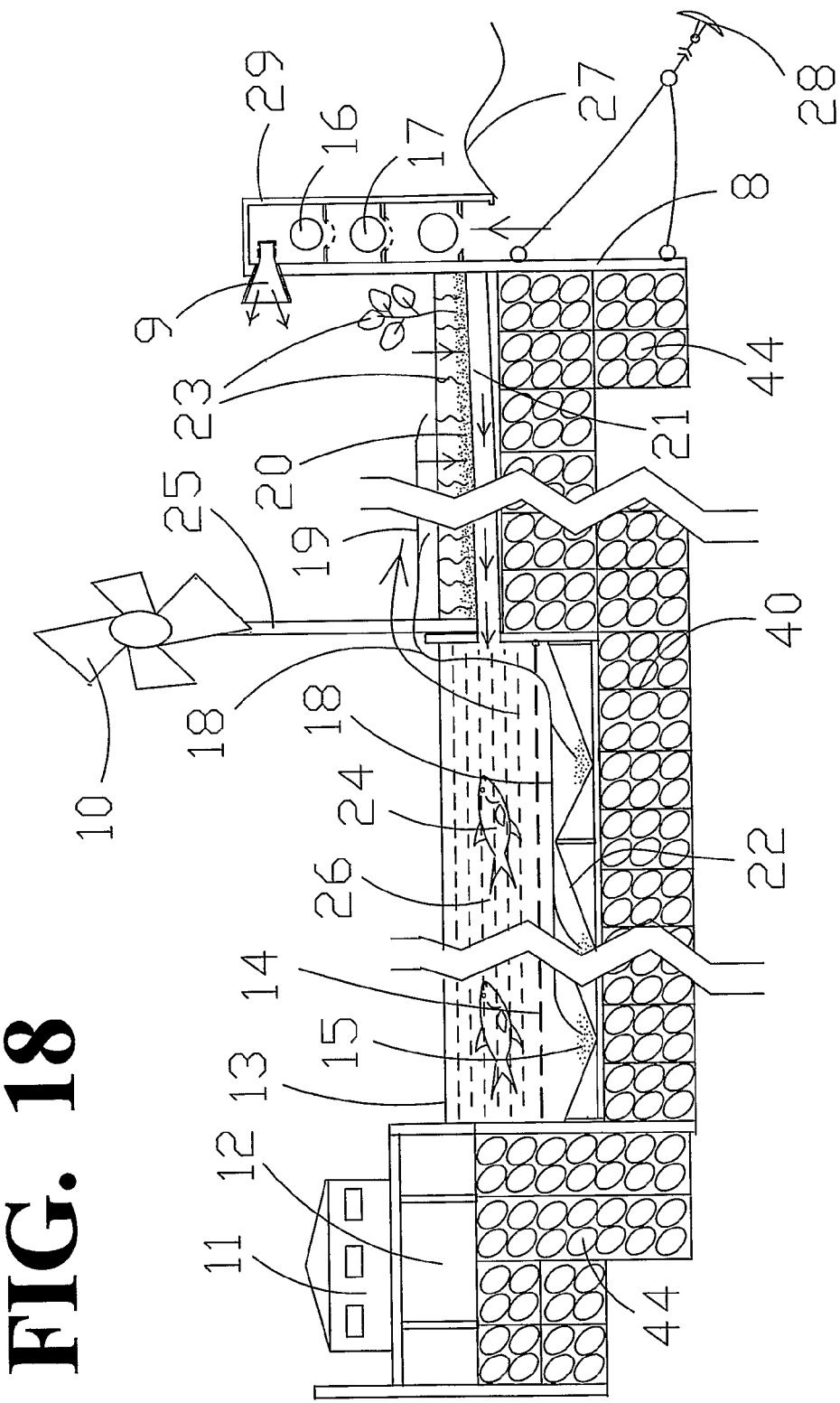

FIG. 18—illustrates a farmland, having a residential house, a fishpond, a plantation land, a windmill, and a water wave energy converter, —floating on water energized by fusion engine.

FIG. 19—illustrates a farmland, having a fishpond the waste product of which is being discharged onto a plantation land in the efforts to clean the water in the fishpond.

FIG. 19—further illustrates how a windmill/fusion engine cleans the fishpond and provides fertilizer onto the plantation land.

FIG. 20—illustrates a monolithic cubicle for a house component molded by molten glass, ceramics, fireclay, rocks, etc.

FIG. 21—illustrates a whole house, having a roof-top fishpond that provides fertilizer to a roof-top vegetable garden, all made up by an assembly of cubicle house components.

Figure 22:
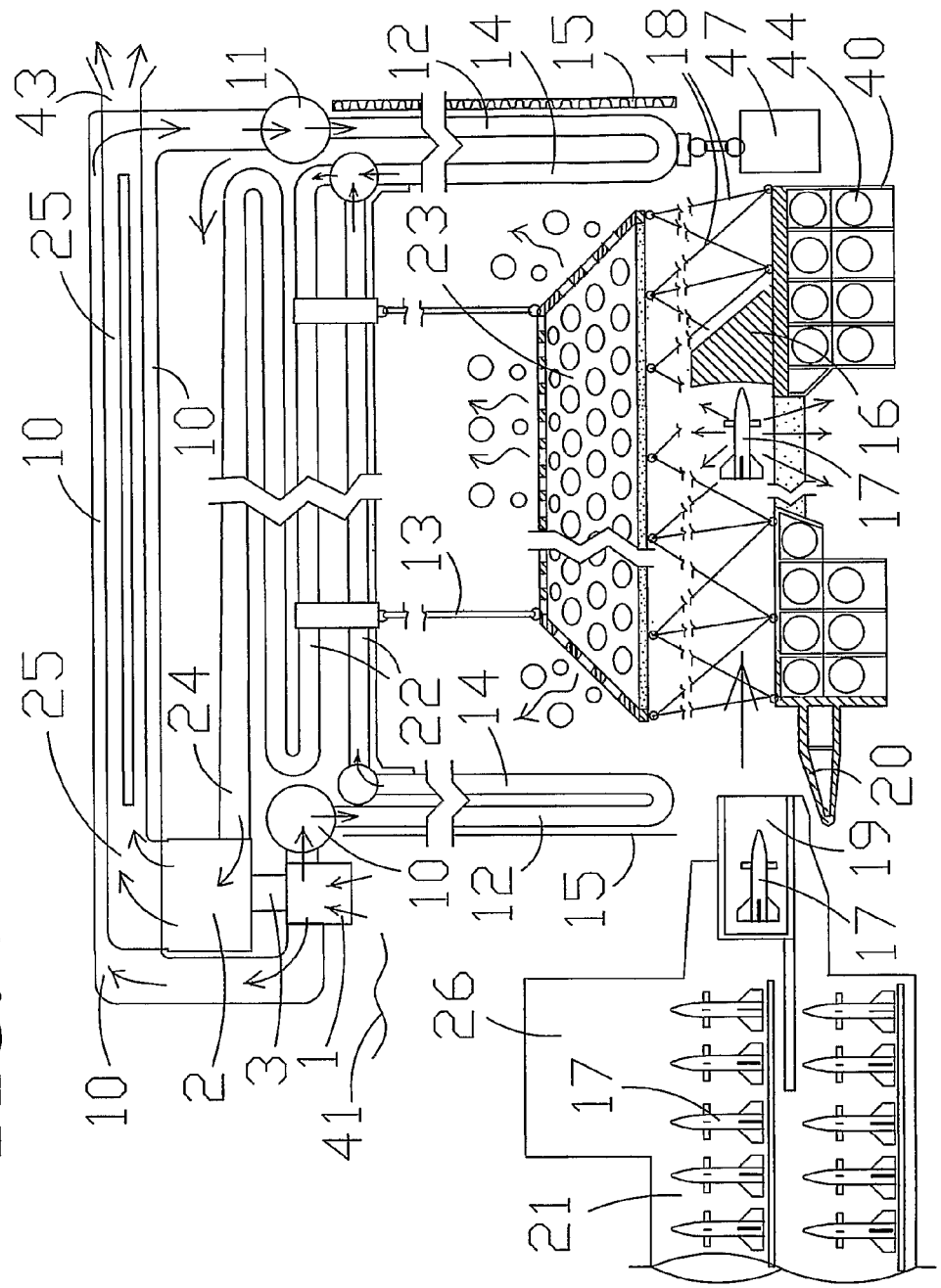

FIG. 22—illustrates a new design for a floating fusion power plant fueled by successive firing of torpedo hydrogen bombs.

FIG. 22—further illustrates how a submarine boat is positioned to fire torpedoes upon an underwater target impact wall.

Figure 23:
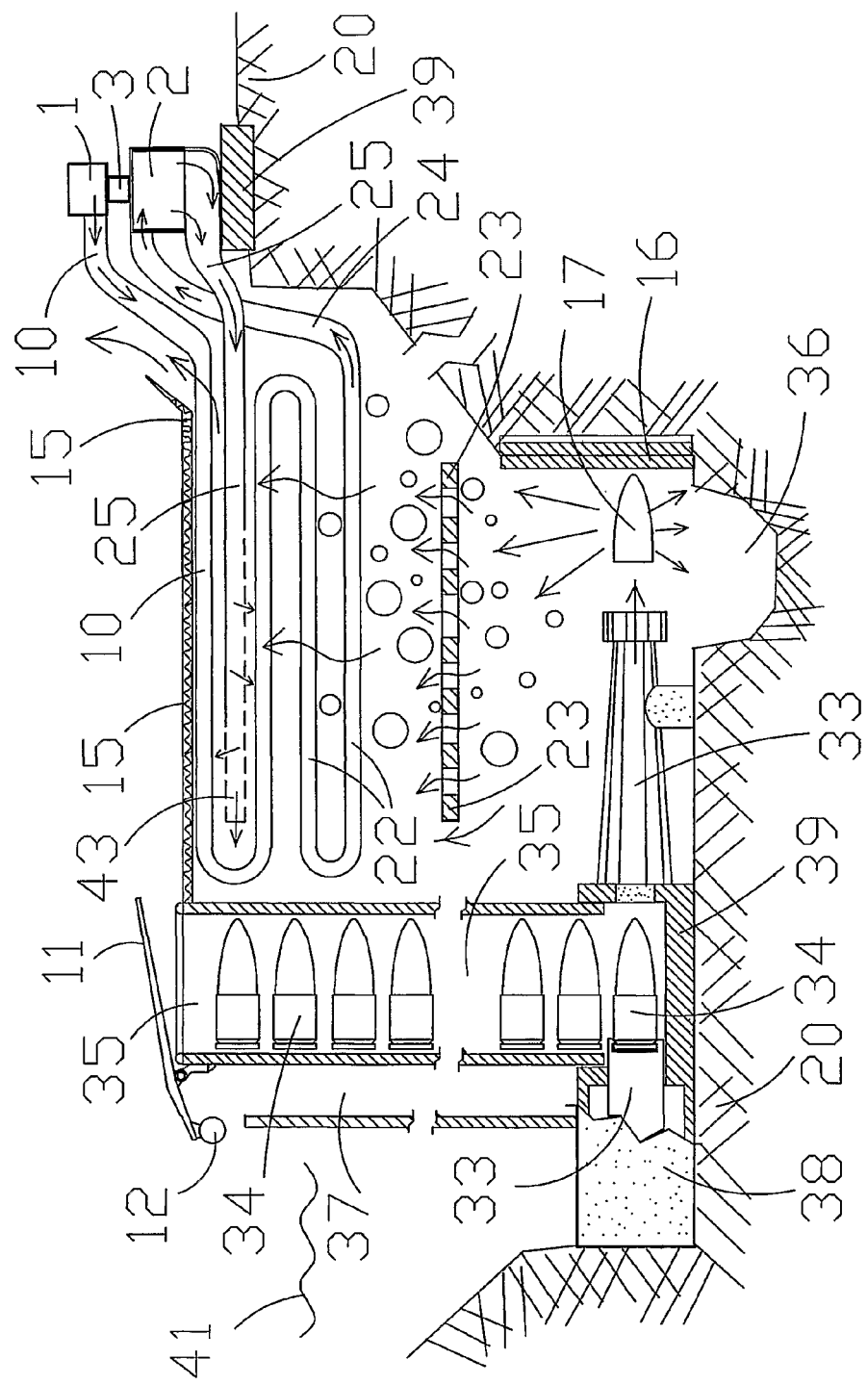

FIG. 23—illustrates how a fusion power plant is built upon a coastal rocky bank fueled by undersea fusion boiler.

FIG. 23—further illustrates how a large canon gun fires deuterium bullets upon an impact wall to sustain fusion flame.

Figure 24:
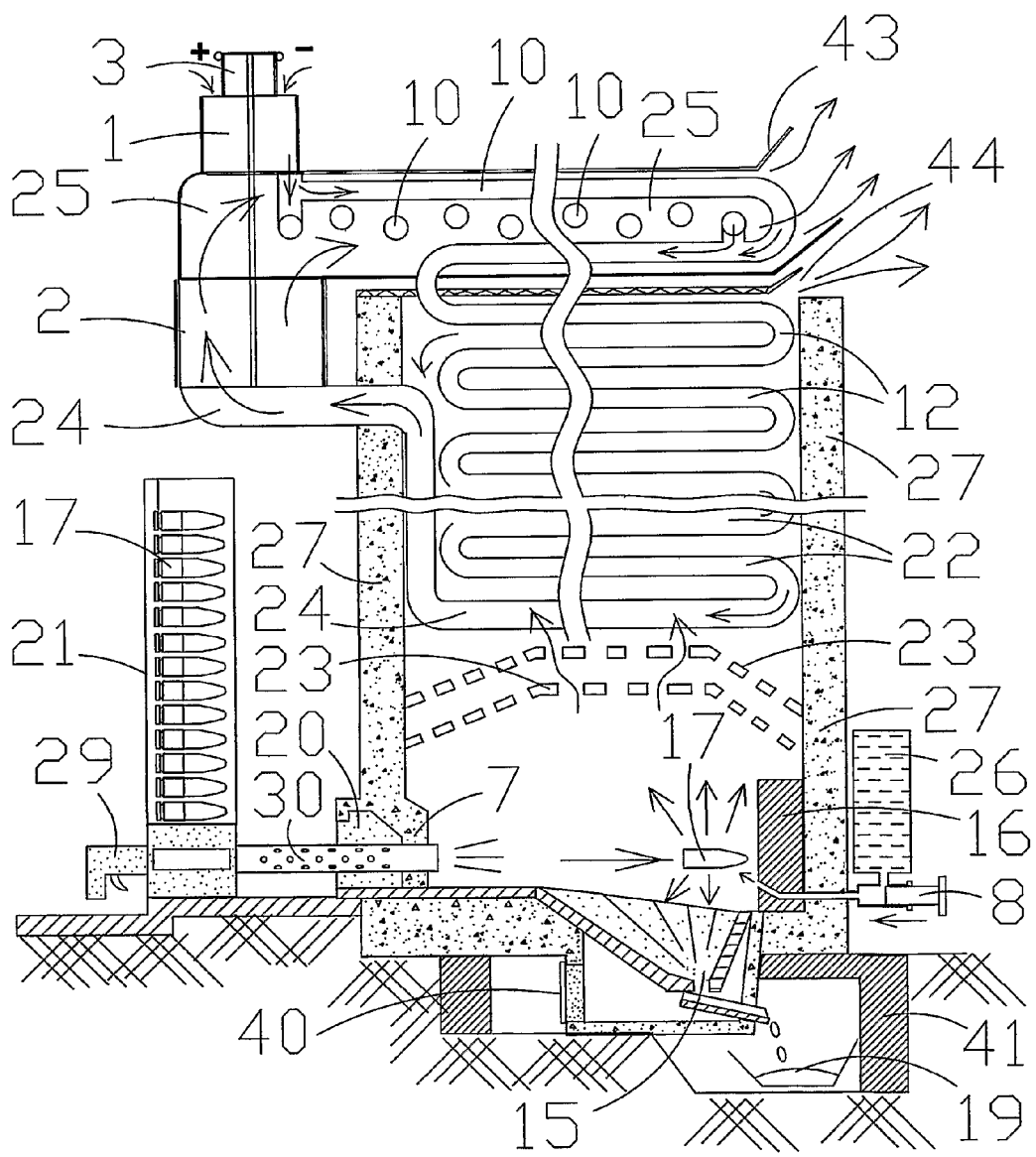

FIG. 24—illustrates how an inland fusion power plant is constructed and a machine gun successively fires fusion bullets.

FIG. 24—further illustrates how a device shoots deuterium into the fusion flame upon detonation of the bullet to sustain the fusion flame without further firing bullets.

Figure 25:
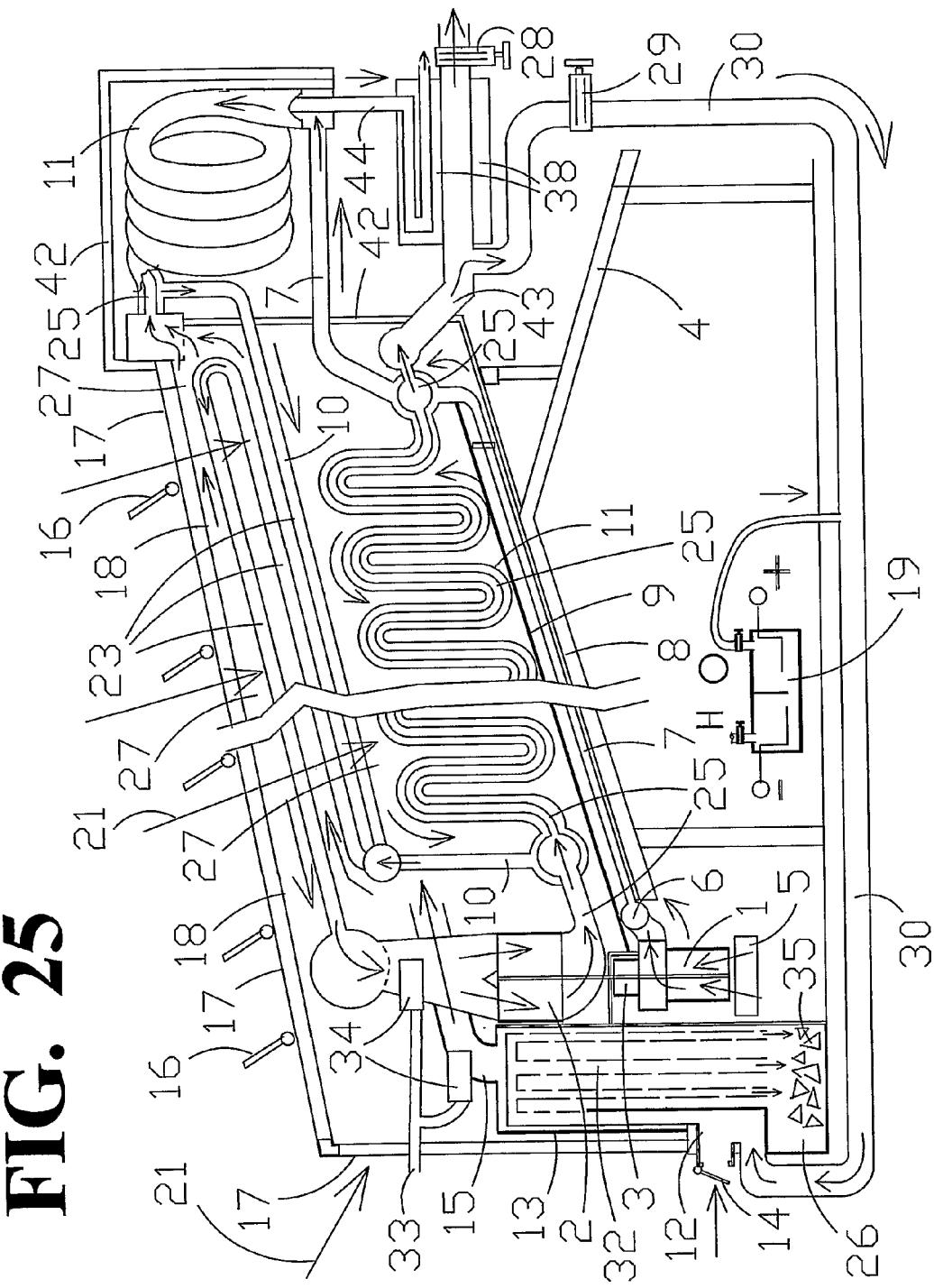

FIG. 25—illustrates how a solar thermal power plant is constructed as a retrofit upon an existing house.

FIG. 25—further illustrates how a smokeless trash burner is constructed to help the solar oven sustain heat energy.

FIG. 25—further illustrates how a fusion torch is used as a catalytic converter at the exhaust of a trash burner.

Figure 26:
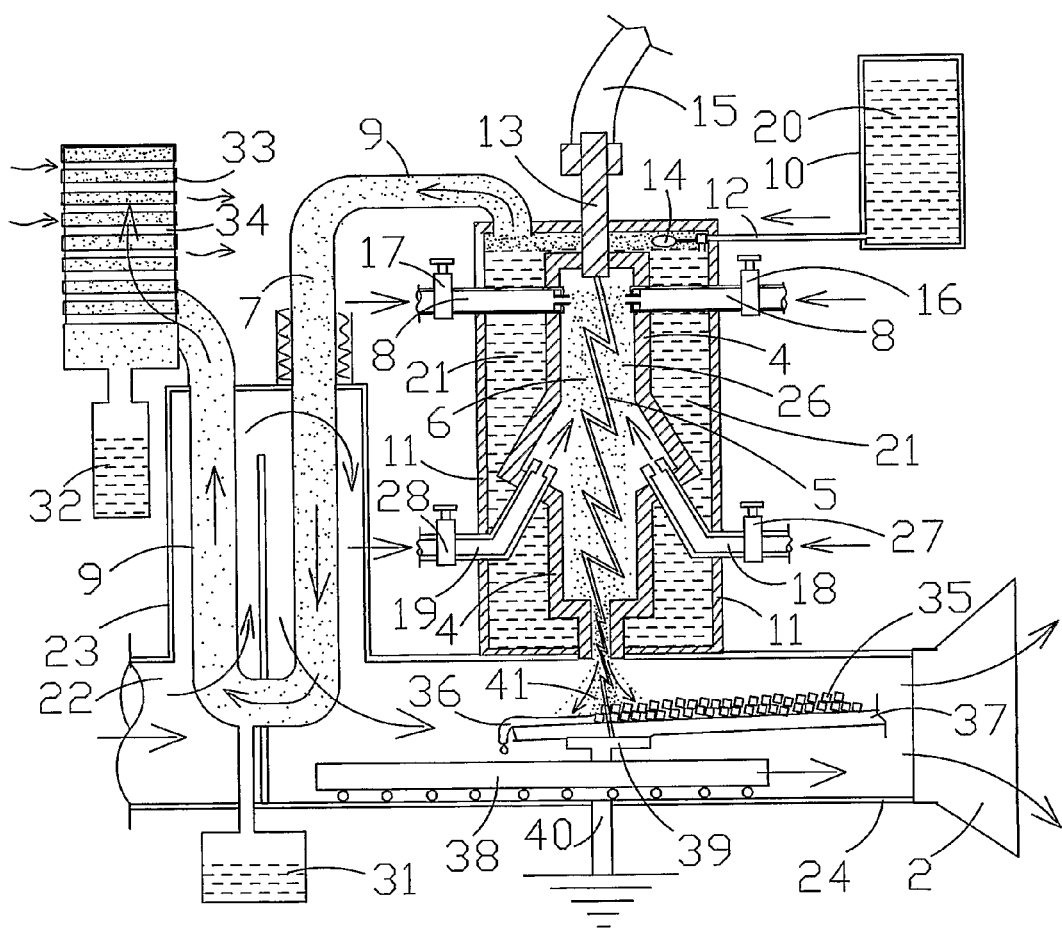

FIG. 26—illustrates a new design for a smelting plant that provides recaptured heat energy for an engine.

FIG. 26—further illustrates a hydrogen/deuterium electric plasma torch wherein a nuzzle shoots high-pressure deuterium into the fusion flame to sustain fusion reaction without electric arc.

FIG. 26—further illustrates how the reactor of the plasma torch serves as water boiler which is required to keep it cool.

FIG. 26—further illustrates a design for a steam condensation tower having wind pipes across the tower chamber.

Figure 27:
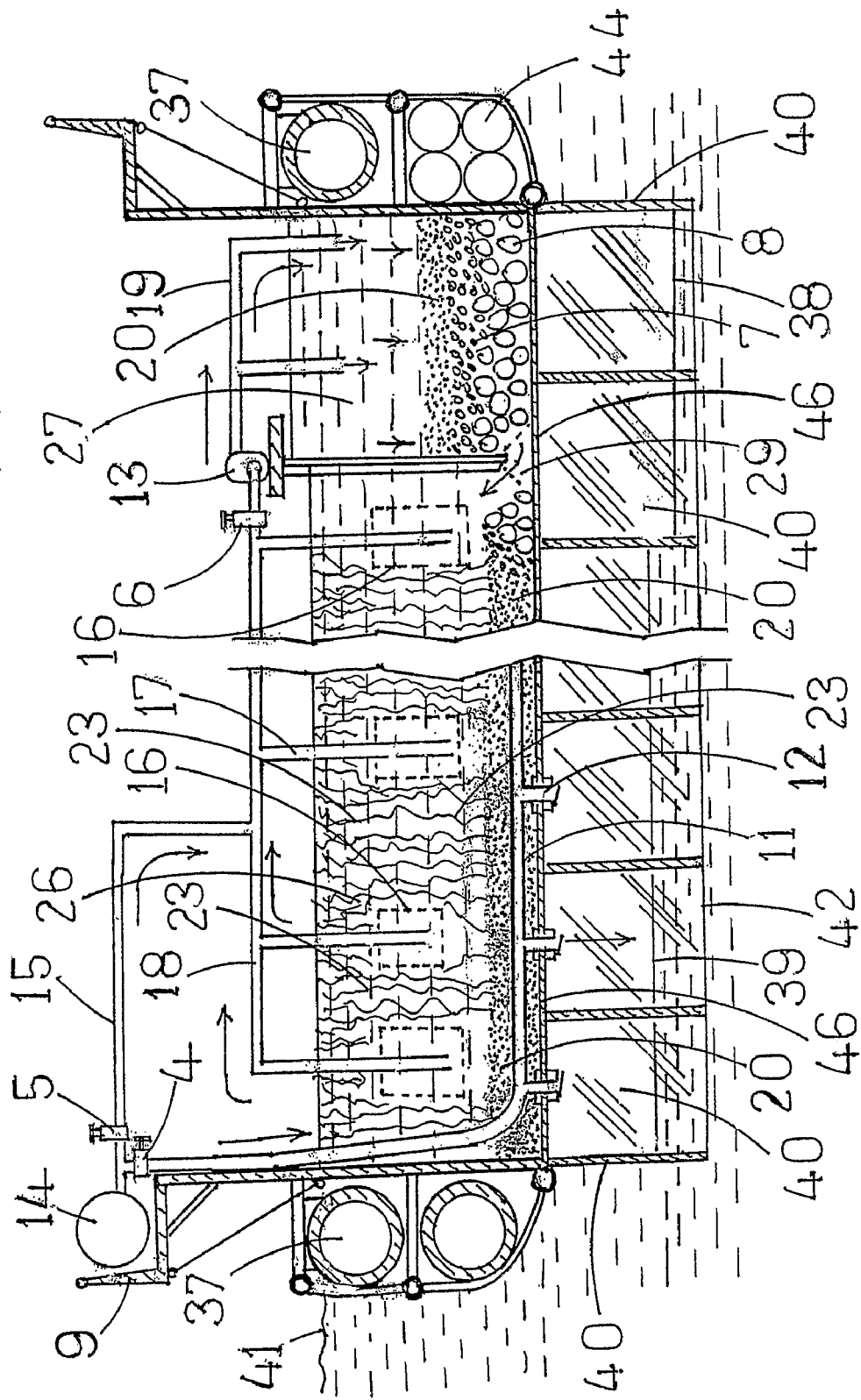

FIG. 27—illustrates a floating shallow box serving as algae growing bed carried by floaters, supplied with carbon dioxide.

FIG. 27—further illustrates a new application for the hybrid fusion engine to drive compressor/vacuum and water pumps.

Figure 28:
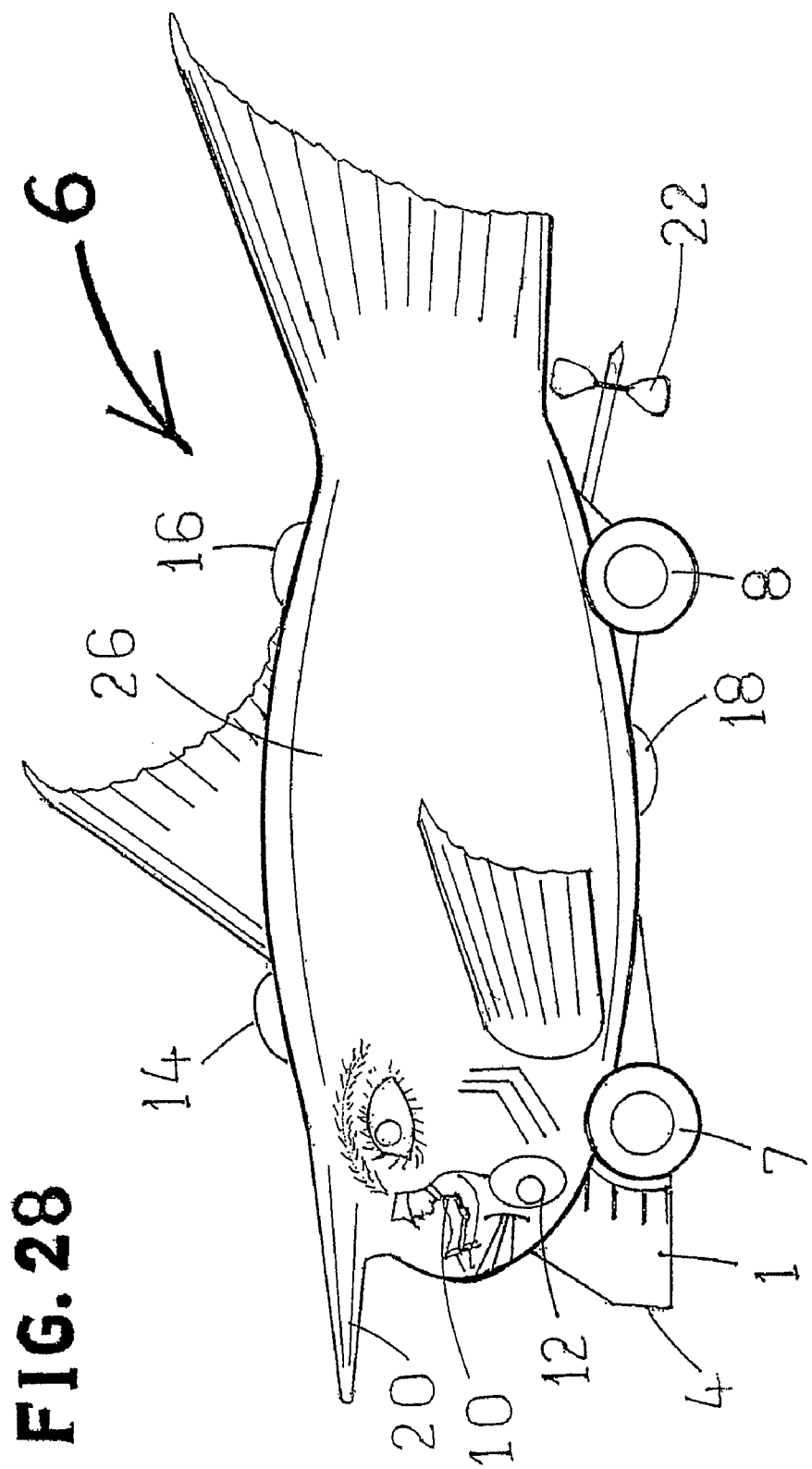

FIG. 28—illustrates an aquarium in the form of a fish on wheels as transportation of live fish using hydrogen fusion engine.

FIG. 28—further illustrates a new usage of the hybrid fusion engine to drive the large transport fish as home underwater.

Figure 29:
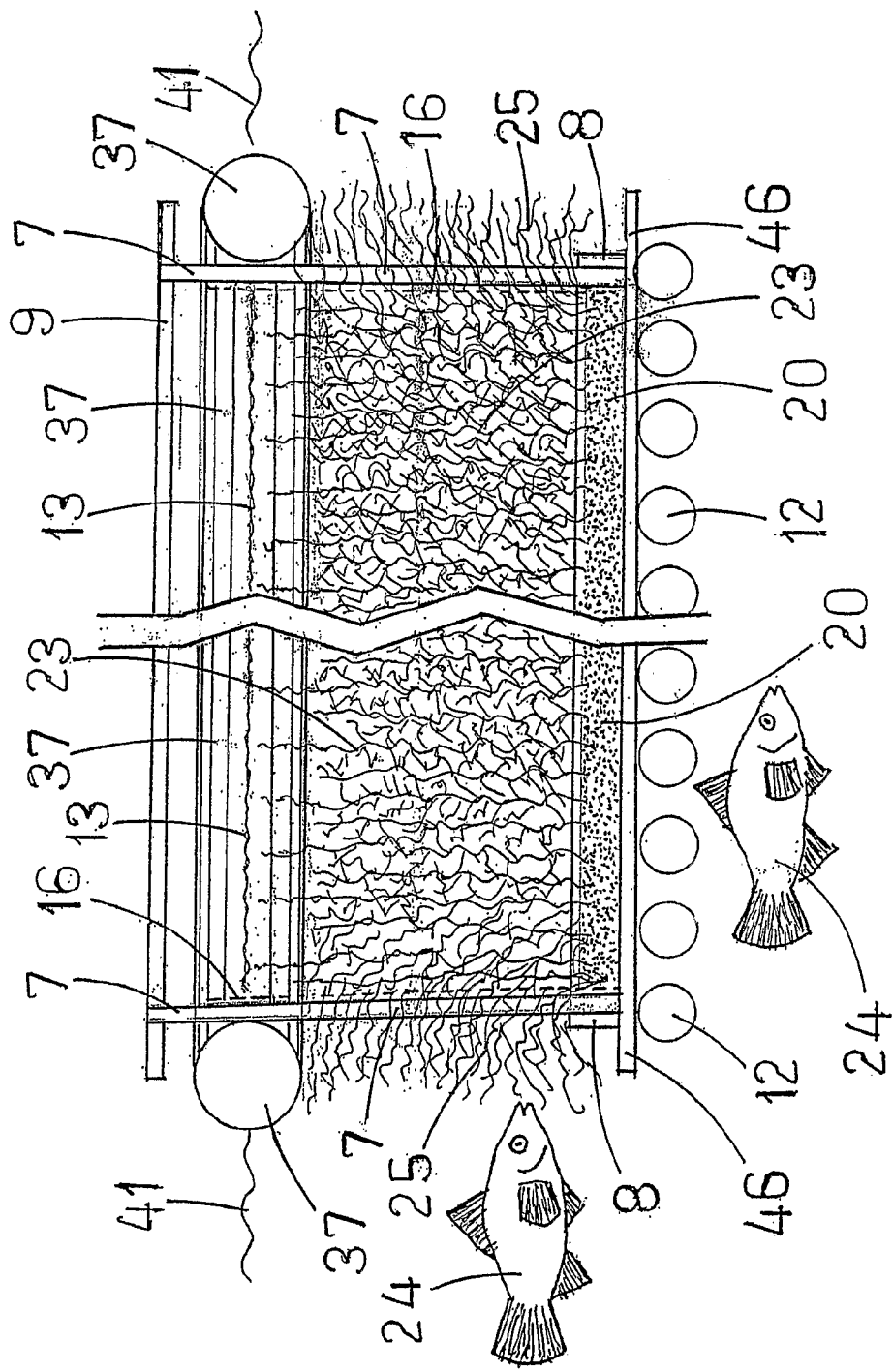

FIG. 29—illustrates a small size floating shallow algae growing bed/cage above turbid water for good sunshine and atmosphere.

Figure 30:
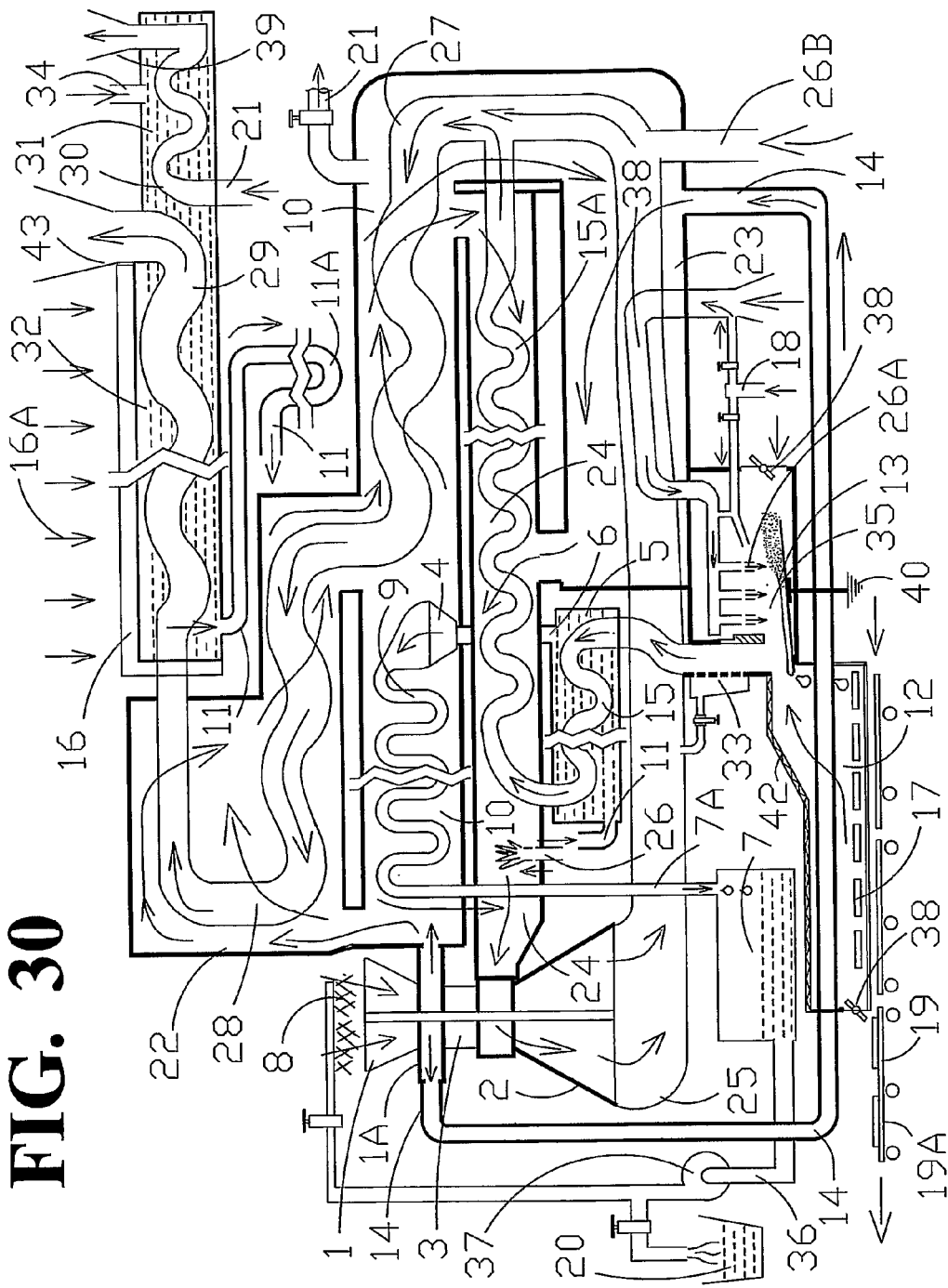

FIG. 29—illustrates an algae growing floating bed/cage with screen/net sidings allowing the algae to grow outside thru the net to provide food for the fish but prevents the fish from getting in FIG. 30—illustrates a newly invented heat recapture and recycle apparatus for a hydrogen-deuterium fuel generator for a clearer understanding and illumination of processes in FIG. 1.

Figure 31:
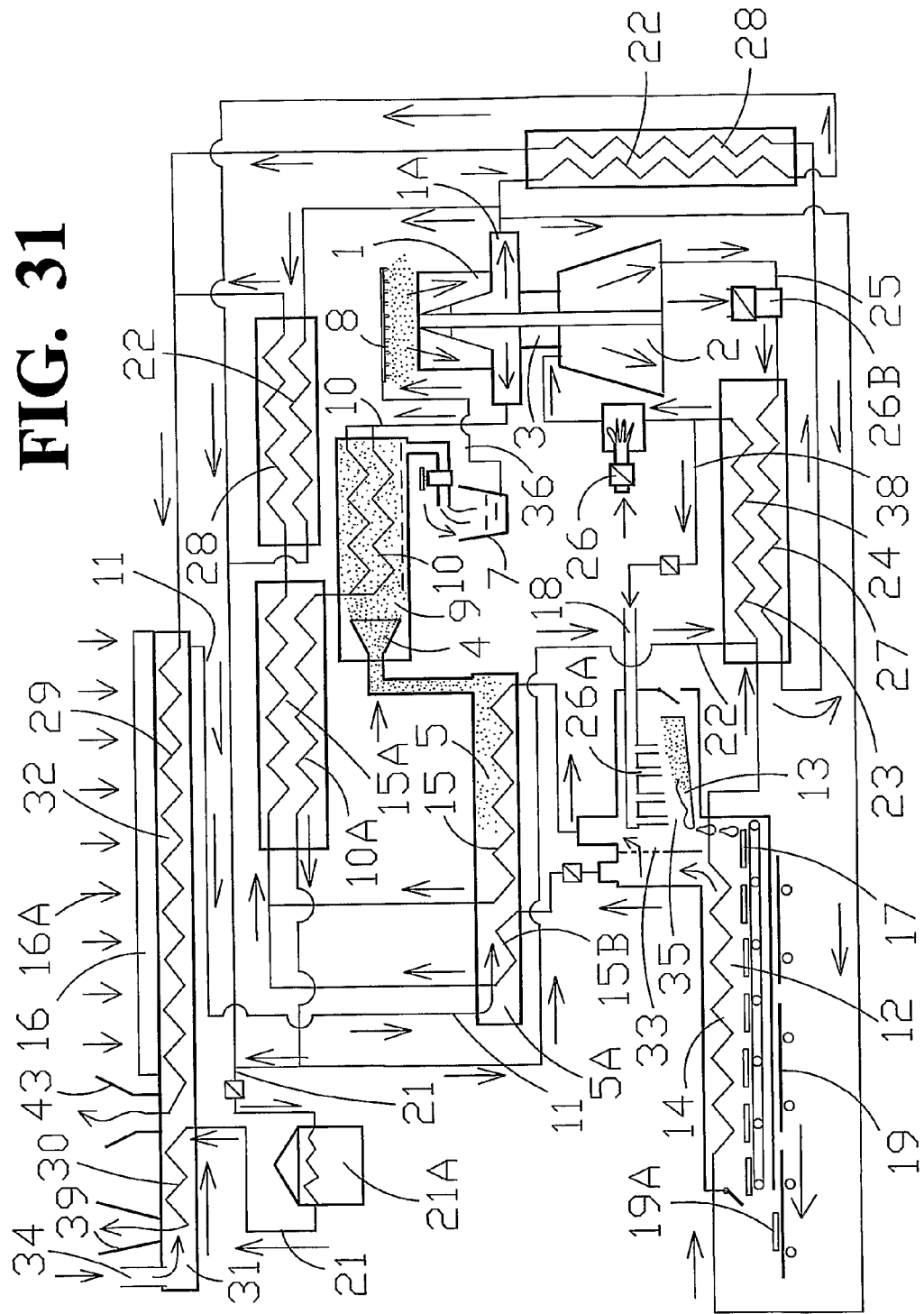

FIG. 31—illustrates a diagrammatic presentation of the various processes for a clear understanding of heat energy recapture and recycle to maximize benefits from fuel, as in FIG. 1.

DETAILED DESCRIPTION OF THE INVENTION

In support to the advocacy and to the missions of this invention, the following new configurations, new embodiments, and new structural and mechanical devices are created to provide the most appropriate technology to handle the processes involved, which can be more understood by further reading the following detailed descriptions of the drawings, to wit:

FIG. 1—illustrates a new embodiment for a new innovative power plant displaying the most advance technology in maximizing benefits out of any kind heat source or any kind of fuel being spent, wherein, a cold compressed-air header duct 10 is communicated to a plurality of branches so that a multiple parallel and series of various kinds of heat-absorbing radiators of small tubes/pipes serving as energy collectors, parts 9, 12, 13, 14, 15, 16, 17, 18, 19, are communicated and able to conduct the cold compressed air supplied by the main compressor 1, which is either a wide face bladed turbine model or a piston-chamber model, thru the air duct 10. It should be noted at this point that it is hereby singled-out and extremely emphasized that this is a new idea of use and application of the radiator tube assembly 9, etc., wherein it is now used to absorb heat energy instead of the usual use of dissipating or throwing away heat energy to the surrounding atmosphere. This emphasis was not pointed out in my previews patent where the radiator was already used to absorb heat energy. The compressed air is pushed thru across the above named radiators for pre-heating and further passed-on said air into the air duct 11 which, in turn, supplies the already pre-heated compressed air, at this point, into the heat-absorbing radiators 22 and 23, which then supplies the already superheated compressed air, at this point, into the power air duct 24. The super hot compressed air in the power air duct 24 is communicated to push out the power turbine 2 which is also either a wide-face bladed turbine or a reciprocating piston-chamber model, and which, in turn, drives the electric generator 3 and also drives the compressor 1. It should be noted at this point that, in the case where the engine is a reciprocating piston-chamber model, the compressor piston is much smaller than the exhaust piston so that the larger exhaust piston is push-out while the smaller compression piston is pulled-in by the larger piston to effect compression.

It is hereby extremely emphasized that the cooler is the radiator tube, the more hungry or more efficient it is in absorbing heat, or the more heat absorbing power it has. Additionally, the more humid is the air inside the tube/container, the more heat energy it will absorb. This means that the water, being a matter that expands when heated and mixed in the air, provides more expanding power for the heated compressed air. Wherefore, an abundant pure cold water mist 8, is sprayed into the air at the intake of the compressor 1. It is hereby extremely emphasized further that the water mist is a super charger or turbocharger because it makes the air very cool and very humid. Cooling the air is making the air more compact and adding water into the air is further making the air more compact or pre-compressed, hence, this process of adding water is actually turbo-charging. Thru the air duct 10, the compressor 1 supplies cold compressed air into the radiator 9 which must be in the form of a plurality of radiator steam tubes each air tightly communicated to the exhaust of the fuel cells by means of a header pipe, containing and conducting the super hot steam expelled by the fuel cells 5.

It is hereby extremely emphasized that for purposes of maximum absorption of the heat energy, each of these steam tubes is submerged into the super cold/humid running compressed air contained in another corresponding radiator cold-air tube in order for the cold compressed air to absorb the heat energy in even distribution, which otherwise would be wasted by the fuel cell 5, and to condense same hot steam into pure water being deposited into the water tank 7. The same steam tubes in radiator 9 also contain and conduct the super hot steam being expelled by the steam engine 4 and also condenses said super hot steam into distilled water, in addition to the mission of the cold compressed air to absorb the otherwise wasted heat energy expelled by the steam engine. It should be noted at this point that alternatively, for easier construction, the steam from the fuel cell and/or steam engine does not have to be passing inside the radiator tubes of the compressed air, wherein, in this alternative, the hot steam is just distributedly released thru plurality of windows into a large header low pressure pipe which encloses a plurality of spacedly assembled cold compressed air tubes 9 that absorb the heat. The cold compressed air radiator tubes are installed inside of and parallel to, the hot steam header pipe to effect condensation of the steam into distilled water. The steam tubes deposit the distilled water into the tank 7 which re-supply the distilled water into the boiler of the same steam engine. The tank 7 also supplies pure water to the water misting nuzzles 8. It should be noted further that the plurality of cold air tubes may just be spacedly submerged in the large tail steam pipeline/duct to directly absorb heat energy from the steam running/circulating around the steam duct, although this arrangement is not the most efficient heat exchanger. The radiator 9 consists of a plurality of steam tubes each inserted into inside a corresponding cold compressed air tube so that the running cold compressed air picks up the heat energy out of the running hot steam and condenses same steam into distilled water for recycle use.

It should be noted further at this point that this radiator-means of absorbing/collecting heat energy outside the engine has been disclosed and demonstrated in my previous U.S. Pat. No. 6,327,994 B1, but it has not been specifically singled out in the claims, and further, was not specifically disclosed that the hot radiator tube is inside the cold radiator tube or vise versa, hence, this heat absorbing radiator is now further improved and specifically disclosed in this present invention for clarification and for a wider variety of new applications of this radiator.

After passing thru radiator 9, the cold compressed air is now in the pre-heated state and communicated to proceed into the pre-heated air duct 11 which in turn pass-on the pre-heated compressed air into the super heating radiators 22 and 23.

The branches of air duct 10 are provided with entrance gate valves 21 to close the corresponding air duct branch in case heat energy is not available in those branches. The heat absorbing radiators 12, 13, 14, 15, 16, 17, 18, 19, and 22 are constructed in the same kind of structure as the radiator 9 for maximum heat absorption efficiency. The radiators 12, 13, 14, 15, and 16 are connected to absorb low temperature sources of heat energy, such as the exhausts from: freezers, chillers, refrigerators, dehumidifiers, water heater heat exhaust, fireplace heat exhaust, geothermal heat, any kind of hot water/liquid including the surface of the ocean/desert, solar heat, and including but not limited to heat energy produced by underwater detonation of hydrogen bomb and underground detonation of hydrogen bomb. In the case where the hydrogen bomb is detonated underwater, the heat absorbing radiator is placed submerged under the hot water and over the hot water in order to be exposed it to the heat energy. In the case where the hydrogen bomb is detonated under ground, then the radiator is placed over the ground enclosed by a roof with walls to prevent the wind from stealing the heat energy.

The radiators 17, 18, and 19 are connected to absorb high temperature heat sources, such as, but not limited to the exhaust from fuel cells, heat exhaust from internal combustion engines fed with hydrogen-deuterium-tritium, heat exhausts from ceramics/glass kiln/furnace-annealing, heat exhaust from coal-distillation or coke oven heat, heat exhaust from gas turbine engines, which are hereby extremely emphasized as new idea applied for patent protection, to be fueled by powdered solid organics including but not limited to wood, paper, coke, charcoal, waste oil, trash etc. Additional heat sources for the above radiators 17, 18 and 19 include the heat exhaust from glass/ceramics/metal smelting, and heat exhaust from smokeless trash burning ovens. It is further extremely emphasized that smokeless trash burning is attained: (1) by pre-superheating the supply oxygen air thru recapturing the heat in the exhaust chimney which means that intake manifold pipe is inserted inside the chimney and directed towards the combustion chamber, (2) by distributing the hot oxygen air into the base of the fire, into the middle level of the fire, and into the top portion of the fire in order to oxidize the unburned gas fumes thru plurality of nozzles/holes made along the length of a plurality of air delivery tubes/pipes leading into the fire, and (3) by burning the trash from the top in the same way as in burning the candle from the top, —of which above new ideas of conditions are hereby applied for patent protection.

It is hereby extremely emphasized further that it is my new idea hereby applied for patent protection, that powdered organic solid matter, such as, coal, coke, charcoal, wood, paper, dried leaves/grass, and powdered trash are feed in the gas turbine/jet engine by mixing same powder into the air intake or by injection said solid fuels into the compressed air duct, which mixture passes thru a burning pile of solid lumps 34 of coal/coke or charcoal or torch or wood.

It is further hereby extremely emphasized that it is also my new idea for this invention for patent protection that it is extremely important to feed hydrogen-deuterium to an ordinary internal combustion piston-type gasoline engine 26A wherein the deuterium is subjected to the action of electric arc spreading around the chamber by a hybrid sparkplug, which is the same principle as the plasma torch 26 or hydrogen-plasma electric welding, in order to achieve fusion in the combustion chamber in order to provide, via tailpipe 26B, abundant heat energy in the radiator tail pipe 25 and in the engine's 26A water/air cooling radiator system that supplies heat to the radiator 9. As the same new idea, this same hydrogen-deuterium-tritium fuel must also be fed in gas/liquid form to a diesel engine, wherein, it is hereby extremely emphasized that each chamber of same diesel engine is provided with a plurality of hybrid sparkplug that spreads electric arc thru/across the injected super-compacted deuterium fuel around the chamber in order to attain fusion in the combustion chamber. It is further hereby extremely emphasized that the same hybrid sparkplug has no cathode for the purpose of making larger electric arc that jump a longer distance from the chamber to the anode of the sparkplug, —of which new idea is hereby applied for patent protection. The electric-plasma torch is also hereby extremely emphasized as a highlight new idea for this invention in using fusion energy for smelting furnaces for glass houses, steel/metal, ceramics, calcium carbide, etc, in order to produce abundant clean heat energy as by-product of manufacturing, —to heat up the compressed air in the radiator.

The water tank 20 stores the pure water that has been condensed by the radiator 17 out of the steam expelled by the fuel cell 5. The radiator 22 is connected to absorb high temperature heat energy from fuel combustion chambers, such as, trash, coal, charcoal, coke, powdered solid matters, liquid fuels, gaseous fuels, hydrogen, deuterium, nuclear fusion, hydrogen bomb detonated under water or confined water, and hydrogen bomb detonated in underground water, wherein, the radiator 22 is submerged in the hot water or steam or in the same way as radiator 9 is constructed. It should be noted at this point that fusion is attained by the principle illustrated by the tokamak compression chamber or the doughnut shaped turus, which compression is alternatively easily attained by detonating a dynamite that is submerged in a liquid hydrogen-deuterium-tritium, or alternatively thru plasma ionization by passing a lightning/electric arc discharge thru/across a gaseous/liquid hydrogen-deuterium-tritium which is the same process used in the hydrogen-electro-plasma-welding. Part of the resulting heat energy from fusion is used to smelt glass, ceramics, clay, earth, rocks/stones, sand, steel and metals and then the heat is recaptured during the annealing process by means of the heat absorbing radiator 22, —and out of the above ideas, it is therefore hereby extremely emphasized that it is my new idea of a process, which is hereby applied for patent, —to smelt glass, ceramics, and metals by using fuel hydrogen-deuterium electric plasma torch or fusion energy to melt the glass, ceramics, and metal, and wherein the molten glass/ceramics/earth/clay/stones are poured into large molds to form large house cubicles/sections/rooms, structural building components, high voltage capacitors/energy banks, floating chambers/containers, hydrogen-deuterium fuel storage tanks, and large water fish ponds/vessels/boats and swimming pools, which are assembled into houses and buildings for habitation on the land and habitation structures on the ocean, and base for floating windmills on the ocean, it being resistant to salt water, by which method, these presented new processes and new uses and/or functions of glass and ceramics are hereby newly created and hereby applied for protection by letters patent.

This invention presents new ideas hereby applied for patent, including a new designs of hydrogen bomb which is extremely different and distinct from the prior art in that: (1) the gaseous or liquid hydrogen-deuterium-tritium is contained in a container/capsule having opposite internal electrodes thru which a discharge of lightning or electric arc is passed across thru the liquid deuterium as means to attain fusion of the deuterium; (2) In another alternative new distinct invention of a new design of hydrogen bomb now presented, is that the deuterium is enclosed in a soft container/capsule which is surrounded by dynamites and the resulting assembly is totally enclosed by a strong container to produce super high pressure upon the liquid deuterium. The deuterium attains fusion by implosion as a result of the explosion of the surrounding dynamites; and (3) In another alternative new design of hydrogen bomb as means to attain fusion is that the soft capsule containing liquid deuterium is placed at the bottom of a strong cylindrical container into which a rod or piston is driven down on top of the capsule by a large drop hummer to compress the capsule to the maximum in order to fuse the deuterium inside the capsule in order to attain fusion. All of the above alternatives must be done underwater or underground in order to capture the high temperature heat energy into the water where the radiator 22 is submerged. The advantage of this capsulation process of fusion is that the firing is do-able in rapid succession. Note that in support of the capsulation process of producing liquid deuterium, it is my new idea as a highlight of this invention hereby applied for patent protection—that the capsule itself is made part of the electrolysis process device in separating the deuterium from the oxygen, wherein, the device is filled up totally full without air gaps with heavy water, and then the direct current is applied without allowing expansion due to production of gases. Hence, the deuterium and the oxygen will remain liquid without the use of any kind of compressor and without additional expenses. Note that cold fusion may occur during this process, but since it is done under deep waters to capture the heat energy, it will be safe for the operator because it is done by remote control.

The radiator 23 is a heat-absorbing radiator device and a multiple tube containing low temperature compressed air, are placed inside the engine's exhaust tail pipe 25 and submerged in the hot gas inside the tail pipe 25 to absorb the heat energy of the tail pipe 25 while the compressed air inside the radiator 23 is on its way to push the power turbine/piston 2, which energy would otherwise be wasted. The tail-pipe heat energy is therefore recycled to re-drive and re-drive the power turbine 2 or engine which expelled the same heat energy, which scavenger process demonstrates the highest fuel efficiency ever created.

Additional heat energy generators, such as hydrogen-deuterium/coke/wood/organics burners are placed inside the third $3^{rd}$ heating stage power air duct 24. This burners are supplied with a combination of super pre-heated oxygen-air 32 and superheated organic vapors 33 out of wood/trash distillation 38 by passing the combination thru multiple tubes 23 placed inside the main tail pipe 25 to superheat the fuel and the oxygen. An additional heat energy contributor fusion-oven 26 is placed into the $3^{rd}$ heating air duct 24 wherein the electrolysis device 31 supplies deuterium into the diesel/gasoline/deuterium engine 26A and into the plasma electro-fusion torch/oven 26 which electrocutes a stream of pre-superheated deuterium in order to supply fusion heat into the $3^{rd}$ heating duct 24. The diesel/gasoline/deuterium engine 26A supplies heat energy by its tailpipe 26B into the main tailpipe 25 wherein the radiator 23 recaptures the heat energy expelled by the diesel/gasoline/deuterium engine 26A. The electric generator 3 supplies direct current electric power to the electrolysis device 31 for the constant production of deuterium to feed the deuterium engine 26A and to feed the electro-fusion torch 26. Note that the deuterium-containing supply tube is coiled around the combustion chamber or fusion oven 26 in order to superheat the deuterium before the deuterium gets out of the nozzles and hit by electric arc in high density pressure state in the oven, duct 24 being in high pressure.

The superheated air-water vapor then push out thru the power turbine 2, and then same hot air exhausts into the tailpipe 25 thru across the radiator 23 that powers the reciprocating piston engine 28. Note that the large piston 28 is more powerful than the small piston 27 which is therefore driven thru the connecting rod 29 in order to inject compressed air into the heat absorbing radiator 23. The superheated compressed air then push the larger piston 28 and exhausts thru the tailpipe 30 which communicates with the pre-heated air duct 11 to recapture the exhaust heat.

The superheated air-water vapor/gas then proceeds thru the tailpipe 25 where it heats up the deuterium supply tube, heats up the organic gas supply tube 33, heats up the oxygen-air supply pipeline 32 to provide high efficiency combustion to the lumpy fuel 34, heats up the heat absorbing radiator 23 which is inside the header air duct 24, heats up the small radiator 23, located at the far down stream of tail pipe 25, that powers the small gas turbine engine 1-2-3 which exhaust thru the water heater 36 which in turn deposits hot water into the water tank 37, —then same hot gas heats up the radiator 23 that provides hot air to the heating system 34 and 35 of the building, —then same hot gas heats the wood/trash distillation oven 38 which supplies organic gas thru pipe 33 and also supplies organic gas into the cold chamber 39 which liquefies the organic gas, —then same hot gas heats the trash drying conveyor 40 which deposits dried trash into the bin 41, and finally, the waste air, which at this point is now just a warm air, exits thru the exhaust chimney 43 which is communicated to an air cleaning device as illustrated by FIG. 2. The chute 44 supplies trash into the trash drier conveyor 40. It should be noted at this point that the unburned gases from the oven of the lumpy fuel 34 and the excess hydrogen/deuterium from the oven 26 are further oxidize to a clean burn by the super-hot clean oxygen-air from the radiator 22 and from the radiator 23 thereby producing more heat energy.

It is hereby extremely emphasized further that it is my new idea, hereby applied for patent, that charcoal which does not melt, either powdered or granulated, is a very effective very low cost heat barrier or insulator, hence, the heat insulator 42 is made of charcoal wrapped around the tail pipe 25 to maximized conservation of the tail heat energy. An additional heat conservation barrier is a ceramic paint around the tailpipe 25.

It is further hereby extremely emphasized that it is my new idea, hereby applied for patent, wherein hydrogen-deuterium is produced by electrolysis of sea water or heavy water in a strong confinement where air is zero, so that the evolving hydrogen-deuterium and oxygen, are automatically in the form of liquid, there being no air gap/space where the heavy water is pushed around by the expanding gases, and wherein further, the confinement submerged under the sea at about one mile deep so that the static pressure of the water head is enough to liquefy the hydrogen gas. In this way, there is no need to spend additional energy and equipment in trying to compress the hydrogen gas in high compression until it becomes liquid. The liquid hydrogen-deuterium is will then be ready to be fed into the diesel engine for fusion, or placed in capsules for detonation under water and underground.

It is further hereby extremely emphasized that it is also my new idea, hereby applied for patent, that a new device for pollution control is now created in this invention in the form of the hydrogen/fusion oven 26 in addition to platinum placed at the end after of all the fuel combustion processes in order to serve as high temperature catalytic converter or Catalytic Reduction of the NOx produced at the upstream combustion chambers. The bright beauty of this new technology is that the heat energy of the catalytic oven is captured to provide more power to the engine.

It is further hereby extremely emphasized that it is my new idea that the heat absorbing radiators 9 and 22 are also used to capture heat energy from hot waters created by erupting volcanoes underwater or on the ocean floors or on the lakes, in order to contribute energy into the herein presented power plant.

It is further hereby extremely emphasized that it is my new idea, which is hereby applied for patent, wherein a method created for storing electric energy is in the form of hydrogen-deuterium, which means that the generated electric energy is converted into hydrogen-deuterium by electrolysis or decomposition of heavy water, and the hydrogen-deuterium and the oxygen are stored in multiple storage tanks in the homes and in various facilities who have electric generating units, such as windmills, solar, and/or fusion engines.

It should be noted at this point that the reader of this presentation is supposed to be a person skilled in the art and therefore should have a good understanding of what a radiator tube is and how it is constructed and does not have to be invented again. What has been invented herein is the new function of the radiator tube as a participant in the whole apparatus of the engine in the same way that the old one-way check valve keeps participating in new inventions. It should be noted further that the gas turbine engine, steam engine, fuel cell, diesel engine, gasoline engine, internal combustion engine, reciprocating piston engine, lumpy fuel oven, solar trap, wood/trash distillation oven, air duct, radiator, and trash drying conveyor are all old existing devices and therefore do not have to be invented in this presentation. One newly created distinctive device applied for patent in this presentation is that the radiator's individual hot tube is inserted inside another individual cold tube so that the cold air totally engulfs to pick up all the heat energy out from the hot steam/gas tube in a maximum efficiency by making the cold compressed air enter the downstream low temperature section of the heat supply tube, which means—in reverse flow. The makers and assemblers of this new device/power plant are supposed to be skilled the art, hence, they should know very well how to produce the spare/component parts and they should know all the necessary connectors/bearings to complete the assembly. It should be noted at this point that all the needed materials and component parts are presently available in the open market. Hence, those components need not be reinvented. Additionally, all the herein component parts are already in the open market, much so with the hydrogen bomb in the open market.

FIG. 2—illustrates a new idea and innovative cyclone dust collector unit identified as No. 45, hereby applied for patent protection, same collector being in the form of a vertical axis drum 46, which is directly communicated in series, thru section 1-1, serving as a continuation of the engine's tail pipe 43 to take all the air exhaust of the gas turbine engine's tail pipe 43 of FIG. 1 at the extreme end of its exhaust tail pipeline in order to remove particles of ashes expelled by the exhaust power turbine 2 of FIG. 1. The dirty air from the gas turbine passes thru the air duct 43 that is eccentrically communicated to the upper most portion of the drum 46 in order to make the air travel into a spiral downward motion in order to exit upward thru the open bottom of the central exhaust pipe 47. The spiral motion of the air produces centrifugal force upon the dust floating in the air, thereby driving the dust particles toward the sidewalls of the drum 46. It should be noted from the figure that there are plurality of radial vertical walls 52 spacedly arranged around the drum 46, wherein, each wall 52 has one vertical edge 53 pointed toward the central exhaust pipe 47 while the other edge of wall 52 is pointed outward to and attached to the inner side of drum 46. It is hereby extremely emphasized and hereby applied for patent protection, that the function of the walls 52 is to provide a plurality of instilling spacious outer calm rooms along the periphery of the drum 46, so that the dust being pushed outward by centrifugal force will get trapped by the still air in-between the walls 52 and made to settle down. To prevent downward movement of dust-air mixture in between the walls 52, there is a plurality of floors 50 spacedly arranged in several levels in order to maximize instilling of the air and maximize settlement of dusts in the calm room in-between among the walls 52. Same floors are made inclined to make the accumulated dusts to slide down toward wall 46 and to exit thru the valve 54. The total cover plate sealed roof 48 is provided to force the waste air to move downward to the bottom of the exhaust pipe 47. Additional instilling walls 51 are also provided to further trap dusts. To make the unit 45 most efficient in collecting dust, it is hereby further extremely emphasized that the vertical walls 52 must be made as wide as possible such that the distance between point a to point b or point c to point e—is made at least one third ⅓ of the diameter of the drum 46. Additionally, the height of the walls 52—the distance between point c to point d must be at least twice or 2 times the distance from point a to point d to make it most efficient calm settling room dust collector.

FIG. 3—illustrates a new embodiment of a new and innovative idea of a dust-smoke collector unit No. 49, hereby applied for patent protection, same collector being in the form of a wet zigzag box air duct, which is communicated in series with unit 45 thru section 2-2 of the exhaust air duct 47 of FIG. 2, serving also as a continuation of the tail pipe 43 of FIG. 1 to take all the waste air coming out from the exit pipe 47 of FIG. 2, —in order to further clean the waste air from the gas turbine engine of FIG. 1. This unit 49 is made wide and accommodating in order to reduce the air pressure required to push the waste air thru it, as it is made into a wide rectangular box zigzag air duct, which starts with the vertical entrance box 47, then thru the horizontal air duct comprising of a flat roof-ceiling 60, a water containment floor 57, a plurality of rough-wet surfaced air-deflector/dust collector walls 58 spacedly attached to the ceiling with enough air clearance from the floor, a plurality of rough-wet surfaced air-deflector/dust collector walls 59 with enough air clearance from the ceiling speedly attached to the floor in-between the deflector walls 58, and an outlet mouth box 61 to 62. Each rough-wet surface 58 and 59 must be facing the in-coming waste dirty air in order that the dust and smoke will get stocked to the wet surface. It should be noted that there is wide space between the deflector/dirt collector walls 58 and 59 to remove unnecessary energy to push the air thru this zigzag air duct. It is further extremely emphasized that the ceilings and floors are also air deflectors and dust collectors, hence, same are made also made rough and wet. A low grade water supply is pumped from underground and injected thru pipeline 55 which has a plurality of pipe/tube branches 56 spacedly piercing downward thru the roof 60 at a good distance of one foot in front of each wet surface wall. Each tube branch 56 is provided with a plurality of water-misting spray nozzles to optimize water presence into the air and onto the rough-wet surfaces, ceilings and deflector walls in order to maximize collection of dust and smoke. The floor is made into an inclined water carrier to collect the dirty waste water which exits thru the outlet valve 54 to be filtered and recycled back to pipe 55. It is hereby emphasized that the zigzag air duct 57-60 is made longer to be able to collect more dust but then there is more energy spent to push the waste air thru it. Hence, it should be made enough to pass the allowable standard of air pollution.

FIG. 4—illustrates an embodiment of a new and innovative engine or power plant used for producing energy to the maximum efficiency of output or conversion of every unit of fuel being spent, serving as, but not limited to: locomotive power for cars/trucks or transportations for land, sea, and air, for home electric/hydrogen generators, for generators in various facilities, and for generators in utility companies, —wherein, the internal combustion piston engine 26A is feed with gasoline, diesel fuel, and hydrogen-deuterium fuel by the fuel pipeline 33; —wherein, for maximum efficiency of burning the fuel, the diesel/gasoline engine 26A is provided with at least two hybrid sparkplugs that have no anode in order that the hydrogen-deuterium fuel is subjected to heavy electric arc superheating to attain electric plasma and fusion fire in the combustion chambers; —wherein, for further efficiency in utilizing the heat energy produced by the plasma and fusion, the heat energy expelled by the engine 26A thru its coil tailpipe 26B is recaptured by the heat absorbing coil radiator pipeline 23 containing the compressed air pumped in by the compressor 1, same compressed air encloses the hot coil tailpipe 26B; —wherein, to safeguard against overheating of the piston engine 26A, 1. its combustion chambers are submerged in cold waters, 2. by more rapid pumping of the cooling water, 3. by enlarging the water cooling radiator system and 4. by making more water spaces around the combustion chambers; —wherein, for further efficiency, the heat energy produced by the catalytic converter assembly/unit 26C is recaptured by the heat absorbing coil radiator pipeline 23 which encloses same catalytic converter that is connected in series to the coil tailpipe 26B at its upstream 1/5 section; —wherein, for further efficiency, the heat energy taken out from the body of the engine 26A and contained by the water cooling coil pipeline 9A is recaptured by the heat absorbing coil radiator pipeline 10 which contains compressed air that encloses the hot water cooling coil pipeline 9A which is made into as much coils as possible to collect all the heat energy from same water; —wherein, for maximum efficiency of heat transfer or heat energy collection into the collector coil pipeline 10 and 23, the cold compressed air from compressor 1 is directed to start absorbing heat energy at the downstream end of the coiled tailpipe 26B and from the down stream end of the coiled water cooling pipeline 9A, —the purpose of this is to prevent expelling heat energy into the outside atmospheric air; —wherein, for further efficiency, an additional water pump is connected in series with the water cooling coil pipeline 9A for rapid water cooling circulation inside the engine 26A as there is too much heat produced by the plasma-fusion fire in the chambers; —wherein, for further efficiency, the heat energy collected by the radiator 10 is totally transferred to the radiator 23 by direct transfer of the pre-heated compressed air in a series connection, the radiator 23 being at the downstream; —wherein, for further efficiency, some of the cold compressed air from the compressor 1 is circulated around the engine block 26A by means of a heat absorbing radiator containment jacket around the engine block 26A to collect the heat energy from the surface of the engine block 26A before proceeding to joint the air inside the heat collector radiator 10; —wherein, to effect recycle of the harvested heat energy, which has been always wasted in the prior arts, the superheated compressed air inside the radiator coil pipeline 23 is directed into the power header pipe 24 in order to push the exhaust power turbine 2 which drives the compressor 1 and also drives the DC generator 3 which in turn directly drives the electrolysis machine 31, hereby emphasized—without voltage regulator, which fill up the hydrogen-deuterium storage tank 7A that supplies the deuterium to the engine 26A thru the fuel pipe 33, the heavy water stored in the tank 20 being constantly supplied into the electrolysis machine 31; —wherein, for further efficiency, the hot air exhaust expelled by the power turbine 2 is directed to pass into the coiled tailpipe 25 which encloses another branch of the cold compressed air radiator coiled pipe 10 which then transfers the pre-heated compressed air into the radiator 23 thru pipe 11; —wherein, for further efficiency, the engine 26A is turbocharged with cold compressed air from the compressor 1 by way of the air port 10A which is supplied thru a branch of radiator 10; —wherein, for further efficiency, the air control valve 21 is provided to equalize the air temperature of pipe 11 with the air temperature at the downstream end of coil radiator pipe 10; —wherein, for further efficiency, distilled water is mist sprayed into the intake mouth of the compressor 1 to produce high density air intake; —wherein, a heat insulator 42 jacket of various kinds which is more preferably made of powdered charcoal wrapped around the heat collector coil pipes 10, 11, 23, 24, and 25 to prevent heat seepage into the open atmosphere; —wherein, for further efficiency, the engine 26A is geared to drive additional electric generator to contribute direct current electric power into the electrolysis machine 31 in order to produce much more hydrogen-deuterium fuel for the engine 26A; —wherein, for further efficiency, the engine 26A is geared to drive the compressor 1 which in turn drives the electric generator 3 for a good start of the gas turbine engine 1-2 which later on, as it picks up power, will be the one driving the engine 26A; —wherein, for further efficiency, the gasoline-diesel fuel is shut off and only the hydrogen-deuterium is being fed into the engine 26A because there will be too much hydrogen-deuterium being excessively produce for storage; and wherein, for further efficiency, the hybrid muffler 26D is provide, as usual, to prevent noise generated by the tailpipe 26B, but in this invention, it is also made into a water boiler and heavy water boiler separately supplied by a water tank and the steam is directed separately to passed thru a plurality of coiled tubes exposed to the open cold atmospheric air for rapid condensation into distilled water to be supplied into the compressor 1 and the distilled heavy water is stored into the water tank 20. In summary, the heat energy expelled by the engine 26A, is utilized to produce deuterium fuel for the engine 26A, to distill ordinary water for the compressor 1 and to distill heavy water for the electrolysis machine 31, and to turbo-charge the engine 26A with cold compressed air by the compressor 1 thru the air-port 10A. Alternatively, the hot air in the tailpipe 26B may be used in the distillation of drinking water while the car/truck/bus is traveling on the road, since there is too much deuterium produced already stored in the car, by an additional branch of the tailpipe 26B directed to a boiler which may be shut off by a control valve when all the water loaded in the car has been distilled. It is further noted at this point that there is so much heat energy created by plasma-fusion done in this engine or power plant, therefore, a new technology is further developed for the production of abundant distilled water in the homes and municipalities out of the ocean water, under-ground water, and recycled water which ever is available, —by using the heat energy of the tailpipe 26B for the evaporation process, and then recapture the heat energy given off by the steam in the process of condensation by the radiator 10 and 23, of which new application of the plasma-fusion energy and the recapture technology is hereby applied for patent protection.

FIG. 5—illustrates a new embodiment of a new and innovative power plant identified as No. 11 floating on the water, lake/sea/ocean, or man-made lake, serving to capture and harvest the heat energy given off by the detonation of a hydrogen bomb 69 by a process: —wherein, for the safety of the apparatus 11, the hydrogen bomb 69 is detonated deep underwater so that the heat of the fusion flame is transferred outright to the water, thereby preventing meltdown of the structures 11, and thereby producing a boiling water; —wherein, a perforated roof or dome 42A is placed underwater above and covering the detonation spot in order to delay the flame from rising up and same dome is provided with perforated hulls 22A to distribute the flames into the water; —wherein, the detonation spot is surrounded by heat insulation walls 66 to confine the heat energy to a very limited amount of water in contact with the hot/boiling water; —wherein, a rigid floor 74 is place at a good distance below the detonation spot to prevent cracking of the floor 74 serving as confinement enclosure to prevent downward scattering of the hot water; —wherein, a heat insulator/wall 42 is provided covering the floor 74 and its surrounding walls, to prevent seepage of heat energy, the dome ceiling 42A being anchored by wall 42 to the floor 74; —wherein, a plurality of heat absorbing coiled tailpipe radiator 25 is submerged into the hot waters and into the upward path of the hot steam that is rising upward from the boiling water, same tailpipe radiator 25 contains all the hot air expelled by the exhaust power turbine 2, and the hot air is made to follow thru the coiled tailpipe 25 upward until allowed to escape thru the chimney 43 into the free atmosphere; —wherein, a plurality of heat absorbing/ collector coiled radiator pipeline 10 and 11 containing the cold compressed air driven by the compressor 1, same cold compressed air radiator 10 and 11 spaciously enclose the hot air tailpipe 25 and coiled to follow according to the coils of the tailpipe 25 until fully communicated to the power air-duct-oven 24 which contains the plasma torch 26 and delivers all the compressed super hot air into and to push the exhaust turbine 2. It should noted that the fusion torch 26 is fueled by hydrogen-deuterium which is subjected to heavy bombardment by electric arc from high temperature resistant electrodes while traveling its way out along a tunnel created inside a high melting point materials, such as, firebricks, etc., in order to generate heat energy from hydrogen-electro-plasma fusion torch. This oven is shut off as soon as there is enough energy harvested from the detonation of hydrogen bomb. As soon as the exhaust power turbine 2 starts running, it will start driving the compressor 1 thru the drive shaft 5A and also start driving the electric generator 3 which supplies electric power for the electric arc action in fusion torch 26. As a highlight of this invention hereby applied for patent protection, this new process/method of detonating the hydrogen bomb 69 is done: 1. by exploding a confined dynamite with a liquid deuterium confined in soft container at the center of the dynamite which then hammer an implosion action upon the already pre-super-compressed liquid deuterium; 2. by confining the liquid deuterium by means of a strong steel cylindrical/spherical container and the dynamite is exploded at the center of the liquid deuterium to hammer a super-high compression upon the already pre-super-compressed liquid deuterium; 3. by confining the liquid deuterium in a non-electric material strong container which is provided with metallic multiple electrodes on opposite sides to created a multiple heavy high voltage electric arc across the liquid deuterium, thereby, the liquid deuterium becomes superheated and super-compressed, —hence, fusion is attained. It should be noted at this point that the strong outer container for the hydrogen bomb must be at least 6 inches thick, depending upon the diameter of the bomb, made of high-carbon steel molten poured in a cylindrical/spherical mold. In the case of the electric arc hydrogen bomb, the strong outer container must be at least but not limited to a 12 inches thick glass molten poured in a cylindrical/spherical mold to be able to hold the high pressure of compressing the deuterium into a liquid form, and further to prevent short circuiting the high voltage electric arc.

In order to prevent short circuiting the electric power supply in the efforts to detonate the hydrogen bomb 69 by electric arc, it is hereby extremely emphasized and important, as a key element for this patent applied for, that the water used to submerge the hydrogen bomb must be a distilled water because the big reason for this is that pure water does not conduct electricity, such that the high voltage electric power to produce the heavy electric arc inside the liquid deuterium is carried by wires or conductor submerged into the water, —the switch of which is above the water line 65A. The electric contact points for the electrodes of the bomb are at the down end of the conveyor-railway 67 such that the stopper 68 places the electrodes right in contact with the electric terminals. The plurality of free inlet/outlet doors 7C are provide all around the foot of the wall 42 to provide and allow water exits during bomb blast.

It is but wise to take the opportunity to use the abundant heat energy produced by fusion into the distillation/purification of low-grade, subterranean water, recycled water or ocean water. The conveyor-railway 67 are made temperature resistant, as it will be melted by the fusion fire, into which the electric cable conductors are embedded and insulated free from the salt/ionized water, and same conductors are further embedded free from saltwater into and end inside the capsule of the liquid deuterium serving as electrodes therein, to prevent short circuit by the salt water. The other ends of the conductors are extended up above the water where the detonation switches are located. The gate valves 21B and 21C are provided for safe placement of the bomb 69 down thru the conveyor 67 by alternately opening/closing the valves. The room 70 is provided for launching station for the bombs into the conveyor 67. The heat insulator 42 is provided on the floor 74, and same insulator also serves as the lower portion of the dome wall 42 to prevent meltdown of the structures. It is hereby extremely emphasize that the bomb is detonated under water about at least 100 feet deep and the diameter of the dome wall 42 is at least 100 feet wide to provide enough room for the blast for the safety of the structures. Although the volume of the water involve is too much, successive detonation of bombs will make the whole contained water into boiling temperature. The heat resistant insulator/wall 42 is made into compressed air bubbles contained in flexible tubes/chambers laid on the floor and walls serving as shock absorbers. Further, the floor 74 is also made of chambers of compressed air to make it pliant and elastic in order to withstand the shock of the blast. To maintain the water level 65A the floater 8A is provided to control the valve 21D which allows automatic supply of distilled water thru pipeline 7B thru its free outlet bottom end and into the boiler or steam generator chamber 4A. The up rising super hot steam from chamber 4A heats up the water above the boiler hulls 22A and further rises thru to heat up the coiled heat absorbing radiators 10 and 11, some of which are submerged into the hot waters to collect the heat energy. As there is a necessity to maintain pure water in the detonation chamber 4A, all the steam going up passed across the radiator 10 is taken up by a plurality of coiled pipeline assembly 9 which is exposed to the cold wind 63 to produce distilled water that is deposited into the tank 20. By means of the gate valve 21 the water from tank 20 transfers to the tank 7D in order to maintain the water level 65. It should be noted also that the cold upstream portion of the radiator 10 condenses plenty of the rising steam, hence, the radiators 10 and 11 are inclined down to the outer end to make the condense water vapor cling and travel along the bottom of the radiators 10 and 11 where a water collector gutter is installed to make drinking water. Any excess uncondensed steam is further condensed by the plurality of cold air/water tubes 14 installed across the chimney 39A. It is noted that passing cold air thru the tubes 14 consumes less energy than passing cold water thru same tubes for purposes of condensing the steam in desalination process. The cold air during the night is push thru the tubes 14 to enhance condensation of the steam. All excess water vapor are allowed to exit into the atmosphere. As the helium part of the steam, which is produced by the fusion blast, is lighter than water vapor, it floats to the ceiling of the chimney 39A and is therefore sucked by the compressor 1A at the upper corner of the chimney 39A and thereby deposited into the container 39B. As there will be so much distilled water, it will be delivered in enough quantity to supply the needs of the town or city and irrigations for the farms.

For purposes of producing abundant deuterium, the detonation-boiler chamber 4A is totally filled with 100% heavy water which then will be evaporated by the fusion heat energy and the distilled heavy water is deposited into the water tank 20. The distilled heavy water is then subjected to electrolysis to produce deuterium and oxygen and stored for any future purposes.

It should be noted further in this FIG. 5 that the gas turbine engine 1-2-3 must be above the water, hence, the whole apparatus is attached to a plurality of floaters 71 of any low cost kind, including but not limited to, bundles of empty/waste bottles 72, boxes, pipes, and chambers of glass/metals, or inflatables, —placed inside bags, net sausages, baskets, waste rubber tires, and assembled structural frames made of glass or steel, —and same floaters tied to the lower structures of the power plant by strap-ropes. These methods and designs for making floater devices, most specially the use of empty plastic bottles 72 is one of the highlights of this invention applied for patent rights. The outer portion of the bottom floor 74 which is actually a platform is made rigid and as wide as possible to be able to serve as an underwater anti-oscillation wide-face device to minimize oscillation of the whole apparatus by the water waves specially during windy weather, as illustrated by the movement 75. The platform is further made rigid and good floater by means of the crisscrossing walls 73 made of glass/ceramics, metals, wood, etc., —forming a horizontal array of boxes with open bottom containing compressed air or inflatables, and a strong sealed top cover serving as floor which then can carry houses/homes, fertile soil for agriculture and windmills on the ocean, of which new idea is a highlight of this invention and applied for patent.

FIG. 6—illustrates an embodiment hereby identified as apparatus 12 in support for a new and innovative most efficient usage of fuel in the process of smelting materials, including but not limited to, glass into various devices and structural forms, including but not limited to, cubicles/rooms of houses, homes, large hotels and buildings, boats, land transportation, large bottles, water transportation, large controlled climate chambers for agriculture and homes, large underwater homes and transportations, large air/water pipes, large pipes for floating seawalls, fishponds, swimming pools, and for floating ocean platforms, etc., —wherein, hydrogen-deuterium fuel is used in electric plasma fusion torches 26 to melt the sand materials for glass ceramics, metals, etc.; —wherein, alternative fuels, including cock, charcoal 34, wood, trash, are fed into smokeless burning ovens/furnace 23A-23B-32-34A directed to melt sand/lahar/stone/dirt to make glass/ceramic structures; —wherein, a steam boiler 22 is placed right above close to the melting pot 32A to recapture the excess heat energy not absorbed by the melting pot 32A in order to contribute high pressure steam into the compressed air 24 thru the steam duct 6; —wherein, the fuel cell 5 is made to contribute high temperature steam into the compressed air 24 thru the steam duct 6; —wherein, the heat energy inside the annealing lehr 11A and 11-17-19 for the molten glass are recaptured by the cold compressed oxygen air injected by the compressor 1 thru the cold air duct 10 and the resulting hot oxygen air is supplied by the nuzzle 23B to further oxidize the un-burned fumes from the trash burner 34A and to contribute more heat into the melting furnace/pot 32A and into the boiler 22; —wherein, the excess heat energy not absorbed by the melting furnace 32A and by the boiler 22 is directed to get into the hot tailpipe 25; —wherein, the cold heat absorbing multiple pipe radiator 23, containing the main compressed air 24, is submerged into inside the hot tailpipe 25, starting from the downstream end of the tailpipe 25, to recapture all the heat energy that had been introduced into the tailpipe 25 by the various heat producing devices 5, 26, and 34A; wherein, the super heated compressed air 24 is directed to push the power exhaust turbine 2 which drives the compressor 1 and also drives the electric generator 3 thru the drive shaft 5A; —wherein, the electric generator 3 and the fuel cell 5 are dedicated to produce abundant hydrogen-deuterium fuel to produce more heat energy at the electric-plasma torch 26 and at the fuel cell 5; —wherein, the new and innovative processes of producing hydrogen-deuterium fuel are: 1. that the electrolysis machine 31 is connected in a series with the plasma electric torch 26 so that all the electric current passing thru the torch 26 are all carried by exchanging/splitting ions in the water, hence, all used in the evolvement/production of hydrogen gas/fuel, and 2. that the heat energy from the plasma/fusion torch 26 and the heat energy from the trash fuel 34 are used first for melting glass because by way of the heat collector radiator 12 and 23 all the heat energy is recaptured back to produce the hydrogen-deuterium fuel again and again; and—wherein, the heat energy at the downstream extension of the tailpipe 25 is further recaptured by the cold compressed air coiled pipe radiator 12 to contribute more hot compressed air into the main compressed air 24. It should be noted that in the process of smokeless trash burning, part of the super hot oxygen air 24 is directed to pick up more heat on its way thru the hot oxygen pipe 23A by passing thru the super hot exhaust air duct from the furnace 34A. The oxygen supply pipe 23A is then branched into a plurality of elongated tube nozzles 32 to pick up heat from the fire before the super hot oxygen actually gets in contact with the fuel 34 and with the gas fumes evaporating from the fuel 34. The tubes 32 are further provided with side perforations to provide hot oxygen to the gas fumes that escaped the nuzzles 32. The unit 30 is a step up transformer-rectifier-inverter assembly to jack up the voltage of the direct current to at least 10,000 DC volts to be able to produce a heavy electric arc in the plasma electric torch. Additionally, a large capacitor is also installed before the plasma torch to produce a large spark upon the deuterium inside the chamber 26. The conveyor 44 injects the sand materials to a chute where it is pre-heated, by the outgoing exhaust hot air from the furnace 34A, to high temperatures on its way to the melting furnace/pot 32A. The molten glass from the melting pot 32A flows down thru the chute 15 and into the mold 17 where it is annealed and cold down by the cold compressed air supplied by pipe 10, —into a large structural member for erection on salt waters. Likewise, in another new process of smelting glass, the mold 19 is filled up with sand which is molten by the plasma-fusion torch 26, wherein, the mold 19 on rollers is the one moving under the torch 26 in order to progressively melt the stock pile of sand along the length of the mold 19, which is also annealed by the cold compressed air supplied by the hot pipe 10. Additionally, the remaining heat energy at the downstream end of the tailpipe 25 which becomes tailpipe 43 is recaptured by the water heater coiled pipe heat absorbing radiator 36 before the waste warm air, no longer hot air, is allowed to escape out into the free atmosphere thru the chimney 43. The hot water from the heat collector 36 is then mist sprayed into the vacuum chamber 8 for rapid evaporation as it is sucked out by the pump and condensed thru the cooling radiator 9 and the distilled water is deposited into the tank 20 for production of drinking water out the otherwise wasted heat energy in the process of smelting. The salt/low-grade water in the multi-pipe heat collector radiator 37A is pre-heated by solar light during the daylight. The distilled water is also used to be mist sprayed to the intake of the compressor 1 in order to turbo-charge the gas turbine engine 1-2, of which all the above new ideas presented by this FIG. 6 are hereby reserved in the proprietary rights of the herein inventor and applied for protection by a Letters Patent. It should be noted that for quick understanding, this FIG. 6 is showing a straight heat absorbing radiator 23 which makes the drive shaft 5A very long, but as shown in FIG. 1, the actual construction is that the power turbine 2 is made very close to the compressor 1 by making the air duct radiator 23 into a plurality of multi-coiled radiator pipes.

FIG. 7—illustrates an embodiment of a new and innovative apparatus for a power plant 13, in the maximum usage of the heat energy absorbing coiled radiator pipes, serving as a newly invented device in support of the newly invented processes, as highlights of this patent application, comprising: —1. a process for the production of fusion heat energy in the efforts to produce electric power, wherein the liquid deuterium 69B is placed inside a soft container which is surrounded by a bomb 69A, which in turn is tightly contained by a thick strong steel and glass container 69 and the bomb 69A is detonated by radio or remote control; —2. a process for producing diamonds by using the high temperature fusion heat energy by placing a compacted ball of carbon/graphite 69C contained in a soft container submerged in the liquid deuterium 69B thereby the graphite is molten and compacted in deep water without chance to evaporate when the hydrogen bomb 69A is detonated; and—3. a process for capturing and converting the evolved heat energy from the hydrogen bomb 69-69A-69B by detonating it deep underwater inside a cylindrical/spherical basket 22A of perforated steel made wide enough and strong enough so as not to be destroyed by the high temperature blast; —wherein, to further capture the heat energy, the basket 22A is provided to distribute the fusion fire to a maximum contact with the water, thru the plurality of perforations, in order to convert all the fire into a hot water; —wherein, to further capture the heat energy, as the hot water will rise up to the surface, it is then confined by the floating heat insulator fence/wall 42 made deep enough against the intrusion of the surrounding cold waters of the lake/ocean; —wherein, to further capture the heat energy, a plurality of multiple coils of heat absorbing radiator pipes 10, 11, 23 and 24 are provided, submerged into the hot waters and also made as roof containment dome against the rising hot steam; and— wherein, cold compressed air is introduced by the compressor 1 into the outer radiator 10 to absorb the heat energy from the lower temperature water towards the fence/wall 42, to start with, and then same, now pre-heated compressed air, is directed to pass into the inner radiator 23 and 24 to absorb heat energy from the high temperature water at the center boiling chamber, and since the compressed air becomes very hot, it then continue expanding with full force to push the exhaust power turbine 2 which drives the compressor 1 and also drives the electric generator 3 thru the drive shaft 5A, —thereby, the hydrogen bomb 69B energy is tamed as a genie to help mankind by way of this invention. The floater pipe 71 serves as transportation to carry the basket 22A on its way to the detonation spot. The suspension cable rope 64 is made long enough thru a hoist pulley so that the bomb is detonated to a deep of at least 300 feet to keep the molten diamond remain in solid state. The floater pipe 71 is partially filled with water so that the submergence is just 90% to prevent to much oscillation by the water waves while trying to place the bomb on the exact position. Note that the heat absorbing radiators 10 and 24 are designed to have as much branches and coils as possible, horizontal and vertical and extended deep into the water to at least 100 feet to maximize contact with the hot water. It should be noted that the strong steel/glass container 69 must be at least 6 to 12 inches thick in order hold the super pressure and to obstruct for a few seconds the release/escape of the super high pressure hammer and super temperature upon the already super compressed liquid deuterium in order to attain fusion detonation. Of course, there is an underwater weight attached to the bottom end of the radiator 10 and 24 to pull down and sink the radiators 10 and 24 into the deep water. The lake/ocean surface 65B indicates the relative submergence of the whole power plant as it is anchored floating on the ocean/lake.

FIG. 8—illustrates an embodiment of a new and innovative apparatus 1 serving as a new device in support of a newly invented process as highlights of this invention for the production of fusion heat energy for purposes of producing diamonds as a by-product in a new process of producing electric power, wherein, the key element and highlight of this invention applied for patent is that the container 69A keeping the deuterium 69B to stay in liquid form is made of cylindrical/ spherical soft metal, such as, lead, copper, and aluminum sited on a lower curved die 82A, so that when it is compressed by the upper curved die 82 same container does not crack and does not lose the liquid deuterium 69B, thereby the deuterium is forced to fuse into helium, —resulting to the release a fusion fire. In addition to the compression dynamite 77, the drop hammer 78 is raised to a height of at least 100 feet depending upon the weight of the hammer 78 and also depending upon the power of the dynamite 77 which explodes upon compression by the hammer thru the solid steel piston 80, just so to produce the required compression in the efforts to attain fusion. By action of the high pressure fusion fire will liquefy attain fusion. By action of the high pressure fusion fire will liquefy the ball of graphite/carbon 69C without a chance to evaporate nor to oxidize as it is held in strong confinement 81 which is at least 12 inches in thickness made of high carbon-steel alloy wrapped around by taut fiberglass flat ropes. It is a requirement that the ball of graphite/carbon 69C is placed at the bottom of the liquid deuterium 69B so that the blast will not throw out the diamonds, but rather push down to the bottom of the blast compartment and deposit the diamonds into the holes of the metal base 84 as the die 82A will be melted. It is further noted that there is a dike of clay 69D around the base of the graphite/carbon ball 69C to prevent the deuterium getting below the graphite/carbon ball 69C to prevent it from being blown upward. It is also very important that there is a wall of fire bricks 83 to prevent melt down of the strong steel container 81. The steel block 74 also serve as containment floor to confine the fusion fire and the diamonds. It is also a requirement that the containment block 74 is supported by a thick bed rock 74B on the ocean floor by drilling test, —to maximize the compressive shock delivered by the drop hammer 78. In the efforts to capture the fusion heat energy into the water, it is required that the conveyor pipe 66 is welded sealed to the bottom floor block 74, wherein, same pipe 66 designed to hold back the implosion action of the water at the deep of at least 120 feet considering that its diameter is a required passage chute way of the large drop hammer 78 and the required height of 100 feet drop, hence, the vertical length of the pipe 66 must also be at least 120 feet. The drop hammer 78 is provided with a space from the pipe 66 and also provided with a plurality of vertical holes 79 serving as upward air passage to relieve the air pressure under the hammer 78 as it compresses the air in its way down in-thru the pipe 66 while it is speeding down to hit the solid piston 80. The pipe 66 is designed to be destroyed by the blast purposely to allow water to quickly get into the detonation chamber to save the diamond 69C from getting evaporated. The destroyed bottom section of the pipe 66 will be disconnected by removing connector bolts and replaced by a new bottom section for the next blast. The hoist cable rope 64 serves to pull the hammer 78 back to its high position. The water surface 65B indicates the relative submergence of the whole apparatus.

FIG. 9—illustrates a new embodiment of a new and innovative apparatus 2 serving as a new device in support of a newly invented process of producing fusion energy for purposes of producing diamonds as a by-product in a new process of producing electric power, —wherein, a ball of compacted graphite/carbon 69C is placed-submerged into and at the bottom center of a liquid hydrogen-deuterium 69B that is confined-sealed inside a strong at least 6 inches thick cylindrical/spherical glass/ceramics container 69F, a material that cannot be dissolved by hydrogen, having a plurality of internal positive 86 and negative metallic 85 electrodes which cannot be dissolved by the liquid deuterium 69B, same electrodes 86 had been baked with the glass container 69F and into the glass electric insulator 87 to make sure there is no deuterium leak and no electrical leak, there by the high voltage electric arc 88 is forced to jump across the liquid deuterium 69B. A compacted clay 69D is molded concave upward at the bottom of the deuterium 69B serving as seat for the ball of graphite/carbon 69C to make sure that the diamonds so formed will not blown upward during the detonation, there being no deuterium under the graphite/carbon 69C. An additional compacted graphite/carbon 69E is an upward continuation of the graphite 69C to serve as contract point to create more electric arc 88 across the liquid deuterium 69B. The glass container 69F is baked inside of and onto the inner walls of the high carbon steel container 69 which is made strong enough to take hold of the high pressure and temperature for a moment, thereby requiring that the thickness of the container 69 must be at least 12 inches or more, depending upon the size of the deuterium being fused. The positive and negative electrodes 85 & 86 are each connected to a high electrical conductivity copper rods 89 & 90 embedded into high melting point non-conductive materials, such as, fire-bricks 83 bonded together by molten pure glass. The high carbon steel basket 74 is a vertical cylindrical container, is protected from melt down by the brick wall 83, is sited on a bedrock on the ocean floor, and is designed to serve as settling basket 74 for the diamonds 69C after the blast. The underwater perforated flat roof 22A is placed some 200 feet above the blast serving to distribute the fusion flames horizontally—in order to maximize water contact with the flames, —in order to capture all the heat energy into the water and be harvested by the heat absorbing coiled radiator tubes. The basket 74 is hoisted up by the steel cable rope 64 which is attached to a horizontal aerial railway, in order to bring basket 74 to a safe place to pick out the diamonds, and—to recharge the whole apparatus with another Hydrogen Bomb capsule 69-69B-69C-69D-69-E-69F of liquid deuterium 69B.

FIG. 10—illustrates an embodiment of a new and innovative apparatus 66 serving as a newly invented device in support for a new and innovative electrolysis-fusion process of forced electrolysis that directly produce liquefied deuterium 69B without using a compressor pump, as highlights of this patent application, for the production of fusion energy, —wherein, a distilled hot heavy water 96A is subjected to electrolysis in the efforts to separate its deuterium 69B component from its oxygen 97 component; —wherein, all the rooms/spaces of the container 69F-69-101 are all filled up with heavy water without air bubbles left unfilled with heavy water, and all outlets are closed, —in order to prevent any expansion of the deuterium 69B and of the oxygen 97 so separated, hence, they will be produced and forced to stay as liquids during the process of electrolysis without using a compressor pump that would consume so much energy to liquefy a gaseous deuterium. In the process of the electrolysis, there is so much amount of temperature rise upon the liquid deuterium 69B and upon the liquid oxygen 97 in addition to the speed electrolysis requirement where the heavy water 96A is brought to high initial temperature at 95 degrees centigrade to double the speed of decomposition of the heavy water without freezing the deuterium, hence, high alert must be taken by the operator to stay away some 100 yards away from the electrolysis machine 66 with underground shelter because fusion is attained by this simple electrolysis process. There being no expansion allowance in this electrolysis device 66, the molecules are pushed against each other by so much tremendous pressure that no one has ever imagined because liquid cannot be compressed. Therefore, by this apparatus 66 which directly produce liquefied deuterium is a new invention of cold fusion because it does not require magnetic compression nor million degrees of temperatures. Hence, it is best to do this kind of electrolysis-fusion process in deep waters in order to trap the fusion heat energy into the water. Since the deep ocean bottom is cold, it is required that a plurality of electrodes 85 & 86 are provided protruding inside the chamber 69F serving to produce high voltage electric arcs 131 88 across the liquid deuterium 69B in order to introduce high temperatures upon the deuterium, —in order to attain fusion in the deep water. The compacted powdered organic materials 69C, such as, wood, trash, plastics, etc., is placed, water sealed in plastic package, inside the container 69F to serve as an indicator or detector of the presence of liquid hydrogen-deuterium 69B which dissolves the organic powder 69C and disappears into the liquid deuterium 69B. Please note that this process of dissolving organics into liquid hydrogen-deuterium by means of this new apparatus, serving as among the highlights of this patent, is a breakthrough or a new invention in converting organics into oil or alcohol, and as a means of producing oil, without the use of splitting high temperatures and also a new invention of suppressing the high pressure of a liquid hydrogen because the organics is now holding down the hydrogen molecules. It is further hereby extremely emphasized that organic materials must be dissolved into the hydrogen in order to remove the pressure of the hydrogen inside the tank and to ease out the seal off problem in handling hydrogen. Further, the distilled heavy water 96A is tainted with color so that the water surface 65 will be clearly identified and to stop the electrolysis process at that point of the water level 65 which must always be above the outlet seal 92 so that the hydrogen 69B will not get in touch to dissolve the seal 92 and escape out. It is 1000 time easier to seal off water/mercury 96 by rubber materials than to seal off hydrogen because it dissolves all organic matter. Therefore, this is a new break-through or an invention to seal off hydrogen 96B by means of water/mercury 96 placed at the outlet. The deuterium is allowed to get out the chamber 69F by means of the gate valve 21 thru pipe 91 which is turned up above the water surface 65 to bring its inlet up to the deuterium 69B to get out, and then turned down under water/mercury to hide the outlet mouth from hydrogen-deuterium 69B to stop the escape of hydrogen. Please note that this method of sealing off any hydrogen-deuterium in any chamber—by way of bent outlet pipe 91 that turns up and down, —is a new breakthrough and is therefore it is a new invention/creation serving as among the highlights of this patent application. Sealing off the oxygen 97 inside the chamber 69 is not a problem with the valves and the sealants, hence, no need for the water 96 to stay above the outlet 91A. The seal off valves 93 and 94 which sit on the rubber seal 92B, are provided for purposes of disconnecting the chambers 69F and 69 from the chamber 101 by unlocking the clamps 95 in order to transport the chamber 69F to a detonation site of a fusion power plant or engine. The sealer 92A is a rubber ring is provided as a high pressure water sealer in the form of a hard rubber. By way of the crank arm 105 the crank 103 move up and down the plunger rod 93A and 94A and the valve 93 and 94 to open the water way and to close the water way. The plunger rod 93A/94A holds the valve 93/94 by means of catcher clip-ring which is easily disconnected. The valves 93/94 may also be gate valves. The apparatus 66 is assembled first, then laid down, then filled up with heavy water 96A thru inlet 106, which is in upright position when the apparatus 66 is laid down, to let out all air bubbles. The positive 100 and the negative 99 terminals are connected to a DC source/generator to run the electric current thru the anode 98A to the cathode 98 witch attracts the hydrogen-deuterium ions and pick up electrons from the cathode. The hydrogen-deuterium molecules are lighter than water 96A, hence, are forced to move up thru the water way passed valve 93 and finally gets into the chamber 69F as a liquid hydrogen-deuterium 69B. The same process is done with the oxygen molecules 97. The cover plate 102 is some times remove to open the manhole for the repair of crank mechanism 104, 103, and 93A. It should be noted at this point that the chambers 69F, 69, and 101 are made very strong with at least 6 to 12 inches thickness of molten pure glass poured in a mold in order to withstand the pressure of a liquid hydrogen at 95 degrees centigrade.

FIG. 11—illustrates an embodiment of a new invention and innovative device to harvest maximum benefits from and kind of fuel being burned or benefits from various kinds of devices that burn fuel, including but not limited to: engines 4 or fuel cells 5, trash burners 108, oil or kerosene lamps 26, oil/gas stoves 26A, gas fuel burners, and crude oil burners, —for baking or cooking food 40 in oven 109, —as a by-product along with other new and innovative processes for the production of hydrogen, electric power, and distilled water 7, —in the efforts: —to use the least cost fuel, —to maximize the adaptability and usage of various heat energy resources including gas lamps 26, gas stoves 26A, trash burners 108 that burns trash fuel 34, gas engine electric generator 4-5, etc., alternately or all together used in action to heat up the baking oven 109, wherein, an oil lamp/kerosene lamp 26, while in the process of producing and providing abundant light for the house, workplace, living vicinities, animal houses, its exhaust waste heat energy is made to pass thru a hot-air duct 26B which serves as a heat containment chamber; — wherein, an oil burning or gas burning stove 26A, while in the process of producing/providing heat energy for cooking, is made to pass its waste heat energy exhaust thru the hot-air duct 26B to contribute or to provide heat energy therein; — wherein, a smokeless organic fuel, wood, trash burner 108, while in the process of producing and providing heat energy for industrial purposes, is made to pass its heat energy exhaust into the hot-air duct 26B; — wherein, a fuel burning engine 4 or fuel cell, while in the process of producing and providing mechanical or electrical energy for industrial purposes, is made to exhaust its waste heat energy into the hot-air duct 26B to provide or to contribute heat energy therein; — wherein, an enclosed metallic chamber serving as a clean oven 109 is placed into the heat containment chamber/hot-air duct 26B and submerged into the waste hot gases to absorb heat energy there from; — wherein, a plurality of cooking plates or plates in conveyor 112, containing food 40 to be cooked, are placed inside the clean oven in order to bake the foods 40; a fuel cell or an engine 4 that produce heat in driving various kinds of devices including an electric generator 5 has its exhaust tail pipe 6 directed to inject heat energy into the upstream end of the hot-air duct 26B.

The smokeless burner 108 is an elongated pipe tapering smaller at its exit nuzzle end and having a plurality of orifice or holes along its length serving to distribute oxygen air supply into the flames and on to the organic trash fuel 34. The burner 108 is either vertical or horizontal but it must be submerged into the flames or submerged into the hot-air exhaust of the burning chamber because it is hereby extremely emphasized that the oxygen-air supply must be pre-heated to supper hot temperature before it gets in touch with the organic fuel 34 being burned. It is hereby extremely emphasized that there must be a plurality of this burner 108 alongside with each other submerged into the fire in order to evenly distribute the pre-heated oxygen-air into the gas fumes that are flying around with the flames in order to completely oxidize the black/blue smokes before leaving the burning chamber. The fresh oxygen-air inlet 107 must be well below the burning chamber and it is hereby extremely emphasized that it engulfs around the burning chamber in order that the new intake air is pre-heated by the hot outside walls of the burning chamber—as a process of recapturing heat energy. This smokeless organic trash burner is very important to be used in cleaning residential areas while in the process of producing distilled drinking water and in the process of producing hydrogen to fuel the cars, transportations and for the conversion of trash into oil. It should be noted at this point that there are many alternatives for supplying fuel into the burning chamber, one of which is an individualized concrete/firebricks or metallic drum filled up with trash and loaded on a conveyor or a merry-go-round carousel to successively get into the burning station directly under the burner 108.

It is also hereby extremely emphasized that there are plurality of heat emitting radiator tubes placed inside the oven 109 under the cooking plates and above the cooking plates, same heater radiator tubes serving also as part of the hot-air duct and same tubes containing hot gases expelled by the heat producing sources 4, 34, 26, and 26A, —in order to maximized the cooking speed.

The downstream end of the hot air duct 26B is then communicated in series with the next hot air duct 24 which is a multi-coil air duct and which contains a heat absorbing multi-coil-multi-tubes radiator 23 that contains compressed air which is continuously injected by the piston or turbine compressor 1 starting in the tubes 10 placed at the down stream end of the hot air duct 24. It is hereby extremely emphasized that, while its is cool, the compressed air must start at the coolest down stream end of the hot air duct 24 in order to absorb the low temperature heat energy at the down stream section of the hot air duct 24. The pre-warmed compressed air then proceed thru the down stream section of heat absorbing tubes 23 which are in the higher temperature up stream section of the hot air duct 24. At the end of the downstream of the heat absorber tube 23, the compressed 72 air is already superheated and therefore same compressed air is ready to expand with full power. The hot compressed air is then allowed to pass thru the gate valve 21, and proceeds to drive the exhaust Power piston or turbine 2 and exit into the hot air duct 25.

The waste hot air from air duct 25 and from the hot air duct 24 then proceeds into the hot air duct 43 which contains a plurality of water boiler tubes or Vacuum evaporation chamber 18 which evaporates hot water by mist spray in a vacuum atmosphere. The water vapor from the tubes/chambers 18, by its own pressures or by pump, then proceeds into the vapor separator chamber 110, and the pure water vapor gets into the condensation tubes 17 which are submerged in the cold water supply inside the tank 7D. The condensed distilled water get out of the down stream end of tubes 17 and drops down into the distilled water collection tank 7. The uncondensed water vapor than proceeds up to the wind cold condensation multi-coil tubes 9 having its low points communicated to the condensate collector tube 111. The condensation coil tubes 9 is either installed inside a wind tunnel or is just exposed across the open wind as a means for cooling the water vapor. Further, the water vapor is compressed in order to speed up condensation—as one more highlight of this invention.

FIG. 12—illustrates an embodiment of a new and innovative design of a floating platform 73-74, which has been indicated or illustrated in the herewith foregoing underwater platform 72-73-74 of FIG. 5 that is used to help partially float the whole apparatus of FIG. 5. Same platform is consisted of a plurality of air containers including, but not limited to, bamboos, crisscrossing pipes 71-71A, array of boxes created by crisscrossing walls 73-74 with sealed top cover plate 74 to trap air inside the boxes which are salt resistant preferably made of glass. Part 73A is the bottom edge of the wall 73. Further, the array of boxes 73-74 are filled up with a plurality of empty bottles 72 and empty pipes 71 which pierces several walls 73, purposely to make sure that there is no air leak allowing air escape from the boxes 73-74. It is also hereby extremely emphasized that the purpose of the walls 71-73-74 is to provide a stiff platform against the wavering water waves, hence, same walls are also constructed in the form of stiff/rigid structural truss enough to enclose the air container, some of which are bundled together in the form of sausages in baskets or bags of nets. This design of constructing a floating platform is extremely emphasized as one of the many highlight of this invention applied for patent.

For purposes of maximizing commercial use of this floating platform 73-74, and 71 & 71A, the platform is floated above the water level 65B, and the top cover plate 74, being made of glass, is over lain by fertile soil 113 serving as agricultural bed for various kinds of plants 115. To prevent rapid evaporation of the irrigation water, the surface of the farm soil 113 is covered with plastic sheet 114. The power/farm house 112 is constructed on the firm pavement 116. The whole floating platform is bordered by floating vertical chambered pipes enough to stop the water waves and provided with mouth and valves to produce compressed air out of the splashing water waves. This vertical floating pipe boarder serves as floating sea wall which has been already claimed in my proceeding U.S. Pat. No. 6,327,994 B1 and U.S. Pat. No. 6,293,121 B1. This ocean agricultural farm platform also serve as a carrier for housing projects, housing or habitation settlement on the ocean to expand the territories of various countries into and over the ocean. This ocean platform is also used as carrier for windmill farms 117 over the ocean to generate electric power for the human settlement, to produce hydrogen fuel, drinking distilled water, and irrigation water for the ocean farm.

Additionally for purposes of maximizing utilization of air container and the ocean platform, the floater device is made of criss-crossing empty pipes or bamboos to make it stiff/rigid platform with high buoyancy, and is made to carry power/home houses 112, buildings, windmills 117, drinking water in tanks, compressors, vacuum pumps for purposes of distillation of sea water for irrigation, and other equipment, wherein the empty pipes 71 & 71A serving as vacuum evaporation chamber into which, water is mist sprayed to speed up evaporation. The water vapor is then mixed with cold water in high pressure to speed up condensation. This new idea of vacuum evaporation chamber has been claimed under my U.S. Pat. No. 6,293,121 B1. There being so much buoyancy made available, this platform is overlain by a plate flooring 74 which support the water tank 25 and the windmill 117 above the water surface 65B.

FIG. 13—Illustrates a new and innovative design for a boat, wherein, in the effort to maximize utilization of the air container floaters used in FIG. 5, one of which is the bamboo 118, which is now used to form a boat. The larger end of the bamboo 118 which is used to become the rear of the boat, clipped by water-splitting nose 122 for use when sailing rearward, same clip is also used at both ends, and the smaller end of the bamboo 118 is used to become the pointed front of the boat. A plurality of the bamboos of at least one clip are vertically stacked and each securely tied/fastened to central vertical rigid flat clip structure 119 which may be doubled, wherein, one stack of bamboos 118 are placed in-between the two clips 119 while the other stacks of bamboos 118 are attached to each left and right sides of the clips 119 to multiply the buoyancy of the boat. The smaller tip of the attached bamboos are tied together by flat ropes 123 or wires and tautly tied by a rope/wires 120 to the rear in order to bend the bamboos 118 up ward, such that the front tip of the boat is above the water. This boat serves many functions in the water community, including serving as carrier of water 27, to serve as transportation and to serve as recreation boat, and to serve as demonstration to show to mankind to how easy it is to make a boat at the lowest cost.

FIG. 14—Illustrates an embodiment of a new and innovative construction of a boat showing a cross section of FIG. 13, made of bamboos or pipes 118 which are attached and clipped together to a central structure 119 which is a single/double/triple frame post to hold more pipes, to form a hull of the boat at low affordable cost. The hulls are interconnected together by a horizontal structure 119A to form a double hull boat. The boat is used to carry water and other all kinds of cargo 7 in tank. This method of constructing a boat has been claimed in my preceding U.S. Pat. No. 5,027,735 entitled or named "KASIPAGAN BOAT".

FIG. 15—illustrates the embodiment of a newly invented apparatus in support of a new concept of process in converting the warm heat energy of the tropical ocean into electric power or into hydrogen, wherein, the newly invented partnership, between the gas turbine 1-2-3 engine and the cooling radiator 8B and the heat absorbing radiator tubes 23A and 23, is used to the maximum effect or to maximize benefits out of the heat energy of the ocean's warm waters. By nature, the water under the deep ocean is very cold, while, the water on the surface of the ocean is warmed up by the solar heat, thereby a big difference in temperature is existing in unlimited quantities of volume of water. To make use of the heat energy stored on the ocean surface in the most efficient process of harvesting energy, a plurality of the multi-coil heat absorbing radiator 23A are spread on the water around the engine 1-2-3. To make the heat collector 23A very hungry for heat energy, the compressed air passing thru the tube 23A must be very cold in order to speed up heat absorption of the low temperature heat energy that surrounds the tubes 23A. Additionally, the materials for the tube 23A must be aluminum—it being the most efficient conductor of heat, and/or copper being the second most efficient heat conductor. Therefore, there is a necessity to make use of the coldwater reservoir at the bottom of the ocean to serve as cooling agent. Hence, the cold water intake pipe 8C is created to conduct the cold water that is pumped up by the impeller 1A, wherein, part 1B is a stator fluid deflector in opposite direction against the impeller 1A—as one highlight of this invention. The vane/blade 1B is in reverse action against the impeller 1A to speed up water pumping. The pump impeller 1A is driven by the drive shaft 5A, which is driven by the power exhaust turbine 2. The cold water rises to the horizontal cold pipe 8A, which engulfs the multi-tubes 8B that contain fresh air from the atmospheric intake 107. The cold water in pipe 8A absorbs the heat from the air inside the radiator tubes 8B, hence, the air in tubes 8B shrinks because it becomes cold air, which becomes very dense air. The cold water in pipe 8A then continue to run for heat exchange until it exits thru the pipe 8D about 3,000 feet for disposal away from the heat collector tubes 23A. The dense cold intake air then proceeds thru the scrawl case 8E where distilled water 20 is mist sprayed by atomizer 8 into the pre-cold air—to make it more humidly dense and cooler further, and where said intake air approaches the compressor 1 in revere direction against the blades of the compressor 1. The cold compressed air exits the compressor 1 thru a centrifugal pump to further step up the air density and to remove reverse actions against the blades of the compressor 1. The cold compressed air then proceeds into the main header 10 where the compressed air is cleaned up of excess water content and deposited into the water trap 7, and then same air proceeds into the pipe header 19B, which is a ring pipe around the engine 1-2-3, floating on the water and serving as a central connector for branching out into the plurality of heat collector tubes 23A to get in touch with warm water, thru the cold sidewalls of the tubes 23A. The additional water trap 7A is also provided at the bottom of the first loop of tubes 23A to prevent water clogging at the bottom loops. The distilled water collected by the water traps 7 and 7A are then pumped out and recycled back into the distilled water tank 20. The cold air becomes warmer and gains expanding energy as it travels thru the plurality of multi-coil tubes 23A until it gets into the central connector pipe header 11 to communicate with the plurality of upper hot tubes 23 which are submerged just below the hot surface of the water 65B. The tubes 23 has increased in temperature due to direct sunlight and due to the solar trap transparent roof sheets 124 and 125 which have vertical space between them of at least 6 inches by inserting empty transparent air containers in-between sheets—serving as spacers and heat insulators/barriers. Additionally, the shinny strip sunlight reflectors 126 are made adjustable being tilted to the right towards the morning sun and tilted to the left towards the afternoon sun, —in order to make more sunlight pass thru the transparent roof sheets 124 and 125 at a more direct incidence to give more heat into the tubes 23 and to the water. It is hereby extremely emphasized that the adjustable metal strips solar reflectors incorporated with the solar trap is also a major break thru or highlight in this present invention. The compressed air is now hot at this point and is then fully energized, and then proceeds into the Power Header hot air duct 24 where the high pressure deuterium/gas/fusion/oil/solid-fuel torch 26 injects more heat energy into the already hot compressed air, a major highlight of this invention. Additionally, hot distilled water is mist sprayed by hot compressed air atomizer or steam from a boiler—is injected into the combustion chamber 24 to provide more expanding power capacity and to minimize NOx pollution. These cold/hot water mist and steam injection into the combustion chamber is also a major highlight of this invention. In the case where power is dependent solely with the solar heat, and the torch 26 is not running, then it is best to inject high pressure cold distilled water mist into the header pipe 11 to add more heat absorbing capacity. The finally energized hot compressed air then gets into the scrawl case 24A which have stator blades in reverse action against the blades of the power turbine 2. The expanding hot compressed air pushes to drive the blades of the exhaust power turbine 2, which in turn drives the compressor 1 and also drives the electric generator 3 thru drive shaft 5A. The power turbine 2 expels hot air exhaust thru the main tailpipe 25 which splits up into a plurality of heat disseminator pipes 25A coiled into the water to leave the heat energy behind into the water below the solar trap roof before the waste air is allowed to escape out to the atmosphere thru the exhaust chimney 43, —to maximize heat recapture and to pre-heat the cold compressed air newly produced by the compressor 1. Due to the torch 26, the air expelled by the power turbine is much hotter than the solar trap, much more so when the sun is out, therefore, when the torch 26 is running, a pair of diversion gate valves are operated to make the hot exhaust air passed thru the various small radiator pipes 25A that are engulfed by the pipes 23 which must be, hereby extremely emphasized, —above the water, —to maximize recapture the exhaust heat, —before the exhaust hot air gets into the coil pipes that are submerged into the water to leave the last drop of heat energy therein. The power turbine 2 drives the electric generators 3, drives the compressors 1, and also drives the cold water lifter pump 1A by means of the drive shaft 5A. The pump 1A is just below the cold pipe 8A, but the intake mouth of the water suction shaft 8C is located at about 3000 feet into the deep ocean to get the coldest water. It is hereby emphasized that the suction pipe 8C is made to carry the weight of the gas turbine engine 1-2-3 and its appurtenances by attaching vertical pipe to it to provide buoyancy. The energy being tapped by this engine is as unlimited as the ocean. During the cold nights of December, the drive shaft 5A is disconnected from the pump 1A because the atmospheric air during the cold season is cold enough, and the header pipe shaft 8D is just injected with high pressure mist sprayed by compressed air atomizer with cold ordinary/sea water—to further cool the pipes 8B. It is also very important that the distilled water 20 is mist sprayed by the fogging device 8 into the large air duck 8E to pre-compress the air intake before it gets into the compressor 1 The pressure of the atomizer's compressed air keeps pushing the fog/mist out thru the exhaust pipe 10. There is also circumference fence in the form of a floating sea wall 42 to stop the water waves 65B and to confine or to conserve the heat energy on the water within touch of the heat absorbing radiator pipes 23A and 23, hence, the sea wall 42 must be built to be a good heat insulator by using materials such as dry paper or foam plastics or powdered charcoal. Aside from being a floater device, the stiff horizontal board wing 127 is also provide to serve as an anti-oscillation resistor against the water waves to stabilize the fence 42. The heavy weight 128 serves to keep the fence 42 in erect posture as it is being vertically acted upon the by floater 127. There are many various available configurations of devices that may help maximize benefits from heat energy sources, heat mediums, and heat insulators, including, but not limited to, a group of interlinked power turbines, that drive a group of interlinked compressors and a group of interlinked electric generators which run a plurality of electrolysis units for the maximum production of hydrogen fuel, specially those floating on the ocean to avoid pollution upon the communities, of which the herein inventor hereby reserves all the rights to the ideas pertinent to the subject matters of these inventions.

FIG. 16—illustrates a new embodiment serving as means of producing heat energy to be contributed to power the gas turbine engine thru the heat absorption radiator pipes 23 of FIG. 1, wherein, the heat energy is produced by passing heavy electric arc 88 thru to melt a compacted carbon powder 69C at a very high pressure compactor piston 80. Upon cooling, the molten compacted carbon 69C becomes diamond for jewelry or a hard stone used for cutting and for drilling. This clearly illustrates a process where the otherwise would be wasted manufacturing heat energy is recaptured and recycle. The weight of the solid block or earth soil container or water tank 78 and the weight of the energy bank capacitor 127 are joint together to press down the piston 80 which must be of high melting point material not to become part of the molten carbon 69C. The same is true with the confinement 69F serving as heat barrier and electrical insulator which is a dry powdered glass, silica, sand, or fire-bricks. The actual pressurizing part is the hollow spherical or cylindrical container 69 which is made of steel or glass because these materials are of high tension power and which is further wrapped around by fiber glass ropes. The large electrical conductors 89 and 90 carry/conduct the electrical discharge from the energy bank capacitor 127 thru the electrodes 85 and 86 which are surrounded by electrical insulator 87. The part 74 serves as solid footing for the whole apparatus. As an alternative for recapturing the heat energy spent, water is released to submerge the apparatus to speed up cooling and the rising steam heats up heat collector radiator tubes. It is hereby extremely emphasized that this process/method of smelting diamond by heavy electric arc, by way of this presented apparatus, is also used and set up to be stricken by the lightning during thunder storms without the need for the capacitor. The lightning is also used to detonate a hydrogen bomb as presented by herewith FIG. 9, —as among bright highlights of this invention.

FIG. 17—illustrates new embodiment serving as means for an additional further effort to maximized utilization of the hybrid hydrogen/deuterium-fueled engine of FIG. 1 or FIG. 4 to provide power for the ocean platform and to produce drinking water by oxidizing hydrogen, and to obtain maximum benefit from the new idea of recycling used containers or to use new containers 72 some of which are in the form of bottles/pipes/boxes/bamboos and crisscrossing walls 73, which are used to carry or float water or swimming pools, hotels, and restaurants on the oceans or lakes to make swimming/bathing safe from predators or shark attack or poisonous jelly fish and debris, wherein, the water 20 is fresh water and water 37 is ocean/sea/salt water. The floaters 72 and 73 are covered by strong flat plates air tightly attached to the top of the crisscrossing walls 73, —serving to stop air from rising/escaping up thru the floor 74A and 74. Filled up with compressed air, the floater recycled containers 72 are confined within the boxes formed between the crisscrossing walls 73 so that there is air remaining under the floor 74A and 74 if the air trapped by the crisscrossing wall happens to escape. Beneath the sea water 37 is a porous sand filter/floor 74A serving as floor of the swimming pool serving to allow clean filtered sea water to rise up from the bottom to maintain the water level at the lip 138, as upon agitation, water waves created spill over the lip 138 and drops down into the gutter 137 and subsequently drains to the ocean thru the drainpipe 136. As a result of losing water thru the drainpipe 136, the ocean water from below the filter sand floor 74A automatically rises to refill the tank 37 because the water level at the lip 138 has diminished, —and the cycle goes on—to maintain the lip level with the sea level. The vertical division wall 66A separates the fresh water 20 from the salt water 37 to provide choice of water in the swimming pool. The fresh water pool has an impervious floor 74 to prevent sea water from getting into the fresh water pool 20. The level of the fresh water 20 is also continuously being diminished by the water waves spilling over the lip 138 created by the swimmers. The spilled over fresh water is caught by the gutter 137 and get discharged onto the filtration sand bed 140 for cleaning. The filtered water then drops down onto the water collector rock layer/pipe 141 which recycles the fresh water by gravity back into the fresh water pool 20 without using water pump that consumes energy or with zero energy spent. The energy doing this recycling water flow is the energy of the swimmers that produce water waves which jumps over the lip 138. It is hereby extremely emphasized that this is a new application in a process wherein the energy of the swimmer is used to recycle water in the swimming pool—as one highlight of this invention. In the process of cleaning the sand filter 140, the windmill 117 is used to pump water into the pipeline/water collector 141 to reverse the flow of water upward thru the sand bed 140 to float the accumulated dirt and direct it to discharge onto a flower/vegetable plant garden elevated above the sea level 65B. Additionally, the windmill 117 is made wide-face blade to be powerful enough to produce electric power and hydrogen fuel for the facility specially for the kitchen cooking. Wall 139 is a glazed tiled wall set back about 8 inches from the lip 138 and with a height of 1.5 feet above the lip 138 for the swimmers to sit down above the water. The large boxes 133 are water tight sleeping/lodging rooms, machinery rooms, equipment storage rooms, workshop rooms, and storage for hydrogen fuel and for compressed air produced by the compressor 134 and 135, —built under the patio floor and around the swimming pool serving as additional floater during storms. The strong walls 134/66 are oriented to face the water waves 65B or ocean waves to protect the floating swimming pool. It is hereby extremely emphasized that the wall 134 is so constructed in the form of honeycomb air trap cavities 134 having float ball valves 135, such that, when the water waves 65B splashes upon the bottom of wall 66, the water jumps upward filling up the cavities and pushing up the entrapped air thru the valves 135 thereby compressing the air inside the cavities 134. The compressed air then is used to run a gas turbine engine fired by the hydrogen fuel from the windmill 117 which also supplies compressed air to help run the gas turbine engine. It is also extremely important that the people, trying to enjoy the excitement in this facility, be protected from the burning sun by the large umbrella made of light nylon cloth tent 128 supported by ropes and alternatively hereby emphasized as made into a large air bubble tent, specially so because they remove their clothes while in the facility to swim or to advertise their beautiful bodies. To clear the area from having a center posts, the tent 128 is suspended by ropes, such that, the central post 131 is suspended at erect position by means of a central connector 130 at its base. A plurality of strut posts 132 are erected at the perimeter of the patio surrounding the swimming pool, made tall enough, such that, the ropes enter-connecting the top of the perimeter strut posts to the base central connector 130 will lift the central post 131 at a height such that connector 130 is about 10 feet above the floor of the patio. Each top of the strut post 132 is also inter-connected to the connector 129 at the top of the central post 131 by an upper taut rope sloping down to the top of the strut 132 serving as rafter support for the cloth umbrella/tent 128.

FIG. 18—illustrates a new embodiment for an additional further effort to maximize utilization of the hybrid deuterium fusion engine of FIG. 1 or FIG. 4 to power the ocean platform and to produce drinking water by oxidizing the hydrogen or by distillation and to obtain maximum benefits from the new idea of recycling used containers or to use new air containers 72, some of which are in the form of chambers/bottles/pipes/boxes/bamboos and crisscrossing walls 73 with an air-tight flat plate on top to trap compressed air, —in order to hold enough air under the floor in order to float the structure or the whole ocean platform apparatus, which carries human settlement residential houses 147, agricultural lands 140, fishponds 20B, windmills 117, industrial parks 133, offices 147, and water wave energy 65B converters 2 & 24, to name a few, —on the ocean or on the lake. On top of, and carried by, the floaters 73 & 72 is the tank which contains the water 20 with a surface 138, either salt or fresh water or mixed, where the fishes 20A is fed/grown and produce droppings or waste matters 148, —representing a fishpond. The floor 149 of the pond is made up with valleys and hills to concentrate the waste matters 148 at certain points. There is the floor net 146, as it is hereby extremely emphasized to prevent the fishes from agitating the waste matters 148 to make the water 20 stay clean and clear, —as one highlight of this invention. Thru a water pump, the windmill 117 runs the pipes 145 to pick up the waste matters 148 early enough before it is digested by bacteria into colloidal particles in mixture with the water 20. As an ex-tension of pipe 145, pipe 146 distributes the waste matter on the agricultural land 140 serving as fertilizer in growing plants/algae 144. Additionally, the soil of the land 140 also serves as water filter allowing the cleaned water to drop down into the collector pipe 141 which returns the water back to the fishpond 20B, —the water 20 does not diminish too much. The water wave 65B energy converter 24 is a multi-stage air compressor having 3 stage chambers, with the higher valve the lower valve 135 and it is important to note that it has the impact wall 66 that drives the wave 65B upward into the chamber, —to effectively compress air even as the sizes of the wave 65B may vary, —in order to drive the exhaust turbine 2 which in turn drives a DC electric generator to produced direct current electricity. The windmill 117 generates DC electricity and compressed air, —when there is no much waste matter to be pump out of the fishpond. The DC electric power is passed thru a multiple electrolysis machines, directly from the generator, to produce hydrogen/deuterium fuel, —some of which is burned inside the compressed air compartment of compressor 24 and thru the gas turbine 2 to produce more direct current and, as it is hereby extremely emphasized as highlight of this invention, to produce drinking water, H2O, as result of oxidizing the hydrogen in the process of producing heat energy into the gas turbine engine 2, —thereby effecting desalination process. The excess water not drunk by the community is then added as water 20 in the fishpond and irrigation on the land 140. The tail DC power after passing thru the electrolysis machine is then stored in capacitor houses and batteries for obvious uses. The hydrogen/deuterium fuel is then fed to the hybrid fusion engine. It should be noted that the residential houses are mad into habitable capacitors that store DC power even from the lightning. It is also important to note that there is a floating feeding enclosure having a plastic horizontal sheet floor placed at mid-deep of the water hanging from the frame of the floating feeding enclosure serving to save the feeds from sinking down onto the muddy floor, —as one bright highlight of this invention.

FIG. 19—illustrates a new embodiment for a high tech farm comprising a fish culture, a vegetation land, a wide-face sail windmill farm, a deep well water farm, and hydrogen/deuterium production farm, —in the efforts to maximize production out of a given farmland by maximum utilization of the hydrogen/deuterium-fed hybrid engine of FIG. 1, FIG. 4, and FIG. 6, wind power, and solar power to power the farms and to produce drinking water by oxidizing the hydrogen, wherein, the windmill 117, which is hereby extremely emphasized as having wide face sail blades and a pointed front nose cone 117A to split and divert the wind outward to bump upon the sails, —pumps up water from underground well 150 to supply it into the fishpond 20B and farm 140, while windmill 117 pumps compressed air to supply it as aeration underwater bubbles into the fishpond water 20 thru pipe 160 and pipe 161 to provide more oxygen to the fishes 20A. Most of the times, the wide-face blade windmills 117 produce compressed air, hydrogen/deuterium fuel to run the hybrid external/internal combustion engine of FIG. 1 or FIG. 4 that drives a DC generator and also drives the water pump 159 for the times there is no wind, —which is one application for the hybrid hydrogen/deuterium-fueled engine, while producing drinking water by oxidizing the hydrogen and by distillation of low grade water. The water pump 159 gets water from underground by opening the valve 155 when the windmill 117 does not work. By opening the valve 152 and closing valve 155, the pump 159 sucks out the waste matter 148 thru the pipe 145. The wind-mills 117 are given an elongated pointed nose 117A to the front, hereby extremely emphasized—to drive the wind outward to the blades, which is one highlight of this invention. Both the pipes 146 and the pipe 145 are used by the windmill 117 to supply water to the fishpond and to the agri-farm and to suck the waste matters, by manipulation of the valves 152 to 155. The water 20 in the fishpond is prevented from sinking into the earth 162 by the impervious layer/sheets 157, and by the compacted clay or glass/ceramics/tiles/concrete/cement grout or plastic sheets 156. The clay layer 156 is prevented from being sucked up by the waste suction pipe 145 by means of the overlaying tiles 165 and boulder stones 164. By way of the pipe 151 with the valves 152 to 155 opened, the windmill 117 effects suction of the waste matter 148 and discharge it to the farm 140. The earth dyke 163 is built circular to make the pond 20B circular, —the purpose of which is to drive the water 20 to a merry-go-round motion, once in a while, to make a vortex effect that brings all the dirt/waste matters 148 into the center of the water pond 20B where the suction pipe 145 is located—for easy short time cleaning of the pond. The farmland 140 is also underlain by a compacted clay or glass/ceramics tiles or plastic sheets 156 and its clay dike 158 to prevent irrigation water from escaping down into the earth 162. A bottom net 146 at about one foot about the floor 165 is provided to limit/prevent the fishes from agitating the waste matters they drop on the floor 165. It should be noted at this point that glass/ceramics products of various shapes and sizes are among the major products in the process of producing heat energy to run the multi-fueled hybrid engine of FIG. 1 and the engine of FIG. 6.

FIG. 20—illustrates a new embodiment to provide additional further opportunity to maximize utilization and to maximize benefits from the newly invented hydrogen/deuterium fueled hybrid engines of FIG. 1 and FIG. 6, wherein, in the efforts to produce heat energy to run the hybrid engines, the fuel burner or combustor is built into a smelting plant that produce various kinds of products, including metals, firebricks, charcoal/plant-distillates, glass/ceramics items of various sizes and shapes, photovoltaic solar cells, etc., and the exhaust heat is absorbed by the hybrid engines which converts the heat energy into electric power. One of the many special glass/ceramics products is a house or habitation building made up of cubicles/sections/components of buildings, and/or structural parts molded out of molten glass/ceramics/sand/stones by monolithic pour into a metal/concrete/clay mold without cracks/joints, and these cubicles are interlock/jointed to each other forming a large building being powered or served by the hybrid engines. The cubicles are molded to have windows 166, doors 167, a roof 165, an upward wall 158 above the periphery of the roof, walls 66, a bottom lip 168, and a joint key having a rubber water sealant 169, —ready for assembling a large building. This invention created a plurality of shapes and sizes of glass/ceramic cubicles serving as components of larger assemblies of structures depending upon the desired function of the resulting assembly, some of which are chambers serving as undersea houses or floating on waters including water transportations, while some are houses with fishpond culture on top of each house, to name a few.

FIG. 21—illustrates a further maximum utilization of the multi-fueled hybrid hydrogen/deuterium engines of FIG. 1 and of FIG. 6 used to provide electric energy for homes/buildings, urban or rural areas. The resulting assembly out of the cubicle of FIG. 20 is a new and innovative multi-chambered house being served by the new hybrid engine of FIG. 1 and FIG. 6 having glass swimming pool/fishpond 20B on the roof surrounded by the containment glass walls 158 with a water sealant 169, —for the purpose of commercial culture of various fishes 20A and the vegetation 144, serving as a cottage industry. The glass roof/bed 165 of the house serves as floor of the swimming pool/fishpond 20B. As the roof 165 is transparent, there will be so much sunlight getting into the house, hence, there will be a need to grow algae and plants floating on the water, same plants serve as food for the fishes 20A. Additionally, there is a white sand/gravel layer spread on the roof/bed 165 to reflect sunlight upward out of the water 20 aside from a solar trap thermal energy absorber serving as roof of the fishpond to keep the house cool. The windmill 117 having a wind splitter nose 117A, pumps compressed air thru the tower pipe 150 that serves as compression chamber, and discharge it as aeration tiny bubbles into the water 20 thru the valve 153, thru pipe 160, and thru pipe, —in order to supply enough oxygen for the fish 20A when the pond is over crowded with fish. By closing valve 153 and opening valve 152, the water pump 159 is run by electric power from the hybrid engine of FIG. 1 in order to suck out the waste matters from the floor of the fishpond thru pipes 160 and 161, and discharge it as fertilizer onto the farmland 140 to grow the plant 144. The waste water 138A is filtered by the land/soil 140 and the clean water drops down into the under ground water collector 141 which returns the water by gravity force into the fishpond to become clean water 20. The net 146 is provided to limit/prevent the fishes 20A from agitating the waste materials that dropped on the floor 165. Part 66 is a solid glass/ceramic wall which also serve as post of the house. During the casting process, the windows 166 and doors 167 are created thru the wall 66 upon which the louver window 172 and the door head 174 are attached respectively. In the process of erection, the ground 162 is compacted where the concrete spread footings 170 are laid on, upon which the lower lips 168 of walls 66 are rested.

FIG. 22—illustrates a new and innovative apparatus for a fusion driven externally heated engine 1, 2, 3, in the same way as the engine of FIG. 1, having a plurality of heat absorbing radiator pipes 10, 11, 12, 14, 22, containing cold compressed air, configured to absorb heat from a deep water Fusion Reactor which heat up the water by a blast of hydrogen/deuterium bomb 69 carried/delivered by a torpedo/ammunition 69 that is detonated by an underwater impact wall 176. The torpedo is fired from an ammunition magazine/submarine boat 175 thru the firing chamber 177. The submarine boat 175, serving as magazine, carries a plurality of torpedoes containing calibrated hydrogen bombs 69 to successively fire torpedoes to bump against the solid impact wall 176 in a regular basis to maintain the high temperature of the deep water and the production of hot steam rising out of the water to keep heating up the heat absorbing radiator pipes 10, 11, 12, 14, 22. The chamber 178 is provided to the boat 175 to keep it stay upright, at the same time the chamber 178 is used as access tunnel to the boat for refilling/restocking the boat with more torpedo bombs 69. There are several magazines/submarine boats 175 loaded with bombs 69 to take turns in firing torpedoes against the impact wall 176 for successive detonation. The ramp 179 is provided to snugly catch the firing chamber nose 177 to hit the impact wall target 176 at ball's eye. The perforated heat distributor metallic tent 22A is lifted by a structure attached to the heat collector radiator pipe 22 thru the rope 64 to maintain the exact elevation of submergence of the detonation apparatus 176, 22A, 64A, having the calibrated floaters 72 and 73 to make the rope 64 stay taut but not to pull down the radiator 22 into underwater. The radiator pipe 12 and 14 are calculated/calibrated/configured to float the whole apparatus such that the radiator pipes 22 are always above the water surface 65B. The heat insulator wall 66 is a perimeter circular fence to prevent seepage/waste or spreading of heat energy to the surrounding waters, serving as wall of the boiler chamber and serving as impact wall against the ocean waves, hence, it is a strong wall. The additional calibrated/adjustable weight 179A is provided to prevent the radiator 22 from rising too high above the water level 65B. The hottest heat absorbing radiator pipeline 24 does the final feeding to the exhaust power turbine 2 which drives the compressor 1 and also drives the electric generator 3. The large hot exhaust tail pipe 25 is splitted into plurality of smaller hot pipes which are each individually engulfed by a plurality of cold compressed air radiator pipes 10, herein extremely emphasized—in reverse air flow against the flow of the exhaust hot air, as one highlight to maximize absorption of the otherwise wasted heat energy and recycle same energy back into the radiator heating systems to drive the power turbine again and again. The part 43 is an exhaust chimney outlet for the warm air expelled by the power turbine, same air is already lukewarm not hot anymore because the heat has been absorbed by the cold compressed air contained in pipes 10.

FIG. 23—illustrates a new and innovative apparatus for a fusion driven engine 1, 2, 3, wherein, the fusion reactor is a dug-out pit 179B in the ground in shallow waters 65B beside a body of water or irrigation canal/pipeline or large water tank supplied with fresh irrigation water preferably distilled water to prevent salt accumulation in the reactor pit, and wherein, fusion is attained by compression of the liquid deuterium, just the way it is done illustrated by FIG. 8, wherein further, the rear section of the bullet head 69 contains a heavy weight solid piston/hammer that compresses the liquid deuterium upon impact with the wall 176—as one of the highlights of this invention. In another alternative, as shown in FIG. 7, fusion is attained by detonating a dynamite that surrounds the liquid deuterium which is contained in the bullet 69 of this apparatus. In another alternative, the dynamite is surrounded by the liquid deuterium in a strong container. The charge inside the cartridge 69B is detonated by the underwater firing chamber/big gun 177 thereby firing the speeding bullet head 69 which gets impacted with the underwater target impact wall 176. The violent impact detonates the dynamite at the front section of the bullet, thereby creating two violent forces that sandwich the liquid deuterium, —thereby triggering the fusion reaction. The magazine 175 is filled with compressed air to prevent water getting into the firing barrel 177 which is pointed slopping downward and the impact wall 176 is positioned lower. Further, the magazine 175 is keep refilled with the bullet assembly 69A as the gun keeps firing to sustain the high temperature required in the oven to heat up the plurality of heat absorbing radiator pipes 22 which, by means of the power header pipe 24, runs the exhaust power turbine 2 which drives the air compressor 1 and also drives the electric generator 3. The pit 179B accumulates the pistons/hammers and metal fragments which are then recovered, smelted and poured into molds to reproduce the bullet heads 69 together with its heavy solid pistons. The perforated steel plate 22A distributes evenly the heat energy or hot steam rising from the fusion reactor. The exhaust pipe 25 containing the hot air expelled by the power turbine 2 is splitted into a plurality of small pipe branches to distribute the otherwise wasted heat energy into the upper rear section of the oven via exit 43 to provide pre-heating to the cold pipe 10 containing fresh cold compressed air, being pushed by the compressor 1 in reverse air flow against the hot air, to maximize absorption and recycling of the exhaust heat energy, —before it is finally allowed to get out of the oven and re-directed into a water heater/boiler that produces distilled water for drinking/irrigation and for spraying into the compressor 1. The heat insulator structure 42 serves as sealed roof of the oven to prevent the wind from stealing the heat energy. The magazine cover 181 is provided with counter weight to ease operation in reloading bullets 69A into the magazine 175 which is further provided with air valves at its mid-section to stop the compressed air from releasing upward because the water will rush into the gun 177. The watertight compartment or chamber 180 contains the mechanism for successive reloading the gun 177 and to expel the cartridge 69B. The watertight manhole/tunnel 178 serves as access to the reloading chamber 180 for maintenance activities. The rock/concrete or compacted clay foundation 74B serves to limit seepage of water into the reactor pit 179B which also serves as a sump to collect water that boils/produces the needed steam. It is hereby extremely emphasized that this detonation/fusion reactor chamber/pit 179B is also preferably made into a large detonation high pressure water pipe or underground underwater tunnel that directly supplies high pressure steam into and to drive a large exhaust steam-turbine engine 2, —as one important highlight of this invention. The concrete footing 74 is provided to hold the machines in place with minimal vibrations or possible dislocations due to various forces.

FIG. 24—illustrates a new and innovative embodiment for a small fusion-run power plant constructed on dry land without water as part of the process, —except distilled water being sprayed into the compressor 1, —wherein, the deuterium bullet/bomb 69 makes a fusion detonation in mid-air thru supper compression upon reaction with the target impact wall 176, —thereby producing supper high temperature in the reaction chamber/oven. The heat energy is evenly distributed around the oven by the double layer perforated sub-roof 22A which also controls the flying fragments from the bomb 69. The molten fragments from deuterium bomb 69 are collected by the funnel 179C and drop into the collector bin 41. The barrel of the gun 177 pierces thru a tight fit hole thru the wall 66 to prevent leakage of heat energy from the blast of bomb 69. The compartment 20 is filled with water to prevent overheat of the gun 177. The magazine 175 holds a plurality of bullets 69A for successive firing and detonation of the bomb 69A by manipulating the trigger 180. It is hereby extremely emphasized, at this point, that there is no need for oxygen air to burn the fuel, hence, there is no inlet to prevent outside atmospheric air getting into the furnace, thereby, the fusion heat energy is totally confined inside the furnace or a long time until all absorbed by the cold compressed air in the heat collector radiator pipes, additionally, there is a very bright advantage in smelting because the materials being smelted are reduced to purity rather than being oxidized. This is a very bright highlight of this invention. The heat insulator wall 83 also serves as shock/pressure containment wall to prevent escape of heat energy. The cold compressed air supplied by the compressor 1 into the heat absorbing radiator pipe 10 picks up the heat energy expelled by the power exhaust turbine 2 into the chimney 25. Then the pre-heated compressed air proceeds into the radiator pipes 22 to pick up more heat from the oven, then flows into the radiator pipes 23 to pick up the higher temperature heat energy from the oven for final heating up, and then the superheated compressed air is collected into the header power pipe 24 which is communicated to make the super energized compressed air push the power turbine 2 which drives the compressor 1 which in turn drives the electric generator 3. The part 43 is the waste air outlet expelled by the power turbine 2, while 43A is the waste air or helium outlet from the fusion oven. There is also provided a liquid deuterium 7A that gets into the piston injection pump 33 which spits high pressure deuterium 7A into the fusion flame created by bullet 69 exactly at the time of detonation of the bomb 69—such that the injected deuterium 7A is subjected to the super high temperature of the fusion flame, hence, the injected deuterium 7A also reacts to produce additional fusion flame into the oven without going thru manufacturing process of the deuterium bullet 69, —thereby the fusion flame is continuously sustained by the high pressure fuel supply pump/tube 33. Additionally, a capsule of liquid deuterium is also released thru a conveyor into the fusion flame at regular interval as an alternative to maintain continuous fusion flame without further spending large amounts of electric arc to attain fusion/detonation. The door 21A is provided for maintenance access to repair the funnel 179. The concrete wall 83A also serves as footing/foundation carrying the wall 83.

FIG. 25—illustrates a further maximum commercialization for the most efficient energy converter ever invented engine shown in FIG. 1 of this application, —by means of a new and innovative solar thermal converter into electricity, —hereby showing a solar trap/oven 16 that accumulates solar heat that gets in freely into the oven but the wind is prevented from stealing the heat energy, along with trash/multi-fuel smokeless burner 26A that contributes heat energy into the solar trap/oven 16, and the heat energy is collected from the solar trap 16 by the heat absorbing radiator pipes 10 and 23 which contains the energized compressed air to push the exhaust power turbine 2 which drives the electric generator 3 together with the air compressor 1 which drives compressed air into the heat energy collectors/absorbers-radiator pipes 10, 11, and 23 in a continuous process of energy conversion and heat recycling in the most efficient way ever provided by God, as illustrated by FIG. 1 of this patent application, wherein parts: 1 is an oppositely rotating wide-face blade turbine compressor combined with final output centrifugal pump that supplies compress air throughout the system, same air serving as heat absorbing agent; 2 is an oppositely rotating wide-face blade exhaust power turbine which is pushed by the expanding hot compressed air, and which drives the generator 3 and the compressor 1; 3 is an oppositely rotating multi-layer drum Direct Current electric generator driven by the power turbine 2, so there is no need to control the voltage output, because the electrolysis machine does not care if the voltage is variable, —anyway, the inverter and the transformer are down stream from the electrolysis machine—hereby extremely emphasized as one major highlight of this invention; 132 is the roof of an existing house, which carries the solar trap 16; 8 is a water misting device that supplies cold water vapor out of distilled water for high humidity into the compressor 1, —to provide more matter into the compressed air serving as steam that expands when heated, —for purposes of providing more heat absorbing capacity, —in the process of efficiently collecting the heat from the solar trap oven 16; 10 is a header pipe directly supplied with high humidity compressed air from the compressor's centrifugal pump; 10A is a plurality of evenly spaced small radiator pipes communicated to and along the length of the header pipe 10 by which it is supplied with compressed air, —serving to collect heat escaping downward from the solar trap oven 16, —and to keep the house cool; 126A is a reflective aluminum foil or whatever shinny metal, serving as bottom floor of the oven 16, to bounce the infrared light back upward to the oven 16; 126B is a mirror or any reflective metal sheet to bounce back upward the solar light/heat/infrared light, —to prevent the house getting hot, additionally, an R-30 heat insulator covered by a black metal sheet is laid over the mirror, —and the black metal sheet is sprayed over by black charcoal powder to prevent the sunlight heat energy from bouncing back upward, —to make the solar trap 16 most efficient; 22 is a plurality of pre-heated pipes which contains the compressed air that graduated from engulfing the exhaust air pipes 25 from the power turbine 2 and from the exhaust air from the oven 16, —and which is communicated from the downstream end of pipes 11; 11 is a plurality of horizontal coils of enlarge cold pipe containing the cold compressed air from the compressor 1 thru pipe 10A and containing the small radiator hot exhaust tubes/pipe 25, —as hereby extremely emphasized to be in reverse air flow against the hot air flow from the heat suppliers, such as, the power turbine 2 and the oven 16, —in order that the cooler compressed air gets in touch with the lower temperature exhaust air and—as the compressed air becomes hotter it is the one getting in touch with the higher temperature exhaust air nearer to the mouth of the power turbine 2, —giving extreme emphasis that each pipe 11 engulfs a smaller hot air exhaust radiator pipe 25 that is communicated with the exhaust of the power turbine 2 and also communicated with the outlet of the solar trap/oven 16 to contain the hot air expelled by the power turbine 2 and by the oven 16, —in order to recapture and recycle the otherwise wasted exhaust heat energy back to the power turbine 2—to maximize heat absorption efficiency ever; 107 is the intake gate or entrance gate for mixture of fresh air and powdered fuel, —where powdered fuel or organic vapor fuel is hereby extremely emphasized as one more highlight of this invention. Same gate has gate valve or throttle 181 to allow hot oxygen from pipe 32, wherein by venturi vacuum action, it allows fuel and fresh oxygen air getting into the smokeless multi-fuel/trash burner 26A that supplies supplemental heat energy into the solar trap/oven 16 when the sun is out; 83 is an iron double sheet, having heat insulator materials, specifically carbon granules as a new use of carbon as one highlight of this invention, —in-between shell-walls of the multi-fuel burner 26A; 181 is a shut-off throttle or window which is closed to prevent cold fresh air from getting into the intake gate 107 when the valve 21 is open to maximize intake of hot oxygen air from pipe 32 expelled by the power turbine 2 as one highlight—thru tailpipe 25 for more perfect combustion of the trash fuel, —and to recapture or recycle the otherwise wasted heat energy expelled by the power turbine 2—back to the solar trap/oven 16, —to drive and re-drive the power turbine 2 again and again, —as one highlight of this invention; 109 is an upward chimney in the form of a catalytic converter directed to deliver hot combustion air, less NOx— but contributes what ever heat it produces and which is made hotter by the heat produced by the NUCLEAR/FUSION RACTOR 26—as an additional high-temperature heat contributor to decompose NOx, —which heat energy is a recaptured energy into the solar trap or oven 16—which is a new use or function of the catalytic converter being a heat contributor to the oven 16—as one more bright highlight of this invention; 126 are movable/adjustable horizontal narrow shinny plates serving to reflect or redirect the solar light downward into the solar trap 16, manipulated when the sun is less than 60 degrees angle above the horizon, in order to maximize sunlight getting into the solar trap 16, and which is covering the solar trap 16, —exposed to exclude the wind, made strong enough to withstand at least 40 mph winds, —in order to maximize harvesting efficiency for maximum benefits from the solar heat; 124 is the outer transparent roof cold sheet that allows sunshine to get thru into the solar trap 16, and which is covering the solar trap 16, —exposed to exclude the wind, made strong enough to withstand at least 40 mph winds; 125 is the inner transparent roof hot sheet that allows sunshine to get thru into the solar trap 16, and which is covering the solar trap 16, and which excludes the entrapped heat energy from getting in touch with the outer roof cold sheet 124, —thereby preventing the solar heat from escaping upward back to the atmosphere, —same roof sheets 124 and 125 are made waterproof serving as roof 132 of the house/building as has been illustrated by FIG. 21 of the U.S. Pat. No. 6,327,994, —additionally hereby being extremely emphasized that this solar trap/oven also covers the yard of the house to maximize solar harvest within the limits of the whole property; 131 is the Electrolysis Device containing distilled water run by DC direct output from the Generator 3, —in order to produce hydrogen/DEUTERIUM being continuously fed into the fuel cell or hydrogen burner or FUSION reactor 26 as a major highlight of this invention, to contribute final heat into the final hot pipe upstream of the power turbine 2, —same Electrolysis Device 131 contributes all the oxygen that it produces into the hot oxygen air pipeline 32 to further perfect the combustion of the solid fuel 34—which process is one major highlight of this invention in support of the smokeless incinerator 26A; 16A are the sunlight rays getting into the solar trap 16 by passing thru the transparent roofs/walls 124 and 125; 23 are the plurality of heat absorbing radiator small tubes, communicated with the downstream end of pipe 22 to take the pre-heated compressed air that graduated from the turbine exhaust pipe coils 11, —constructed and laid in multi-layers inside the heat containment chamber or solar trap 16, —imperatively made into small radiator tubes to maximize contact of the cold compressed air with the hot oven air—to speed up absorption of heat into the large volume of compressed air passing thru inside the radiator tubes 23; 25 are the header pipes and the small radiator pipes containing the hot air expelled by the power turbine 2 and expelled by the solar trap oven 16 as being pushed out by the fuel burner 26A; 26A is the multi-fuel smokeless burner chamber having the containment walls 83 of iron/steel/firebricks, used to burn trash, powdered organics, oil, wood, alcohol, hydrogen, diesel, acetylene, and gasoline, —the purpose and function of this burner is to burn fuel without producing NOx, —it being low pressure and low temperature, —it being noted herein that the fuel burner 26A is one of the many contributors of heat energy into the gas turbine engine illustrated in FIG. 1; 16 is the solar trap oven or heat containment chamber containing all the heat absorbing coils of radiator tubes 11, 23, and 25. This oven 16 is supposed to be a flat box serving as roof 132 of the house or to cover the roof 132 of an existing house to retrofit the house with solar oven 16; 21A is a gate valve used, when closed, to prevent the exhaust heat energy from getting out to the atmosphere and to divert it to pipe 32; 21 is a gate valve used, when opened, allows the exhaust heat energy to get into pipe 32 in order to recycle the otherwise wasted energy; 32 is a hot clean air pipeline to bring pre-heated oxygen air from the power turbine 2 into the smokeless fuel burner 26A for a more perfect combustion of the fuel 34 and to recapture/recycle the otherwise wasted heat energy expelled by the power turbine 2 and put the heat back into the oven 16 and back to drive the power turbine 2 again and again; 108 are multiples of perforated tubes placed into and above the fire or down stream of the fire and inside the fuel burner chamber 26A, containing fresh oxygen air from the intake 107 and serving to super pre-heat the oxygen supply and to distribute the super heated oxygen close to the fuel 34 and around the burning chamber 26A to oxidize unburned gas fumes or smoke before it gets out of the burner chamber 26A or out thru the chimney/catalytic converter 109, —the perforations of 108 serving as nuzzles for the hot oxygen; 33 is the entrance pipe for compressed air to start up the power turbine 2 to drive the compressor 1, —and further to supply super hot oxygen air into the fuel-burner/fusion-reactor 26 after the engine had started and already running; 26 is a burner fed by high volatile fuels/DEUTERIUM, oxidized by super-hot compressed air supplied by the pipe 33 from pipe 23 to supplement heat energy into the whole system when the sun is out, —same burner 26 being preferably a NUCLEAR/FUSION REACTOR which is being used for various smelting processes and for destructive distillation of organics/wood/coal, —as a major highlight of this invention, —wherein further, for large power plants, the reactor 26 is placed outside the pipe 109 or 23, but rather inside the solar trap oven 16 to prevent meltdown of the pipeline, —such that the energy used for smelting is recaptured by the radiator pipes 23—as hereby extremely emphasized as a major highlight of this invention; 34 are solid, wood, liquid, gas, low grade oil, and trash fuel being burned in the smokeless multi-fuel burner 26A; 37 is a water heater tank containing water into which the exhaust tail pipes are submerged in coils in order to heat up or boil the water for production of distilled water being supplied into the sprayer device 8; 42 is a heat insulator enclosure to prevent cold air/wind from getting in contact with the heat absorbing radiator pipes 11, and further serving as side walls of the solar trap-oven box, —to conserve heat; 43 is a header exhaust hot air tailpipe containing the exhaust air from the power turbine 2 after graduating from the lower heat exchange coil pipes 11 and 25; 43A is a header exhaust hot air tailpipe containing the exhaust zero-oxygen hot air from the solar trap/oven 16 after graduating from the upper heat exchange coil pipes 11 and 25A, —same pipe 43A branches into a plurality of small heat radiator tubes, submerged into the water tank/boiler 37 and made to supply the otherwise wasted heat energy recaptured or recycled into the water heater or water boiler 37 to produce distilled water for use in the water mist spray by the device 8 into the compressor 1—to provide into the compressed air an additional matter that expands when heated, —a means of increasing the heat absorbing capacity of the compressed air, same process is one of the major highlights of this invention.

FIG. 26—illustrates an embodiment of a new and innovative device serving to illuminate in details some of the basic principles involve in FIG. 1 of this application, most specially the fusion plasma torch 26 that contributes the final high temperature heat energy into the engine of FIG. 1, to enable mankind to maximize benefits from any given fuel. Maximum benefits from fuel is achieved by recapturing and recycling the tail energy to do a secondary and a tertiary job. Additionally, the heat energy taken out from the engine in its cooling process is also recycled back to help run the same engine and to produce distilled water being fed into the same engine. As shown in this drawing, there is the reactor/heat producer fusion chamber 26 enclosed by the container 69 which is made up of electric insulator materials, such as, glass, ceramics, fireclay, basalt rocks, etc., —to confine the electric arc 88 that ignites the high pressure hydrogen/deuterium into fusion reaction, thereby producing the fusion flame 26A that exits thru the bottom outlet of the fusion chamber 26 in the form of a fusion torch 26B that melts the raw materials 32A in process of smelting glass/ceramics/steel/metals. The flowing molten materials 15 drops down into the molding 19 where the process of annealing and cooling takes place by which the heat energy is taken up by the cold compressed air that is continuously passing thru inside the heat absorber pipe 22, which is communicated to the power pipe 24 that drives the power turbine 2 by way of the exiting high power hot compressed air. As a bright highlight of this invention, it should be noted that the hot smelting chamber/power pipe/duct 24 is in super high pressure and is directly communicated to the reactor/fusion chamber 26, thereby, the reactor chamber 26 is also in super high pressure, hence, the hydrogen-deuterium fuel released/contained in the reactor chamber is also in super high pressure/compacted state at the time when the deuterium fuel is stricken/bombarded by heavy electric arc. This is a very high advantage for attaining fusion reaction wherein the hydrogen-deuterium fuel is compacted at the time it is stricken/bombarded by heavy electric arc. To prevent melting of the glass/ceramic container/fusion reactor chamber walls 69, it is submerged into the surrounding distilled water 20A which is contained in an electric insulator 37—also to prevent short circuiting of the high voltage electric arc 88 it being that distilled water is an electric insulator—as one bright highlight in applied science claimed in this invention. The fuel supply tubes/nuzzles 32 & 33 are also made of glass/ceramics or non-conductors to prevent short circuiting of the electric arc 88. The section of the steam pipe 6 and of the water supply pipe near the electrode 86 are also made of a non-conductive material, such as glass or ceramics. It is hereby extremely emphasized that the water supply 20 from the water tank 7 and the cooling water 20A are both made of pure distilled water which is also a non-conductive material to prevent short circuiting of the high voltage electric arc 88, and also to prevent accumulation of salt/calcium upon the outside surface of the fusion chamber 69 and on the inner surface of boiler container 37, which is a new use or application of distilled water, —hereby noted as among the major highlights of this invention. The large electric cable wire 89 brings in a large supply of high voltage direct current electric power from a large capacitor/energy bank, which is charged by windmills and by the lightning, —onto the electrode 86 to produce the electric arc 88, which ends down onto the anode plate 182 which is grounded by grounding negative rod 183. It is hereby extremely emphasized that the fusion chamber 69 and the boiler container 37 are made transparent/translucent in order that the fusion process is observed by the operators to make necessary adjustments during the process, and the boiler is surrounded by photovoltaic cells to convert the fusion light into electric power. If the boiler is made of opaque materials, then a window is provided for observation purposes. To start producing the fusion flame 26A, liquid/high pressure hydrogen/deuterium is allowed to enter the fusion chamber 26 thru the pipes 33 by opening the valves 21 and immediately followed by switching on the electric power to the electrode 86. The fusion chamber 26 is made long enough to provide enough time travel of the deuterium gas and time long enough for the deuterium being exposed into the high voltage electric arc 88. The bottom opening of the reactor chamber 26 for the fusion flame 26A to exit is constricted into a nuzzle initially having a removable plug/cork, which is provided with a copper conductor rod at its center, in order to increase the density of the hydrogen/deuterium that got into the reactor chamber 26 while waiting for the electric arc 88 to pass thru it. The electric arc 88 will blow off the cork and opens the nuzzle upon strike of the lightning 88 and releases down the fusion flame/torch 26B upon the glass/sand 32A loaded on the conveyor 44 to become molten glass/ceramics 15, which pours into the mold 19. The moment the fusion flame 26A is created and/or existing, the operators take the opportunity to successively create more fusion flames by injecting high pressure hydrogen/deuterium upward, thru the nuzzles 32 by opening the valves 21A, into the super hot fusion flame 26A to trigger a continuous fusion reaction without using or consuming electric arc 88 again, —which fusion reaction in continuous process is one of the major breakthroughs and highlights claimed by this invention. As the fusion flame container 69 becomes hot, surrounding and in touch with the fusion flame 26A, the water 20A, reacts immediately by boiling to keep the temperature down to 100 degrees centigrade to prevent melt down of the container 69. The created hot steam 6A moves up into the hot pipe 6 which splits into a plurality of small radiator pipes that make a plurality of loops inside the pipe 22 and 23 where the cold compressed air absorbs the heat energy of the steam 6A inside the radiator pipe 6, and then the pre-heated compressed air proceeds into the smelting and annealing chamber to absorb the heat energy from the molten glass/ceramics 15, to pick up the heat energy from the annealing mold 19 and to pick up the heat energy from the fusion flame 26B, at which point, the compressed air is then super energized, by which energy the compressed air kicks and drives the exhaust power turbine 2. The hot air exhaust expelled by the power turbine 2 is then redirected/recycled by means of small radiator tubes that get inside the pipe 22 for the compressed air to absorb the heat energy expelled by the power turbine 2. The steam 6A having been exposed to the cold compressed air of pipe 22, condenses and drops into the tank 7A as a distilled water, which is recycled back and added to the water 20 inside the tank 7. The pipe 6 brings the uncondensed steam 6A out of pipe 23 and up into the condensation tower 39A where the steam/vapor 6A is totally condensed by the cold wind blowing thru the pipes 63 across the condensation tower 39A. The further condensate drops down into the collector tank 7B as a distilled water, which is recycled and added back to the water supply 20 inside the tank 7. It should be noted at this point that the condensation tower 39A having a plurality of small wind radiator tubes/pipes 63 piercing across the tower 39A is a new invention and a technology breakthrough which is hereby extremely emphasized as on of the major highlights of this invention applied for patent. The to speed up condensation of the steam 6A inside the condensation tower 39A, the steam 6A must be pressurized at high pressure, hence, it is important that the water supply 20 be highly elevated above the boiler 37. The water surface elevation inside the boiler 37 is controlled automatically by the float valve 21E, —the same as the toilet tank controller. This type of distillation, and smelting/manufacturing process is specially designed for large volumes of glass and ceramics for molding large monolithic cubicles, sections, structural beams, posts, all parts of houses, buildings, and distilled irrigation water, in addition to large cylinders/chambers and pipes serving as underwater houses, for underwater or floating ocean transports, and for storage of gas, hydrogen, deuterium, and water, —which technology applications are among the major breakthroughs and bright highlights of this invention, —hereby applied for patent.

FIG. 27—Illustrate an embodiment of a new and innovative device serving to illuminate some efforts for maximum usage and commercialization of the hybrid fusion engines in accordance with Claim-1, and further to illustrate recycling of food that was processed by energy but became wasted matter thru fish farming, wherein, a water tank 20 floating on the lake 65B or ocean for direct exposure under the sun, not under the turbid water, has a water tight bottom floor 74 filled up with waste organic matter 140, from a fishpond/chicken farm/piggery farm/livestock farm, serving as fertile soil of about one foot thick, —for purposes of growing algae 189 and water plants to be harvested, processed, and given back to the fish/animals for food. The water tank 20 is made to prevent outside water from getting in because the algae 189 requires a little bit salty or brackish water for it to grow faster, —hence, the fresh water in the lake must be mixed with salt water in proper proportion inside the water tank 20 or growing agricultural pond. The whole water tank 20 is buoyed/carried by compressed air chambers made-up of crisscrossing walls 73 and the airtight cover plate/floor 74, —and compressed air is introduced into the chambers by the nuzzle valves 187 that pierced thru the cover plate/floor 74. As the chambers are open-bottoms, the compressed air is used to push down the water levels 65 and 65A inside the chambers to produce more buoyant force carrying the water tank 20. Even without pressure gauge instruments, it can be practically calculated when to stop injecting compressed air from the compressor 159A thru the distributing pipeline 186, —by observing the desired submergence of the vacuums chambers 71 which are provided to serve as driers for the feeds being processed, and also serving as buoyant floater carriers for the tank 20. Part 73A is the open bottom lips of the walls 73. It should be noted that, in the absence of the compressor, a plurality of empty waste bottles/chambers are bundled in nets/sacks sausages are placed as buoyant carriers under the water tank, as illustrated in the preceding drawings/figures, —as one bright highlight of this invention. The structure platform 190 carries the compressor 159A in place. By closing gate valves 152 and 154 and having the gate valve 153 opened, the compressor 159A supplies compressed air from the atmosphere, which contains carbon dioxide, into the water by tiny bubbles thru the perforated bottom section of the nipple pipes 161 which are supplied by pipes 160 and 145. It is hereby by extremely emphasized that carbon dioxide is mixed with the water thru the introduction of compressed air—as a living/growing requirements of the underwater plants, —as one of the highlights of this invention. Hence, as a minimum requirement, several fishes are placed to grow inside the screen cages 188 to supply carbon-dioxide into the water. It should be noted at this point that the fishes are confined inside the cage 188 to prevent the fishes from eating/destroying the algae being cultured and being grown in large quantities for the production feeds. Aside from the oxygen from the compressed air from the compressor 159A, the growing algae provide abundant oxygen for the fishes inside the cage 188. It should also be noted that the cage 188 is provided to prevent the algae from getting into the pipe 145 when it is functioning as suction pipe in transferring the water 20A thru the pipe 145, thru the open gate valve 154, by running the water pump 159 and into the filtration water tank 37 via pipe 146. The water transfer is done in order to clean/clear the water 26A as it is becoming turbid or muddy due to the decomposition of organic wastes from the fishes and the fertilizer soil 140, —by passing the water thru the filtration bed layers of 140, 185, and pea gravel 184 inside the tank 37. By the water head created in tank 37, the filtered water is forced to return thru the open window 76 back into the tank 20. Some additional choices for buoyant floaters 72 are in the form of sausages of empty containers/pipes, which are also used to float the floating agricultural water bed 20 and 37.

An additional way of making this agricultural water bed is by constructing small shallow units of at least 4 feet or more wide by 6 feet or more in length by 1 foot deep water, and a plurality of these units are floated on tank 20 or on lakes fishponds spacedly arranged row by row such that a maintenance small boat/raft passes in between beds to harvest the algae and to plant some more algae. It is important to note that, in order to maximize benefits from the waters on which these water beds are floated, a plurality of fishes are placed under the beds, for purposes of growing large quantities of fish by feeding them with the algae produced by the beds. Each bed has a flat floor made up of bamboo/pipes frames that serves as floater to carry the fertile soil on the floor. The top lip of each bed is at least 6" above the water and framed by bamboos/wood/metals/plastics/glass/ceramics, —to bring down the cost of construction. The sides of each bed are made of screens thru which the algae will grow outward such that the fish will be able eat the protruding tips of the algae thru the screen, —but prevents the fishes from getting into the bed and destroy the algae plantation. The lips of the bed is raised above the water by means of floaters made up of empty containers attached by strings to the frames of the bottom floor. These small units of water beds do not need aeration due to the carbon dioxide produced by the fishes, —but the fishes being grown under the beds are supplied with oxygen by means of compressed air from the compressor 159A which is run by hybrid fusion-scavenger engine illustrated by FIG. 1 and FIG. 4. The organic waste matters of the fishes under the beds are gathered by wide sheets stretched below the fishes and placed as fertilizer for the floors of the water beds. This innovative devices for large scale production of algae is hereby claimed and applied for patient, —as algae cannot grow in deep waters.

FIG. 28—illustrates an embodiment of a new and innovative device for further application, utilization, and maximum commercialization of the hybrid plasma-fusion scavenger of FIG. 1, and FIG. 4, wherein, a transportation vehicle is made in the form of large fish-apparatus 6 provided with engine 1, transmission gears, and wheels 193, with the ability to run on land. The fish 6 is made water tight, able to float as a boat on deep waters, and provided with water propellers 194 with the ability to travel to at good speed on the lake and on the ocean. The fish-apparatus 6 further having an air compressor, a compressed air tank, a water pump, and a water tank, —for purposes of having the fish-apparatus 6 able to submerge under the ocean to serve as a submarine home/houses/hotel which is provided with oxygen by electrolysis of the sea water, in which process, the hydrogen-deuterium gas produced is supplied to run the fusion engine 1. The fish further having a strong low level bumper 192 to protect the whole fish 6 and to prevent debris from getting under the fish 6. A door 21A is provided to allow the driver 191 to get in and out of the fish 6. There are also the manholes 195 and 196 serving as entrance door for live fish and water being transported. Inside the fish body/tank 20 are multiple subdividing walls serving to segregate different kinds of fishes selected for the market. The bottom drain manhole 197 serves as fish outlet, waste matter outlet, —and water inlet for the process of getting the housefish 6 underwater to become free from the turbulent water waves on the water surface. The spar 198 serves as decorative ornament which carries lanterns and headlight to get the attention of the pubic. The whole body 20 is made of transparent glass bubble or ceramics/metals in multiple segments jointed together, if not made one whole monolithic piece. Several units of this submarine houses are deployed floating or submerged under the sea for human settlement on the ocean to save the land for agricultural production. As a further application, the body 20 of the fish 6 is made into a large straight cylindrical tank having fines/tail, and filled up of natural gas/hydrogen/deuterium at high pressure—for purposes of transporting fuels in the communities. Additionally, the large cylindrical glass/ceramic/metallic tank fish 6 is also used to contain other gaseous, liquid, food-grains and powered organics, —for transport across the sea/ocean/land following an undersea cable-railway electronic-coded path and bar-coded path—for high speed navigation and driving under the sea, —as one bright highlight claimed by this invention. A plurality of this large cylindrical fish 6 are jointed together to form a long train transportation for land and underwater. This fish 6 is further armed to defend itself on the high seas, —by torpedo, by missiles, by un-man radar balloons, by laser guns, fusion bullets/weapons, etc.

Illustrates in detail a small shallow unit of an algae 189 grower floating pond/cage, energized by the engine of FIG. 1/FIG. 4, having a screen siding 199 and floated on water in order, as it is hereby extremely emphasized, to expose the algae 189 to good sunshine above the turbid water. The whole apparatus is made of cheap materials locally available in the farms, including bamboos/empty pipes/waste containers/bottles, —serving as floaters, and structures. The box 68 and the structure 74 are made up of bamboo splits. Said box 68 contain the fertile soil 140 at more or less one-foot below the water surface 138 by means of the bamboo floaters 71 and the adjustable floater 71A which contains air and water at an adjustable ratio depending upon the desired bed submergence. The frame structure 142 is made up of whole bamboo as floater and which further functions to serve as lifting bar carrying the weight of the soil 140, and further serving as holding frame for the screen/net 199. The screen/net 199 allows the algae 189A to grow outside the cage to become available food for the fishes 20A outside the cage. The bar 100 holds the posts 142 to hold the floater 71A.

FIG. 30—illustrates a new embodiment of a new design for a newly invented device/engine for and in support to the various newly invented processes, as has been illustrated by the herein FIG. 1, to implement this invention's mission to maximize the benefits out of fuel and from other heat energy sources, including but not limited to, free God's gift Fusion Energy solar heat, geothermal heat, exhaust heat from various kinds of smelting furnaces, cooking/distilling ovens, steam engine or steam turbines, heat exhaust from various kinds of engines, deuterium fed engines, fuel cells, trash/organic burners, gas burners, oil burners, cement making furnace, warm/hot atmospheric/tropical/desert air, and warm waters of the ocean, among others, wherein, in the process of producing glass/ceramic plates/structural parts and steel/metals/firebricks/fireclay/calcium-carbide/cement by smelting, in the process of producing roosted coal/coke/charcoal/resin/distilled water and evaporated organics, or in the process of cooking/steaming foods or concrete blocks, —the exhaust heat energy coming out of the furnace/oven 34A is channeled and sucked into the partial vacuum chimney/radiator 15 as the first downstream section of the chimney, which branches into several coils of heat emitting radiator pipes or tubes that are submerged into a boiler 4A of water where the otherwise wasted excess heat energy is absorbed or recaptured by the water being converted into steam which rises thru the steam pipe 6 which is communicated to drive the steam engine/turbine 4 serving as a second electric generator engine—as the first by-product of smelting. For purposes of further recapturing the excess heat energy coming out of the steam engine 4, the steam is channeled thru coils of multiple branches of heat emitting radiator pipes/tubes 9 submerged into cold compressed air inside the first stage preheating cold air duct 10 being supplied by the centrifugal compressor 1A—in order to further recapture the otherwise wasted heat energy contained in radiator 9 expelled by the steam engine 4 in order to condense the steam into distilled drinking water, as a third by-product of smelting, which drops down thru the water collector pipe 7A which brings the distilled water into the storage tank 7 for the community supply. For further scavenger recapture of the otherwise wasted excess heat, the chimney 15 coming out of the steam boiler 4A is then coiled into multiple branches of heat emitting radiator pipe 15A serving as heat source, as the second down stream section of the chimney, placed inside the final stage heating air duct 24 and submerged into the already pre-warmed compressed air coming out of the steam condenser air duct 10 so that the pre-warmed compressed air is further heated up by absorbing the excess heat from the chimney 15A. Due to limited space in the drawing, as it is not shown, it should be noted that the chimney 15A is made separate from the chimney 25A and goes up thru air duct 10, 22, and thru to preheat the water 37, —in order to prevent back flow from the tailpipe 25A and to create partial vacuum at the exhaust of the furnace 34A to suck out the oxygen air from the annealing chamber 12. For further scavenger/recapture of the heat energy, the third downstream section of the chimney is coiled into multiple branches of heat emitting radiator pipes/tubes 25A placed inside the down stream section of the cold condenser air duct 10 so that the pre-warmed air passed the condenser is further heated up by absorbing the heat energy from the third downstream section 25A of the chimney. For further scavenger recapture of the heat energy, the upstream point of first stage cold corn-pressed-air duct 10 is provided with a branch out 22 serving as a fresh cold compressed air chamber/duct into which the fourth down stream section of the chimney, in the form of a multiple branch coiled heat emitting radiator 25B, —is submerged so that the fresh cold compressed air in chamber 22 will picks up the heat energy contained in the now lower temperature section of the chimney 25B. For further scavenger recapture of the heat energy, the fifth downstream now very low temperature section of the chimney, in the form of a multiple branch coiled heat emitting radiator 25C, —is submerged so that the water 37 will pickup the last droplet of the remaining heat energy contained in the last section of the chimney 25B—in order to pre-warm/heat the low grade water 37 to be distilled, most specially when the sun is out, —thereby achieving maximum recapture and recycle of the heat energy expelled by the furnace/oven 34A. It being that the compressed air in the air duct 10 is fresh clean, and has just got heated up by the heat emitting radiator steam condenser 9 and further heated up by the heat emitting radiator exhaust chimney/tail pipe 25A, as a first stage heating, it is just logical that a portion of the clean hot compressed air is used to circulate at a regulated flow thru the pipe/air duct 25D to warm up the house or building where people dwell or work in a comfortable environment. Since the warm air in the building needs to be continuously replaced by fresh warm oxygen air, the warm air of the building is exited and entered into the down-stream section of the pipe 25D which is coiled in multibranches radiator into the upstream of water 37A to make the cold night time chilled water 37A recapture the residue heat energy contained in the building's exhaust warm air before it is finally thrown out by chimney 43A—in order to recycle same heat energy to pre-warm up the water 37A and to contribute in the production of steam. Note that the coldwater port 101 is located at the far right end of the water heater tank in order that the cold water 37A flows to become warm water 37 in reverse flow against the flow of the heating air inside the radiator 25C and inside the radiator 25D. To take advantage of the free God's gift solar heat available during the day, the solar trap 124, comprising a wide double deck trans-parent roof, is made to cover the water 37 thereby allowing the solar heat radiation 16A to penetrate the roof and get freely to heat up the water 37 wherein the bottom floor of the water container is made black color to absorb the sunlight, but prevents the wind from stealing the heat energy being accumulated or trapped under the transparent roof 124. The solar trap 124 is made up of a lower heat-resistant transparent roof sheet and of an upper heat-resistant transparent roof sheet spacedly superimposed above the lower roof sheet with enough air space in between, —thereby the air is serving as heat insulator between the two sheets and effectively keeping the water 37 stay hot. Note that this solar trap does not have to be invented anymore as I have already claimed and patented in my U.S. Pat. No. 5,507,943, issue date Apr. 16, 1996, but since this new function of the solar tap 124 to help in water distillation is a new idea, it is again a part of the rights now applied for patent. The pre-heated water 37, at what ever temperature, gets down thru the pipeline 11A which is made, as it is hereby extremely emphasized, to have a vertical loop 11B of sufficiently deep enough to create a high water-head or high water/steam pressure when the water 37 is pushed back by the steam pressure at the boiler 4A—it being that the steam engine/turbine 4 impedes or regulates the free flow of steam out of the steam boiler 4A. The deep loop pipe 11B, which is made sufficiently lower in elevation than the boiler 4A, is hereby extremely emphasized as a newly invented device, as a major highlight of this invention applied for patent, to provide continuous flow of high pressure water supply into the boiler 4A, even as the water supply 37 is just a few feet above the level of boiler 4A, —without the use of a regulating intermittent shut-off valve in pipe 11A entrance to the boiler 4A. It is hereby note that the steam engine 4 is incorporated in the process to take the opportunity to make the steam pressure produce electric or mechanical power for whatever use in support of the industries related to this invention. It should be noted that the hot water supply pipe 11A is communicated to the boiler 4A thru its bottom to prevent the steam from flowing backward into the water pipe 11A and to force the steam to get into the exit pipe 6 thru the top of the boiler 4A in order to provide steam power to the steam turbine engine 4. It is also hereby extremely emphasized that the boiler 5A is made elongated multiple branch heat absorber radiator pipes, each pipe containing a hot smaller chimney pipe which is one of the multiple branches of the hot chimney 15. It is also further extremely emphasized that the boiler 4A is made inclined or made vertical such that the water entrance pipe 11A is much lower in elevation than the steam exit pipe 6, wherein the water flows upward in reverse against the downward flow of the hot chimney 15—-purposely, as it is hereby extremely emphasized, so that the upper hotter section of the chimney 15 is in touch with the upper hotter section of the boiler 4A—while the remaining lower temperature heat energy in the downstream section the chimney 15 is in touch with the lower temperature in-coming water supply from the pipe 11A. It is also hereby extremely emphasized that this inclined/vertical radiator pipe boiler is a major highlight of this invention hereby applied for patent. The final superheating process to provide full superheat expanding power upon the compressed air is done by the fuel burner torch 26 which is in the form of various kinds of high pressure heat energy producers or suppliers, some of which are high pressure deuterium/hydrogen electro-plasma torch, gas burner torch, fuel cells, powdered organic/carbon burner, oil burner, trash/wood burner, high pressure steam boilers, and geothermal steam— to name a few, to super-pressurize the compressed air in its mission to kick/push/run the power turbine 2 which drives the electric generator 3 together with the air compressor 1 which continuously drives fresh cold compressed air into the first stage heating air duct 10 that condense the steam of radiator 9, by which at this point completes the cycle of running the engine 1-2-3 which is the radiator a gas turbine engine, a piston engine—part 23-27-28-29 of FIG. 1, and a steam/sterling engine—all of which are externally heated engines. For further heat scavenger function, the fresh oxygen air intake 32 passes thru and submerged to pick-up some of the otherwise wasted heat energy inside the tailpipe 25 of the engine 2 for pre-heating of the fuel-air mixture for more perfect burning at the time it comes out of the nuzzle of the torch 26A that fires the furnace 34A in order to distill/melt the ore/calcium/sand 32A to produce the glass/ceramics/calcium-carbide/metals/cleaned-coal/charcoal coal/resin 17 and 19 serving as heat sources that exit thru and out of the annealing chamber 12 where the molten materials 17 slowly lose temperature due to the circulating air as regulated by the throttle 181. The torch 26A is made to function on various kinds of fuel, one of which is deuterium/hydrogen gas fuel which is ignited in hot fusion in the operation of the hydrogen-electro-plasma torch where the electric arc reacting with hydrogen requires the presence of the effective permanent grounding 183. For best results in the process of smelting metals, glass and ceramics it is extremely a requirement that the electro-plasma hydrogen/deuterium torch 26 be the one used for firing the furnace 34A to prevent oxidation of the smelted materials 32A by closing the throttle 181—since there is no need for oxygen in thermonuclear reaction. The finished products from the annealing chamber 12, which are in the form of blocks, tiles, plates, bars, structural posts/beams/girders/frames/slabs, etc, whether metallic or glass/ceramic, are carried away to the storage areas by the cart 19A. The high pressure cold com-pressed air inside the heat collector multi-tube/multi-coil radiator 14, being hungry of heat in reverse flow opposite the flow of the exiting molten materials 17, picks up and recaptures the high temperature heat energy radiated by the molten materials 17 in the annealing chamber 12 and delivers the heat energy into the second stage compressed air heating duct 23 in the efforts to recapture/recycle the heat energy and to further energize the compressed air coming from the air duct 10. The fresh oxygen air getting into the annealing chamber 12, as regulated by the throttle 181, is made slow flowing to make the heat energy stay a longer time in chamber 12 to give more time for the heat absorbing radiator 14 to pick up more energy from the molten materials 17 while the heat insulator containment walls and insulator roof 42 conserve the heat inside the chamber 12. The limited fresh oxygen air passing thru the throttle 181 in the annealing chamber 12 gets hot also in preparation to contribute hot oxygen for the oxidation of the fuel/gas fumes coming out but did not completely burned in the furnace 34A aside from contributing the heat energy recaptured from the annealing chamber 12—into the chimney 15. Additionally, the torch 26 being a clean deuterium/hydrogen electro-plasma torch, the hot air expelled by the turbine 2 thru the exhaust chimney 25 is a clean hot oxygen air, hence, part of same air is used to contribute oxidation hot air thru the air port 108 to completely burn the fuel gas fumes that had escape the fire in the furnace 34A—in the great efforts to remove pollution aside from obtaining more heat energy out of the fuel—as a further energy scavenger function. The fuel port 33, which is also preheated, is provided with regulating branch valves for more options for spraying fuel direct into the fire at the furnace 34A. For further scavenger function, the hot tailpipe 26B coming out from various kinds of third outside engines, one of which is deuterium-hydrogen fueled internal combustion piston-type engines in which the deuterium is subjected to electric arc environment, is inserted to contribute the otherwise wasted heat energy into the tailpipe 25A of the main engine 2 or into the chimney 15 in order to be recaptured by the low temperature compressed air in air duct 10 in contact with the hot radiators 25A to 25B. The fuel-air port 32 is also used as entrance for various kinds of fuel, some of which are powdered carbon, powdered organics, evaporated organics/gas-fumes from the furnace 34A, —to name a few fuels in the efforts to fire the furnace 34A. It should be noted that the kind of fuel used to fire the furnace 34A depends upon the kind of materials being smelted or kind of pollution being removed. The distilled water at the tank 7 is exited by the pump 159 to build up pressure for the mist spray 8 at the intake of the compressor 1 to make the compress air heat-hungry in contact with the condensation radiator 9. The elevated water tank 20 is provided to maintain good pressure of the water being supplied to the community.

FIG. 31—illustrates a new embodiment for a new design for a newly invented device for and in support of the various newly invented processes as has been illustrated by the herein FIG. 1 and FIG. 30, to implement this invention's mission in maximizing benefits from whatever heat energy available for conversion, and further to portray a clear view of the various heat exchangers in the efforts to provide a clear understanding of the maximization of heat energy recapture and recycle. By inspection of the drawing, the zigzag lines represent both heat emitting and heat absorbing multiple branch and multi-coil radiator pipes/tubes in the efforts to maximize heat transfer at a minimum time. The groups of multiple tiny-little dots represent steam or water mist. The half circle lines represent jump-over of pipelines or not connected to the other crossing pipelines. As has been explained in the preceding FIG. 30, the pipe 33 supplies fresh oxygen-air and fuel to the torch 26A that fires the furnace 34A in the process of smelting the materials 32A into molten materials 17. The excess smelting heat energy exits up into the chimney-radiator 15 that boils the water 4A into super-hot steam that drives the steam engine/turbine 4 that expels the hot steam 9. The distilled water is brought up by the pipeline 159 out of the tank 7 from which the mist 8 is sprayed at the intake of the compressor 1 that drives the first cold compressed air thru the centrifugal pump 1A outward into the radiator 10 and also drives the second cold compressed air into the first radiator 22A. The pipeline 10 containing cold/heat-hungry compressed air spreads into heat absorbing multiple tube/pipe radiator 10 to provide maximum contact with the hot steam 9 expelled by the steam engine 4 to condense the steam into distilled water that drops down into the water tank 7, at the same time the cold compressed air inside the radiator 10 in reverse flow against the steam 9 flow is energized by the hot steam 9 by absorbing the heat energy contained in steam 9. The heated compressed air moves on in the pipeline and into the radiator 10A to absorb additional heat energy from the heat emitting radiator 15A. The already hot compressed air from radiator 10A moves further into pipeline 22 and into the radiator 23 and into the radiator 24 where it absorbs higher temperature heat energy from the radiator 25A which contains low pressure very hot air from the engine 2 exhaust 25 that has been further heated up by the exhaust tailpipe 26B air from other third engines. The already very hot compressed air moves on along the home run air duct where it is further super-heated up by the torch 26 to have the maximum expanding power as it exits thru the power turbine engine 2. The turbine engine 2 drives directly the electric generator 3 that produce deuterium-hydrogen, and simultaneously drives the compressor 1 and 1A all in one drive shaft. Additionally centrifugal compressor pump 1A further continuously drives the second cold compressed air into the first radiator 10B to pick-up the low temperature heat energy from the first radiator 19, which is downstream of the hot radiator 15A. The pump 1A further drives the third cold compressed air into the second radiator 22A to recapture another low temperature heat energy from the second radiator 25B, which is downstream of the very hot radiator 25A. The heated compressed air inside the second radiator 10B moves downstream and joins with the heated corn-pressed inside the first radiator 22 and further made to flow jointly down stream into the pipe 25D to provide heating clean air into the house/building 25E, then exits thru the downstream pipe 25D and gets into the radiator 25F to impart low temperature heat energy to pre-warm the cold water 37A, —as a mean of recapturing-recycling the last drop of heat energy in the chimney, and then finally exits as very low warm air into the atmosphere thru the chimney 43A. The hot air in radiator 15, after boiling the water 4A, moves up into the radiator 15A to further energize the compressed air in radiator 10A that came from the radiator 10, then moves downstream into the first radiator 19 to pre-heat the cold compressed air in the first radiator 10B, then moves further downstream into the radiator 25C to pre-heat the water 37 and finally exits free to the atmosphere thru the chimney 43. The centrifugal compressor 1A further drives the fourth cold com-pressed air into the radiator 14 inside the annealing chamber 12 in reverse flow opposite the movement of the exiting smelted materials to recapture the high temperature heat energy being radiated by the molten/smelted materials. It should be noted at this point that super-hot molten materials become cooler and cooler upon approaching the exit door of annealing chamber 12—because heat emission or radiation is a cooling process. Therefore, the cooler compressed air in the upstream of the radiator 14 must be the one made to react with cooler smelted materials near the exit door of the annealing chamber 12 until it becomes cold finished product plate 19A loaded on the cart 19, while the hotter compressed air, as it moves downstream inside the radiator 14, must be the one made to react with the super-hot molten materials 17 in the efforts to maximize heat recapture. The pre-heated compressed air from the radiator 14 then moves downstream and made to join the other pre-heated compressed air from the radiator 10A thru radiator 22 and all together get into the radiator 23 down to 24 to recapture high hot heat energy from the radiator 25A. The high hot compressed air exiting from the radiator 25A then passes thru the super-heater deuterium-hydrogen torch 26 to provide super expanding power to the compressed air to kick/push the turbine/engine 2 as it exits thru the tailpipe 25. It is hereby extremely emphasized that the turbine 2 is made wide-face sail blades to make it highly efficient in impeding and deflecting the exiting corn-pressed air, and for a better choice, the turbine 2 is made double co-axial oppositely rotating turbine for maximum efficiency, as has been illustrated and explained in my preceding U.S. Pat. No. 6,327,994 B1 dated Dec. 11, 2001. In the process of annealing, as vacuumed by the tall chimney 15-15A-19-25C-43, the negative pressure atmospheric fresh-cold oxygen air—gets into the annealing chamber 12 thru the throttle at a low flow to recapture the heat energy from the smelted materials, and then contributes some hot oxygen-air thru the multi-orifice 108 into the exit of the furnace 34A in the efforts to completely oxidize the gas fumes going up the chimney that escaped the fire in the furnace 34A—in addition to converting the gas fumes into heat energy—as a scavenger function and to prevent pollution. The negative pressure hot clean air then rise up into the radiator 15B and heat up the water 4B at the upstream section of the boiler, then rise up and joins the hot air from the radiator 15 and together get into the radiator 15A, down into the first radiator 19 and up into the radiator 25C to pre-heat the water 37 and finally exits free thru the chimney 43. The low pressure-low temperature hot air from the second radiator 25B also joins the hot air from the first radiator 19 and together get into the radiator 25C to preheat the water 37—as a means to recapturing-recycling the last drop of heat energy in the tailpipe/chimney. The solar trap 124, which has been explained in the preceding FIG. 30, is provided to take advantage of the free God's gift fusion energy solar heat 16A during sunny days to contribute heat energy into the water being distilled and eventually help run the turbine engine 4 that produce hydrogen, help reduce the input of fuel at the pipe 33, and to help supply hydrogen to the torch 26. The preheated water 37 gets down thru the pipe 11A and thru the bottom into the upstream section of the water container as water 4B and moves to become water 4A. The water mist 8 at the intake of the compressor 1 introduces more matter that expands when heated up or that the compressed air is made more com-pact when mixed with water, hence, there is more potential for it to absorb or more hungry to capture more heat energy from the steam 9 being condensed. The steam radiator 9 is the form of multiple branches and coils of tubes/pipes spread or inserted into the cold compressed air pipes to maximize contact between the cold air and the hot steam—for more rapid condensation. The condensation radiator tubes/pipes are inclined downward towards to the compressor 1A to make the distilled droplets of water flow down to the storage tank 7.

Conclusively, in addition to the many new creations/inventions hereby claimed under this presentation and already listed/enumerated as 1 to 59 in the herewith preceding pages in item III of the Brief Summary of this Invention, —there are many more new technologies, various industrial applications of the technologies that can be thought of, and obvious derivatives out of the newly invented processes/apparatus/devices that has been created and claimed as new inventions for the advancement of science in this presentation, including but not limited to: 1. various new uses and applications of the thermonuclear high pressure hydrogen-deuterium-electro-plasma fusion torch for: —a. for a smelting device for various kinds of materials in various heat energy recapture and recycle processes for the production of commodities, including but not limited to glass/ceramics/tiles/vitrified large size concrete; —b. for a steam boiling device where the fusion torch is enclosed by a firing pipe/chamber submerged in water to produce steam and distilled water for irrigation and drinking water, —wherein as a further improvement, the hydrogen-electro-plasma torch is housed inside an elongated firing chamber-pipe having a constricted/smaller exhaust end to make the fusion flames stay longer time in the firing chamber which is enclosed by a larger pipe/chamber to form a cylindrical water tank/boiler surrounding the fusion flames, the inner firing chamber having a tail thru which high pressure steam from the boiler is injected and subjected to the high temperature of the fusion flame thereby the steam is accelerated to exit out thru the tail effecting rocket propulsion for transportations and further steam boiling; —c. for a catalytic converter oven device inside chimneys/tailpipes; —d. for a thermo-nuclear reactor device for hydrogen-deuterium-tritium fuel; —e. for a firing device inside furnaces in the absence of oxygen air getting into the furnace to prevent oxidation of the smelted materials and to make the heat stay longer time inside the furnace as there is no combustion waste gas being exited; —f. for a firing device inside Jet engines, inside gas-turbine engines, inside rocket engines for underwater and space travel—all for any use, and—g. for a firing device for hot air balloons; 2. new design for an elongated/pipe/tunnel furnace having wall made up of water-pipe-steam-boilers serving as directly in contact with the fusion flames fired by the electro-plasma torch; 3. a heat absorbing/collector radiator pipes/tubes containing flowing compressed air engulfing smaller pipes that contain flowing hot gas/steam/water in reverse flow against the cold compressed air—for use in recapture and recycle of heat energy in partnership with externally heated engines; 4. a thermonuclear hybrid fusion internal combustions engines having over-sized sparkplugs fed with hydrogen-deuterium-tritium fuel which is subjected to heavy electric arc at top-dead-center of the pistons to produce fusion flames inside the chambers, and having over-sized cooling system; 5. a new use and application for mercury and water serving as sealing device/tools to prevent the hydrogen from dissolving the gasket at the gate valve and to prevent leakage/escape from a container; 6. a new method for smelting diamonds by placing carbon inside a hydrogen bomb detonated in deep water to convert the carbon into diamonds; 7. a new method for large casting molds in various shapes and sizes to mold molten metals/glass/ceramics into new designs of large tiles/slabs and large chambers/buildings/structural parts for assembly into fish/human habitations/transportations on land/water underwater/sky/space; 8. a confined/forced electrolysis device to convert water into liquid hydrogen-deuterium fuel directly without using a compressor; 9. various new methods for producing fusion heat energy, including but not limited to: —a. by detonation of hydrogen bombs done: —by way of drop hammer implosion where the fuel is rammed by a piston driven by the hammer together with the help of a dynamite, —by implosion thru detonating a dynamite submerged in liquid deuterium, —by implosion of liquid deuterium enclosed by a dynamite, —by firing heavy electric arcs thru/across liquid/gaseous hydrogen-deuterium, —by firing under water torpedo bombs against an underwater target impact wall, —by firing large canon hydrogen bomb bullets against an underwater impact wall, —by firing gun bullets against an impact wall in dry enclosed chamber/oven/furnace without need for oxygen, —wherein the bullet is made up of a soft metal capsule of liquid deuterium engulfed by dynamite confined in the front section of an elongated closed front-end pipe bullet's body and a sliding heavy solid follower cylinder disposed into the rear section of the pipe to ram the deuterium fuel upon bullet's impact upon the target impact wall; —b. by shooting hydrogen capsule and/or high pressure deuterium fuel into the super hot fusion flames to sustain fusion reactor activity; —c. by using the lightning to create heavy electric arc passing thru stored deuterium fuel to attain fusion reaction underwater, and further to smelt diamonds by passing the lightning thru confined compacted carbon under high pressure on dry land; 10. a new device wherein recaptured heat energy from steam expelled by fuel cell and/or steam engine is recycled by using flowing cold compressed air to condense the steam into distilled water, and the heated compressed air is use to drive a gas turbine engine which drives a DC electric generator which in turn produce hydrogen-deuterium fuel back to fire the fuel cell; 11. a fuel cell that drives a gas turbine engine by directly injecting the hot steam expelled by fuel cell into the firing chamber of gas turbine/jet engine, since the fuel cell is made high pressure; 12. a desalination device out of sea water for the production large quantities of irrigation water: comprising a plurality of water atomizers/misting/spraying nozzles disposed above giant air blowers powered by fusion heat energy to lift the water mist up to the sky to speed-up evaporation to form clouds when there is no wind—to make rain, at the same time the upward blowing air serving to lift parachutists, hang/para-gliders up to the sky then make a turn around upon the upward air current and be lifted up back to the sky again and again—for tourist attraction; 13. an amphibious aquarium in the form of a large fish on wheels with propellers driven by a hybrid fusion internal combustion engine serving as transportation, —made to carry live fish for sale, and/or serving as human transportation and underwater housing for human settlement in deep waters; 14. a fishpond on water and on land powered by the hybrid fusion internal combustion engine; 15. a ocean platform carried by recycled empty air containers/pipes/bamboos, sausages of empty bottles bundled together and/or disposed inside large boxes having open bottom but closed top plate—used to carry houses, power plants, swimming pools, and agricultural beds, —powered by hydrogen hybrid fusion engine; 16. a deep water used as device to catch thermonuclear fusion heat energy, hence, hydrogen bomb is detonated in deep water—to prevent fusion flames from flying off up into the sky too soon; 17. a the high pressure hot steam expelled by fuel cells together with the high pressure fusion fire expelled by a hydrogen-electro-plasma torch are both directly injected into the gas turbine engine's/jet engine's firing chamber to drive a gas turbine engine and a jet propulsion engine; 18. a fusion jet engine used to drive an elongated hot air balloon against the wind and further used to float the balloon up in the sky by injecting the hot air exhaust of the engine into inside the balloon to make it hot and inflated; 19. a new design for water pools and fishponds powered by the thermonuclear fusion engines, wherein, the pools/fishponds are constructed/laid on flat compacted dry land without digging the earth and hereby extremely emphasized to be made round/circular with the floor slopping lower to a sunken center and the water is driven around in one direction to drive/accumulate the dirt/droppings/wastes from the fish toward the center of the ponds for easy pick-up by a suction pipe thru water pump which discharges the dirt as fertilizer on to an agricultural bed which serves as water filter having underground pipelines that serve to deliver the filtered water back to the fishpond, and the fishpond is further improved by a net disposed at least one foot above the floor serving to prevent the fishes from agitating the dirt on the floor to make the water stay clear all the time and to allow algae to grow on the floor for foode to maintain/preserve biological balance; 20. a new design for a durable glass sheet pile having side longitudinal groove to interlock the glass sheet piles side-by-side to prevent break-up of the resulting water-break wall for coastline/shoreline/riverbank/riprap/earthwork and building foundation protection wall, —produced as by product in the process of recapture and recycle of fusion heat energy; 21. a new method/process for attaining fusion reaction and for production of abundant fusion heat energy, wherein, the hydrogen-deuterium fuel is released on top of high pressure compressed air or water so that the deuterium fuel is at compacted state when stricken by heavy electric arc; and 22. a new design for a high water falls for scenery and for tourist learning/attraction in the form of spouting water at the top of walls and hills powered by fusion energy which is recaptured and recycled by water turbine hydroelectric power plants, —of which and upon which new ideas, the herein inventor reserves concession upon all the proprietary rights. It should be noted that the reader of this invention/presentation is supposed to be a person skilled in the arts, and that the components, materials, connectors, fasteners, instrumentations, appurtenances, assembly parts, and tools needed to build or assemble the inventions are already available in the open market, much more so with the availability of the hydrogen bomb and heavy water in the open market, including God's Gift free fusion energy from the thermonuclear fire from the sun, and therefore, no need to further invent or re-invent the components and no need to further explain how to make the inventions.

What I claim as new invention, for which I hereby apply for protection of proprietary rights by a grant of a Letters Patent, are as follows:

1. A method for producing energy by a system comprising:
   providing a main compressor for producing a working gas to drive a power turbine, said power turbine drives an electric generator; providing a plurality of heat absorbing radiators and heat sources to heat the working gas before driving said power turbine, each of said radiators further absorbing more heat from different heat supplies formed by different processes; said processes formed a complementary combination to generate heat for the system; said different processes comprising:
   a process for obtaining maximum heat energy equivalent of fuel, wherein, instead of ordinary oxidation, hydrogen-deuterium-tritium fuel is processed through action of high compaction/high pressure/high temperature/heavy electric arc in joint forces upon the fuel to produce high-value thermonuclear reaction heat supplies converted and communicated to drive common engines;
   a process to help drive the engines by maximum harnessing/conversion of existing and created supplies of heat energy in various forms and temperatures, wherein, the heat supplies are contacted/harvested/collected/used by flowing air/water/fluid heat carriers, by reverse flow close encounter as hereby extremely emphasized, —serving as methods for maximum absorption/transfer results and functions;
   a process to help drive the engines, wherein, in a scavenger method, an interlocutor moving mass of matter in the form of a cold/humid heat-hungry flowing compressed air, serving as heat collector medium confined in power pipes, is matched with the low temperature heat supply/carrier while the high temperature compressed air heat collector is correspondingly matched with the high temperature heat supply/carrier, in which case, a heat supply radiator/heat-emitting pipe containing flowing hot air/water/fluid heat supply carrier, gets inserted into the downstream end section of, and engulfed by, the compressed air power pipe and extended to exit out of the upstream end section of the same compressed air, heat collector power pipe—communicated to drive the engines, thereby effecting the reverse flow process as it is again hereby extremely emphasized—for purposes of maximum absorption/collection/transfer of heat energy supplies into, and to energize, the heat collector compressed air out of whatever heat energy supply available in the vicinity;
   a process for maximum harnessing/conversion of the heat supplies, wherein, in a scavenger method, a partnership is created between another engine, selected from a group including an externally heated Stirling/steam/gas turbine first engine, and an assembly of radiator/heat absorbing heat collector power pipes/ tubes, in multiple branches, containing flowing cold-to-hot compressed air to undergo in several improved methods/steps from first stages to second stages, and to third stages heating, serving as way of collecting low temperature to high temperature heat energy supplies, for purposes of maximum absorption/transfer of various temperatures of heat energy supplies in the process of progressively heating-up/energizing the heat collector compressed air, out of whatever available multiple heat energy supplies in the vicinity, for it to have maximum expanding power captive in power pipes, communicated to help in driving the engines subsequently generating electric power;

a thermonuclear reaction process to produce abundant low cost heat energy supply by the electric arc method for high value conversion of the fuel into its maximum heat energy equivalent, to help drive the engines and for various uses, wherein, the hydrogen-deuterium-tritium fuel is fed into a hydrogen-electro-plasma fusion torch, otherwise known as Atomic Hydrogen Welding Torch, which subjects the fuel to electric arc bombardment passed thru across/along the stream of the low/high pressure gas fuel, thereby producing abundant high value high temperature low cost heat energy supply for purposes of smelting, welding, baking, distillation/desalination processes, and for subsequent energizing several branches of the heat collector cold compressed air inside power pipes communicated to help drive the gas turbine first engine that drives electric generators producing electric power that decompose water/heavy water into abundant high-value hydrogen-deuterium-tritium fuel fed back into the same Hydrogen-Electro-Plasma fusion torch, there being so much profits in the production heat energy by thermonuclear reaction;

a thermonuclear reaction by the electric arc process to produce additional high value low cost abundant heat energy supply, to help drive the engines, wherein, the hydrogen-deuterium-tritium fuel is fed into inside chambers of a Hybrid Internal Combustion Piston-driven second engine having spark plugs that shoot long heavy electric arc striking across-upon the fuel while in compacted state at top dead-center of the piston, —as a fusion process for less release of electric arc per unit of fuel, in the efforts of producing high temperature low cost heat energy supplies in captivity, in order to directly drive the IC second engine by thermo-nuclear energy;

the otherwise wasted heat energy released through a tailpipe of the IC second engine discharging into a first steam boiler for the production of abundant high pressure steam communicated to drive a steam third engine;

wherein further, the whole IC second engine is engulfed by, and to energize, a first branch of the heat collector cold compressed air, to help cool the engine due to so much fusion heat in it;

wherein further, the IC second engine is provided with spark plugs made hybrid having multi-prong bent away form its cathode to create heavy long electric arcs bombarding the hydrogen-deuterium fuel to insure attaining thermonuclear reaction inside the chamber;

wherein further the IC second engine, through an internal circulating water cooling system, further giving off heat energy carrier engulfed by, and to energize, a second branch of the heat collector compressed air;

wherein additionally, there being so much fusion heat in the engine, the water pump driving the engine's circulating cooling water is enlarged at least two times and the hot water radiator assembly also enlarged at least three times including some cooling circulating water exposed to the cold wind/second branch of the cold heat collector compressed air;

wherein further, the first steam boiler giving off so much hot gas heat carrier, originally from the IC engine, engulfed by, and to energize, a third branch of the heat collector cold compressed air;

wherein further, the steam third engine giving off hot steam heat carrier engulfed by, and to energize, a fourth branch of the heat collector cold compressed air;

wherein further, the gas turbine first engine giving off hot air heat energy carrier engulfed by, and to energized, a fifth branch of the heat collector cold compressed air;

wherein further, the first, second, third, fourth and fifth branches of the heat collector energized compressed, serving as first stage heating, all together, jointly recombined into an enter-pool header power pipe communicated into a second stage heating, into a third stage heating and subsequently communicated to help drive the gas turbine first engine;

wherein, the steam third engine giving off hot steam engulfed in reverse flow by, and to energize, the fourth branch of the heat collector cold compressed air purposely, as it is hereby extremely emphasized, to recapture the heat energy, to condense the steam into abundant distilled water and to speed up desalination of water;

wherein the cold compressed air, heat collector medium, made cold and heat-hungry by spray of water/water-mist before compression to provide/add in the compressed air more matter that expands when heated;

the heat collector cold compressed air produced and supplied by the gas turbine first engine;

wherein further, a branch of the cold compressed air communicated to supply into an air intake manifold serving to turbo-charge the IC second engine—helping to increase its power output without additional fuel input;

wherein further, a hydrogen electro-plasma fusion torch is fired into the tailpipe of the IC second engine to remove NOx, serving as a catalytic converter that supply heat energy, but in captivity, functionally helping in the first steam boiler that drive the steam third engine, subsequently helping drive the gas turbine first engine and helping in production of distilled water;

another thermonuclear reaction by the electric arc process to produce additional high value low cost heat energy supply, to help drive the engines, wherein, compacted hydrogen-deuterium-tritium fuel is fed into an electro-plasma-fusion torch having a highly pressurized firing chamber including inside compressed air power pipes as NOx remover catalytic converter, heat energy in captivity, communicated to helps drive the gas turbine first engine, and including firing inside high pressure water pipes/deep water for direct boiling of steam-communicated to helps drive the steam third engine, as a method of attaining thermonuclear fusion reaction in less release of electric arc per unit of fuel and save electric power;

a thermonuclear reaction by the compaction process to produce additional high value low cost heat energy supply to help drive the engines, wherein, a liquid hydrogen-deuterium-tritium fuel is subjected to the action of implosion and super compaction upon the liquefied fuel confined in soft container rammed by a piston, driven by dynamite explosion, triggered by a large drop hammer, as a detonation process of hydrogen bomb disposed underground and/or underwater, to produce low cost fusion heat energy captured by the deep water for direct steam boiling captured in power pipes communicated to help drive the steam third engine and subsequently drive the gas turbine first engine;

a thermonuclear reaction by the compaction process to produce additional high value low cost heat energy supply to help drive the engines, wherein, the liquid hydrogen-deuterium-tritium fuel is subjected to the action of implosion and super compaction while confined in a strong container, by detonating a dynamite while submerged in the liquid fuel, to detonate a hydrogen bomb underwater for direct boiling of steam captured in power pipes, communicated to help drive the steam third engine and subsequently drive the gas turbine first engine;

another thermonuclear reaction by the compaction process to produce of additional high value low cost heat energy supply to help drive the engines, wherein, the liquid hydrogen-deuterium-tritium fuel is subjected to the action of implosion and super compaction upon the fuel confined together with a dynamite in a strong container, and the dynamite detonated while enclosing the liquid fuel in soft container as a fusion process in detonating a hydrogen bomb underwater to produce fusion heat energy captured by the deep water, for direct boiling of steam captured in power pipes, —communicated to help drive the steam third engine and subsequently drive the gas turbine first engine;

a thermonuclear reaction by the superheating/electric arc process for high value production of additional heat energy supply to help drive the engines, wherein, the fuel is subjected to the action of heavy electric arc passed thru across a liquid hydrogen-deuterium-tritium fuel confined in a strong container disposed in deepwater/deep-well/lake/ocean, thereby, a hydrogen bomb detonates, for direct boiling of steam captured in power pipes communicated to help in driving the steam third engine and subsequently drive the gas turbine first engine;

a thermonuclear reaction by the compaction process for high value production of additional heat energy supply to help drive the engines, wherein, the liquid hydrogen-deuterium-tritium fuel is subjected to the action of dynamite Super compaction/implosion of the fuel, by firing a torpedo-hydrogen-bomb upon an underwater target impact wall in sustained/successive firing, for continuous direct abundant boiling of steam captured in power pipes communicated to help in driving the steam third engine and subsequently drive the gas turbine first engine and speedup production of distilled water;

a thermonuclear reaction by the compaction process for high value production of additional heat energy supply to help drive the engines, wherein, the liquid fuel contained in a soft container, is super-compacted by firing a big cannon gun that fires large hydrogen bomb bullets upon an underwater target impact wall, same bullets ram the liquid fuel by a heavy metal rod disposed behind the fuel, serving to detonate a hydrogen bomb, in sustained firing, to produce abundant fusion heat energy continuously for direct boiling of hot steam captured in power pipes communicated to help in driving the steam third engine and subsequently drive the gas turbine first engine;

another thermonuclear reaction by the compaction process for high value production of additional heat energy supply to help drive the engines, wherein, the liquid hydrogen-deuterium-tritium fuel, contained in a soft container is super-compacted by firing a gun that fires small hydrogen bomb bullets upon a target impact-wall inside a smelting first furnace engulfed by a second steam boiler; the bullets ram the liquid fuel by a heavy metal rod disposed behind same liquid fuel, serving as a sustained fusion fire in the enclosed dry oven/smelting first furnace, in the production of hardware while simultaneously producing abundant steam in power pipes communicated to help in driving the steam third engine and subsequently driving the gas turbine first engine;

a thermonuclear reaction by the electric arc process for high value production of additional heat energy supply to further help drive the engines, wherein, a plurality of Hydrogen Electro-Plasma Fusion Torch, fed by hydrogen-deuterium-tritium fuel, are fired to help provide super heat into the smelting first furnace, in order to speed-up production of hardware, speed-up production of heat energy, speed-up production of steam/distilled water, to speed up production of calcium-carbide as energy storage, to speed-up production of cement, to speed-up production of energized compressed air that speed-up the gas turbine first engine and to help speed-up the steam third engine by recapture and recycle of the otherwise wasted heat energy reconverted back into abundant high value hydrogen-deuterium-tritium fuel mixture fed back into the fusion torches, there being so much profit in heat energy production out of the thermonuclear reaction process;

a thermonuclear reaction by the high temperature process for high value production of additional heat energy supply to further help drive the engines, wherein, a high pressure pulse of hydrogen-deuterium-tritium fuel is shot into the already created fusion fire inside the first furnace to attain fusion reaction and to sustain fusion fire without further use of and save electric power arc to provide much cheaper superheat inside the first furnace without need for oxygen supply, hence, no NOx;
wherein further, the hot air heat exhaust from the first furnace communicated into the a third steam boiler communicated to help speed-up the steam third engine, subsequently help speed-up the gas turbine first engine and to help speed up desalination and production of more abundant distilled water;
a portion of the hot steam expelled from the steam third engine communicated to discharge into the super hot fusion fire in the first furnace in supper hot decomposition process of steam into Hydrogen fuel ignited into the third steam boiler to help speed up the steam third engine and speed up the desalination process;

a process to obtain maximum benefits from the fuel and from heat energy, wherein, the otherwise wasted steam is condensed, to energize the heat collector cold compressed air, at high elevation into stored distilled water serving as first elevated water energy storage for standby energy emergency supply, serving as reserved water for irrigation and for drinking water, subsequently released down through a hydro-electric water turbine/motor engine/reciprocating piston engine to use the distilled water for irrigation and drinking water while reconverting the elevated energy into electric power used in the production of high value hydrogen-deuterium fuel fed back into the fusion torches;

a process to obtain maximum benefits from fuel, from heat energy and from electric power, wherein, all the engines, including the gas turbine first engine, the steam third engine, the Internal Combustion Second engine, a Fuel Cell and the Hydro-electric water engine, all serving to drive in generation of electric power for sale and for used in decomposition of water/heavy water into abundant high value hydrogen-deuterium-tritium fuel fed back into the Hydrogen-Electro-Plasma-Fusion Torches, fed back into the Internal Combustion Second Engine, fed back into the Fuel Cell, fed back into the smelting first furnace, and fed back into the construction of more and more hydrogen bullets and hydrogen bombs for underwater detonation for the production of more electric power/fuel and more-and-more distilled water, again and again in a continuously repeating heat recapture and recycle and the extra fuel stored in glass tanks for sale, there being so much extra production;
  wherein further, a branch gear of the gas turbine first engine used in pumping irrigation water stored up into a second high elevated water energy storage, serving as fishpond and serving as emergency stand-by power supply into the power grid;
a process to obtain maximum benefits from electric power, wherein, the self generated electric power and electric power supplies from outside utility companies are used in the decomposition of water/heavy water for the production of abundant high value hydrogen-deuterium-tritium fuel fed into the Fuel Cells, into the Internal Combustion second engine, into the smelting furnace and into the high pressure firing of the Thermonuclear Electro-Plasma Fusion Torch, for more smelting of hardware, for the generation of more electric power, for more desalination of water and in the production of more fuel for sale and the heat energy recaptured/recycled by energizing the heat collector cold com-pressed air, communicated to further help drive the gas turbine first engine for subsequent production of high value hydrogen-deuterium-tritium fuels, again and again;
  wherein further, the fuel so produced in liquid form is mixed/reacted with organics into liquid bio-fuels to remove the outward pressure of the hydrogen gas fuel in the fuel tanks and to remove the problem of leaking storage, as hereby extremely emphasized;
  wherein further, the electric power is used to provide high temperature heating in the gasification of various kinds of organics, without involving outside oxygen air;
  wherein further, the heat energy spent in gasification, recaptured/recycled in the condensation/storage processes of the gasified fuel, by interaction energizing a sixth branch of the heat collector cold compressed air, communicated to help drive the gas turbine first engine;
a process to obtain maximum benefits from the fuel and from the heat energy so produced, wherein, the thermonuclear first smelting furnace is further used in the production of hardware—including pre-fabricated components in the form of large glass/ceramics structures and large chambers for houses/buildings, structures/transportations on land/water/underwater and storage of commodities;
  wherein further, the outgoing smelted materials, at the elongated annealing the exit hot conveyor, carrying so much heat energy recaptured/recycled by energizing a seventh branch of the heat collector compressed air communicated to help drive the gas turbine first engine;
a process to obtain maximum benefit from fuel by ordinary oxidation of fuel to further help drive the engines, wherein, hydrogen/gas fuel is burned/oxidized in a fuel cell in the production of electric power, which process also produce high temperature/high pressure exhaust hot steam power captured in power pipes, as a by-product able to drive an engine, as hereby extremely emphasized, hence, communicated to help drive the steam third engine and subsequently drive the gas turbine first engine;
a process to maximize benefits from ordinary fuels, by burning, trash/wood/charcoal/oil/coal/coke/powdered organics/high temperature-decomposed/destroyed organics/evaporated-organics/gasified fuels/bio-fuels and all kinds of gas fuel in the production additional heat energy supplies, to further help drive the engines, in a smokeless perfect combustion incinerator/second furnace also engulfed by a third steam boiler, wherein, the fuel is burned from the top, in the same way that a smokeless candle burns starting from the top, used/serving as second smelting furnace for metals/ceramics;
  wherein, the second furnace being abundantly supplied from the top with pre-superheated oxygen-air thru distribution perforated oxidation nozzles submerged in the flames, fed in reverse flow against the flame;
  wherein, the heat energy waste hot air exiting out of the second furnace communicated to help speed-up the third steam boiler that helps drive the steam third engine;
  wherein, the waste heat energy hot air exhaust from the third steam boiler again recaptured/recycled to energize an Eight branch of the heat collector compressed air, communicated to help drive the gas turbine first engine, to help speedup the electric generator for further production of high value hydrogen-deuterium fuel for use in the succeeding thermonuclear reactions;
  the waste hot air exiting out of the second furnace subjected to super heating by a hydrogen-electro-plasma-fusion torch firing inside the furnace's chimney, serving as a catalytic converter to remove NOx and to add more heat energy in captivity, as hereby extremely emphasized, to speed-up the third steam boiler, subsequently speedup the steam third engine and subsequently speed-up the gas turbine first engine;
a process to obtain maximum benefits from fuel and heat energy, in the production of additional heat energy supplies to further help drive the engines, wherein, the incinerator second furnace is further used for production of gasified bio-fuel by having a continuous flow of organic matter supplied into the furnace in a pressurized state, including wood, trash, coal/coke, charcoal and waste/crude oil;
  wherein, the organic matters are subjected to high temperature of electric arc and thermonuclear fire from hydrogen-electro-plasma-fusion torch accompanied by superheated steam continuously supplied into the second furnace to mix in chemical thermal reaction with the hot superheated/powdered/evaporated organics, to produce bio-fuels, there being no oxygen-air getting into the furnace;
  wherein, the heat energy supply contained in the resulting evaporated hot gasified fuel and hot gas bio-fuel recaptured/recycled through condensation/cooling, by reverse flow inter-action heat recycle to energize the sixth branch heat collector cold compressed air to help drive the gas turbine first engine which subsequently generates electric power for the production of decomposed/destroyed heavy water high value fuel, fed back into the hydrogen-electro-plasma fusion torches and partly fed into the main gas pipeline for sale;

a process to obtain maximum benefits from heat energy without using fuel, but rather use existing heat energies harnessed as additional heat energy supplies, to further help drive the engines, wherein, in a scavenger mission, ground surface geothermal heat and solar heat is collected/conserved by using a solar trap box covered by multi-layers of transparent roofs/tents, with horizontal reflector strips laid North-to-South and tilted East to West, for more direct sunlight reflected getting into the trap box, —same roofs serving to prevent the wind from stealing the solar fusion heat trapped in the box;

a black powdered carbon/materials sprayed on the solar trap box floor to absorb the solar heat down onto the floor to heat up the floor/grounds;

the solar trap box laid to cover roof-tops of houses/buildings, to cover sunlight fields, to cover the desert fields/areas, and to cover bodies of water and land/fields subjected to volcanic heat, in the efforts to conserve low temperature solar heat and volcanic heat energy in the trap;

same heat energy collected/captured/contained by flowing air/water heat carrier inside the box, touching the hot grounds/fields, freely flowing along under the roof towards near the gas turbine first engine;

wherein, upon getting near by the gas turbine first engine, the flowing heat carrier air/water is entered into a large header heat exchange pipe provided with an exit air/water pump which draws the heat carrier air/water from the solar heat trap box/field into/through the large header heat exchange pipe and expel the resulting cold heat carrier out to the atmosphere;

wherein, a multiple branches of pipes containing a ninth branch of the heat collector cold compressed air disposed submerged into the hot flowing heat carrier/supplier air/water inside the header heat exchange pipe serving to energize, in a first stage heating, by reverse flow close encounter, the ninth branch heat collector cold compressed air inside the same multiple branches of heat absorbing/collecting assembly of power pipes;

wherein, the ninth branch energized compressed air then communicated into higher stage heating inter-pool power pipe to help drive the gas turbine first engine for the production of electric power and subsequent production of high value hydrogen-deuterium fuel, fed back into succeeding thermonuclear reactions;

a process to obtain maximum benefits from the fuel to help drive the engines, wherein, while in the process of Thermonuclear reaction of the fuel to produce additional heat energy supply, the deepwater detonation of hydrogen bomb also includes a process of smelting high value diamond by providing a ball of compacted carbon placed submerged in a confined liquid hydrogen-deuterium fuel in a strong container;

the bomb detonated, in deepwater for direct boiling of steam captured in power pipes, by a heavy electric arc from energy banks and/or from the lightning strike, passed thru across the fuel;

subsequently, the carbon gets molten by thermonuclear fire in the bomb and gets solidified under high pressure of the cold deepwater, resulting to a smelted high value diamond, marketed to make the cost of producing heat energy free;

a process to obtain maximum benefits from electric energy used in the production of additional high value fuels to help drive the engines, wherein, decomposition of water/heavy water is done by forced electrolysis of water/heavy water confined without leak/air-gap to produce high value hydrogen-deuterium fuel and oxygen directly into liquids without compressor in a strong container sealed by water and/or mercury and soft metals—for the production of high value hydrogen-deuterium-tritium fuel mixture stored in liquid form serving as energy storage for sale, stationary/transportable, some fed back for the next thermo-nuclear reactions to drive the first, second, third engines, the smelting furnaces and the fuel cells;

a process to obtain maximum benefits from fuel to help drive the engines, wherein additional heat supply is produced by Thermonuclear reaction of hydrogen-deuterium fuel to provide superheat in the process of roasting coal/wood/organic trash and in smelting molten coal/carbon and calcium carbide, as hereby extremely emphasize, to remove sulfur/pollutants from coal and to extract resin/tar from wood/organics in destructive distillation/evaporation confined inside pipes, and in the production of coke/charcoal/powdered carbon, thru the steam boiler furnace fired by hydrogen-electro-plasma fusion torch, to avoid/prevent the requirement of combustion oxygen/nitrogen and stop production of NOx;

the heat energy so produced, including those exiting out from the distillation pipes, exiting out of the chimney, exiting out of the steam boiler, out of the annealing elongated exit conveyor chamber, out of the organic gas condenser and out of the steam/gas condenser past/downstream the steam turbine third engine, then recaptured/recycled/interacted by reverse flow to energize the heat collector cold compressed air, multiple branches, communicated helping to drive the gas turbine first engine serving in generation of DC electricity subsequently converted into high value hydrogen-deuterium fuel fed back into the next thermonuclear processes for best benefits;

the resulting products, distilled water, clean roasted/molten coal/coke, charcoal, carbon powder, sulfur powder, liquid risen/tar, cold organic gas and cold helium—all stored in separate containers for fed into the smelting second furnace and for sale;

the resulting clean organic materials further dissolved in liquid hydrogen in the production of transportation bio-fuels for sale;

a process to obtain maximum benefits from fuel energy, heat energy and from moving mass of matter energy to help drive the engines through abundant low cost supply of compressed air, by using a hybrid gas turbine first engine of high efficiency turbine, wherein, the heat collector compressed air, being a moving mass of matter, is driven and deflected in the most efficient/effective way by means of wide-face blades in the air compressor turbine and wide face blades in the exhaust power turbine, made spiral blades subtending an arc of at least 72 degrees each, attached filling up the circumference around outside walls of an inner pipe drive shaft;

additionally, the usual set of stator blades removed, and replaced by wide-face impeller blades and by wide-face deflector blades, for the compressor and for the power exhaust turbines respectively, each subtending at least 72 degrees, each attached filling up the circumference around inside walls of a co-axial outer pipe drive shaft in opposite angle-pitch, so to be driven rotating/revolving in opposite direction against the rotation/revolution of the inner pipe drive shaft;

additionally, the multistage main air compressor is super-turbocharged by a preceding centripetal compressor made of multistage inwardly concave wide-face oppositely revolving blade to scope maximum mass of air supplied to the main compressor; and a process to obtain maximum benefits from the energy of moving mass of matter and from heat energy to help drive the engines, wherein, abundant low cost supply of heat collector compressed air, of enough pressure accepted into an X-stage/final stage of the engine's compressor and/or accepted directly into the power pipes through control valves, is contributed, to help drive the gas turbine first engine, by a plurality of wind turbines, turbines in water currents and water wave harness devices, all driving a plurality of hybrid air compressors in the vicinity of the engines, communicated serving to help speedup/drive the gas turbine first engine to maximize harvest of natural energy;

the turbines made of wide-face blades/sails, constructed with a spring/torsion bar to be flexible/self-adjusting to the wind/water speeds, purposely, as a new process, to maximize wind contact by each sail and to scope as much wind as space allows and able to deflect/push/accelerate maximum mass of matter to a new direction of mass flow, in order to create an equal and opposite reaction force exerted by the wind/water upon the wide-face turbine blades, serving to create maximum torque upon the turbine out of a unit cross-sectional area and speed of the wind contacted by the sweep area of the turbine's diameter;

each wind turbine provided with a wide diameter central hub cover front nose, pointing to split/divert the wind, sidewise/outward, to bump the sails of the turbine, thereby increasing the mass of wind being deflected/accelerated/pushed to a new direction, thereby creating a bigger force reaction pushing back to revolve the wind sails effecting bigger torque to speed up the compressors to supply more heat collector compressed air;

the gas turbine first engine, due to so much supply of compressed air, gets speed up in full power with much less fuel and even gives the opportunity to drive a second gas turbine engine, there being so much heat collector cold compressed air put into the power pipes, specially at a time when wind speed becomes most favorable without fear of burning an electric generator even in times of hurricanes because it is a compressor being driven at run-away speeds;

wherein additionally, a plurality of sky windmill air compressors, it being much less weight than an electric generator, are deployed up in the sky carried by kites/balloons, providing the opportunity to harvest natural energy of so much moving mass of matter up in the sky, serving to supply compressed air into the power pipelines, communicated through the X-stage compressor to help speedup/drive the gas turbine first engine to drive additional electric generators to produce more high value fuel.

* * * * *